(12) United States Patent
Xu

(10) Patent No.: US 12,197,294 B1
(45) Date of Patent: Jan. 14, 2025

(54) SYSTEM AND METHOD OF HANDLING PRIMARY AND BACKUP OVERRUNS AND UNDERRUNS IN A REAL-TIME EMBEDDED SYSTEM WHICH TOLERATES PERMANENT HARDWARE AND SOFTWARE FAILURES

(71) Applicant: Jia Xu, Toronto (CA)

(72) Inventor: Jia Xu, Toronto (CA)

( * ) Notice: Subject to any disclaimer, the term of this patent is extended or adjusted under 35 U.S.C. 154(b) by 462 days.

(21) Appl. No.: 17/444,991

(22) Filed: Aug. 12, 2021

(51) Int. Cl.
*G06F 11/14* (2006.01)
*G06F 11/16* (2006.01)
*G06F 11/36* (2006.01)

(52) U.S. Cl.
CPC ...... *G06F 11/1469* (2013.01); *G06F 11/1456* (2013.01); *G06F 11/16* (2013.01); *G06F 11/3612* (2013.01)

(58) Field of Classification Search
CPC .. G06F 11/1469; G06F 11/1456; G06F 11/16; G06F 11/3612
See application file for complete search history.

(56) References Cited

U.S. PATENT DOCUMENTS

| | | | |
|---|---|---|---|
| 5,671,361 A | 9/1997 | Brown | |
| 5,848,128 A * | 12/1998 | Frey | H04M 3/241 379/279 |
| 6,085,218 A | 7/2000 | Carmon | |
| 6,189,022 B1 | 2/2001 | Binns | |
| 6,230,303 B1 | 5/2001 | Bharat | |
| 6,349,321 B1 | 2/2002 | Katayama | |
| 6,438,573 B1 | 8/2002 | Nilsen | |
| 6,964,048 B1 | 11/2005 | Isham | |
| 7,140,022 B2 | 11/2006 | Binns | |
| 7,302,685 B2 | 11/2007 | Binns | |
| 7,484,067 B1 | 1/2009 | Bollella | |
| 7,613,595 B2 | 11/2009 | MacLay | |
| 8,321,065 B2 | 11/2012 | Kirchhof-Falter | |
| 9,753,772 B2 * | 9/2017 | Xu | G06F 9/4887 |
| 10,445,295 B1 * | 10/2019 | Han | G06F 16/1844 |
| 10,552,215 B1 * | 2/2020 | Xu | G06F 9/526 |
| 2002/0138542 A1 | 9/2002 | Bollella | |
| 2002/0194048 A1 | 12/2002 | Levinson | |
| 2006/0047925 A1 * | 3/2006 | Perry | G06F 11/1474 714/E11.131 |

(Continued)

*Primary Examiner* — Matthew M Kim
*Assistant Examiner* — Matthew N Putaraksa

(57) ABSTRACT

A system and method which tolerates both permanent processor failures and permanent software failures by scheduling a primary and a separate backup on different processors for every real-time process, while further increasing system robustness and reliability, by using primary and backup latest start times to allow primaries or backups to overrun, both before, and after, any permanent processor failure, by effectively utilizing any spare processor capacity including any additional processor capacity created at run-time due to primary or backup underruns, or due to not needing to execute a backup anymore, which significantly increases the chances that a primary or backup may meet its deadline despite permanent hardware failures and permanent software failures, and despite overrunning, while also satisfying additional complex constraints defined on the primaries and backups such as precedence and exclusion relations, in a fault tolerant real-time embedded system.

12 Claims, 29 Drawing Sheets

(56) References Cited

U.S. PATENT DOCUMENTS

| | | |
|---|---|---|
| 2006/0079979 A1 | 4/2006 | Giebels |
| 2006/0200795 A1 | 9/2006 | MacLay |
| 2009/0013322 A1 | 1/2009 | MacLay |
| 2013/0318506 A1 | 11/2013 | Sohm |
| 2013/0318535 A1* | 11/2013 | Sun .................... G06F 11/2043 |
| | | 718/104 |
| 2014/0365992 A1 | 12/2014 | Maclay |
| 2015/0006226 A1 | 1/2015 | Smith |
| 2021/0374021 A1* | 12/2021 | Santhakumar ........ G06F 3/0659 |
| 2023/0315576 A1* | 10/2023 | Chen ................... G06F 11/1433 |
| | | 714/15 |

\* cited by examiner

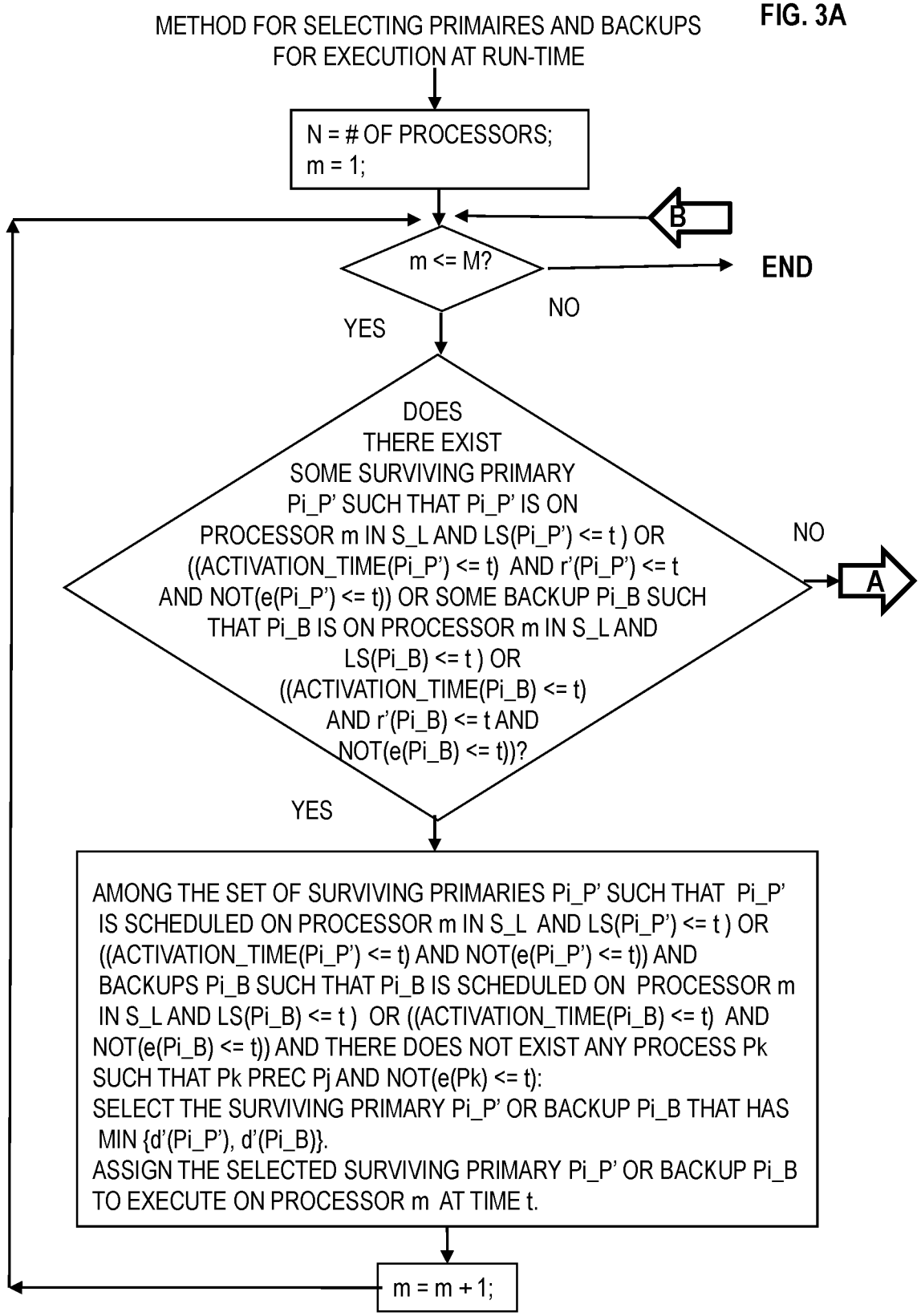

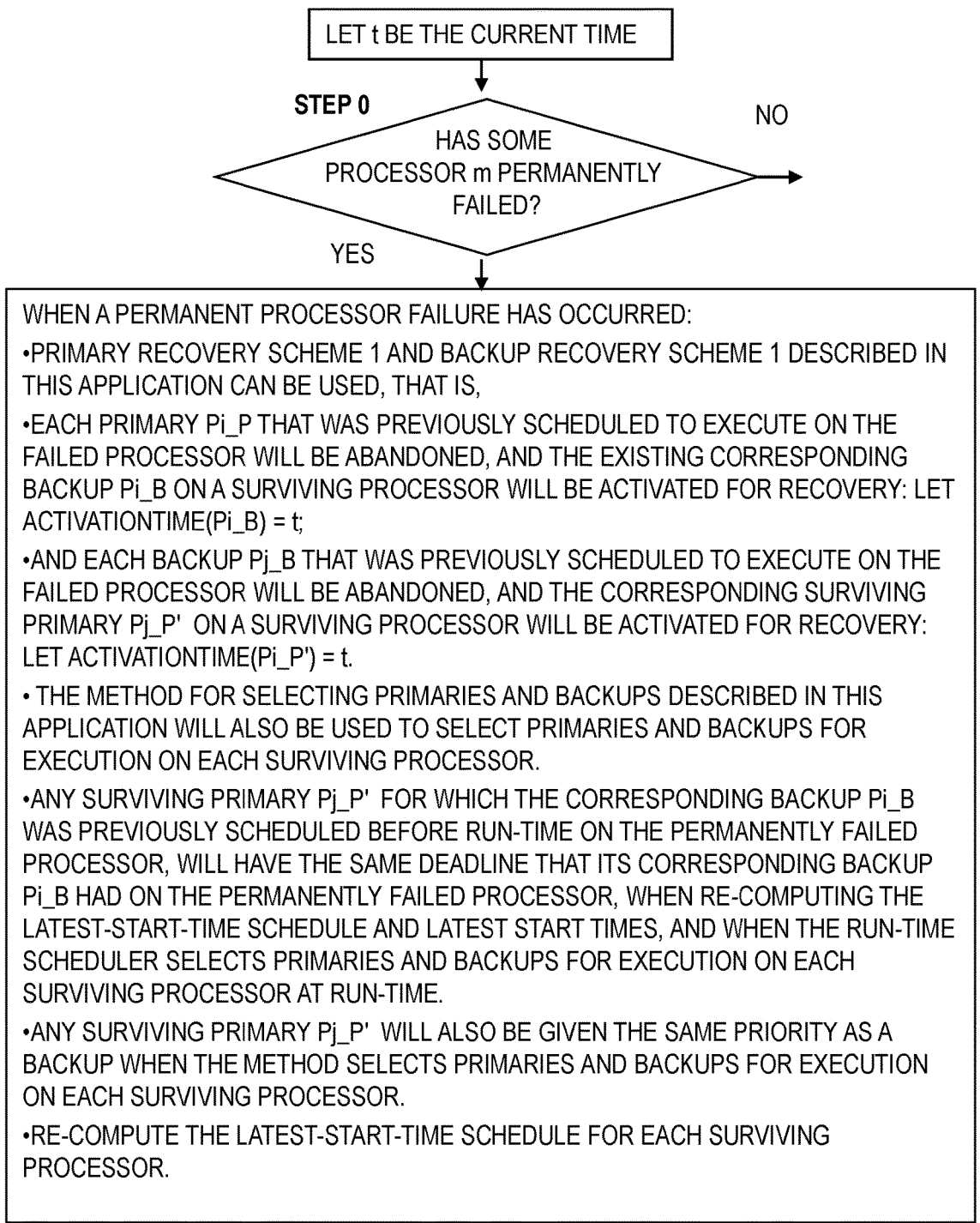
FIG. 4A  MAIN RUN-TIME SCHEDULER METHOD – FIRST EMBODIMENT ($m_1$ has permanently failed.)

($m_1$ has permanently failed.)

($m_1$ has permanently failed.)

($m_1$ has permanently failed.)

($m_1$ has permanently failed.)

Processor $m_2$ has permanently failed

Processor $m_2$ has permanently failed

*Processor $m_2$ has permanently failed*

*Processor $m_2$ has permanently failed*

*Processor $m_2$ has permanently failed*

*Processor $m_2$ has permanently failed*

*Processor $m_2$ has permanently failed*

*Processor $m_2$ has permanently failed*

Processor $m_2$ has permanently failed

Processor $m_2$ has permanently failed ($m_1$ has permanently failed.)

($m_1$ has permanently failed.)

($m_1$ has permanently failed.)

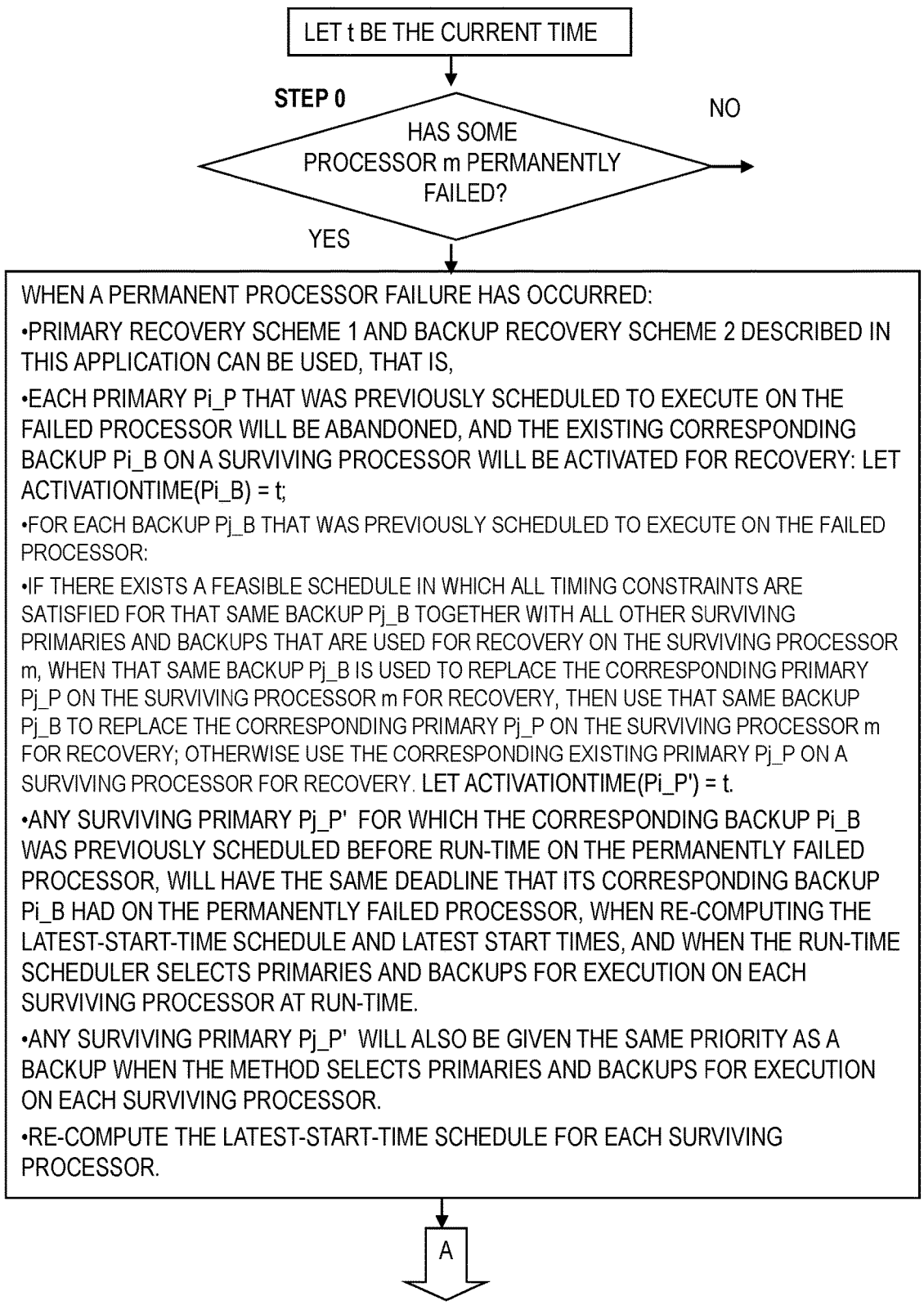
FIG. 10A MAIN RUN-TIME SCHEDULER METHOD – SECOND EMBODIMENT

SYSTEM AND METHOD OF HANDLING PRIMARY AND BACKUP OVERRUNS AND UNDERRUNS IN A REAL-TIME EMBEDDED SYSTEM WHICH TOLERATES PERMANENT HARDWARE AND SOFTWARE FAILURES

CROSS-REFERENCE TO RELATED APPLICATIONS

This application claims the benefit of Provisional Patent Application No. 63/066,804, filed Aug. 17, 2020, filed by the present inventor, which is hereby incorporated by reference. Prior application Ser. No. 15/669,898, filed Oct. 6, 2017, now U.S. Pat. No. 10,552,215 B1, prior application Ser. No. 14/451,420, filed Aug. 4, 2014, now U.S. Pat. No. 9,753,772 B2, prior application Ser. No. 12/285,045, filed Sep. 29, 2008, now U.S. Pat. No. 8,627,319 B1, prior application Ser. No. 11/341,713, filed Jan. 30, 2006, now U.S. Pat. No. 7,444,638, and prior application Ser. No. 09/336,990, filed Jun. 21, 1999, now U.S. Pat. No. 7,165,252 B1, filed by the present inventor, are hereby incorporated by reference.

FEDERALLY SPONSORED RESEARCH

Not Applicable

NAMES OF PARTIES TO A JOINT RESEARCH AGREEMENT

Not Applicable

SEQUENCE LISTING OR PROGRAM

Not Applicable

BACKGROUND PRIOR ART

The following is a tabulation of some prior art that presently appears relevant:

| U.S. Patents | | | |
|---|---|---|---|
| Pat. No. | Kind Code | Issue Date | Patentee |
| 8,321,065 | B1 | 2012 Nov. 27 | Kirchhof-Falter |
| 6,085,218 | B1 | 2000 Jul. 4 | Carmon |
| 7,613,595 | B1 | 2009 Nov. 3 | MacLay |
| 6,189,022 | B1 | 2001 Feb. 13 | Binns |
| 7,302,685 | B1 | 2007 Nov. 27 | Binns |
| 7,140,022 | B1 | 2006 Nov. 21 | Binns |
| 6,964,048 | B1 | 2005 Nov. 8 | Isham |

| U.S. Pat. application Publications | | | |
|---|---|---|---|
| Publication No. | Kind Code | Publ. Date | Applicant |
| 20,020,138,542 | A1 | 2002 Sep. 26 | Bollella |
| 20,090,013,322 | A1 | 2009 Jan. 08 | MacLay |
| 20,060,200,795 | B1 | 2006 Sep. 7 | MacLay |

1. (Koren et al 1995) Koren, G., and Shasha, D., 1995, "Dover: an optimal on-line scheduling algorithm for overloaded uniprocessor real-time systems," SIAM Journal on Computing, Vol. 24, no. 2, pp. 318-339.
2. (Gardner et al 1999) Gardner, M. K., and Liu, J. W. S., 1999, "Performance of algorithms for scheduling real-time systems with overrun and overload," Proc. 11th Euromicro Conference on Real-Time Systems, University of York, England, pp. 9-11.
3. (Lehoczky et al 1995) Lehoczky, J. P., Sha, L., and Strosnider, J. K., 1995, "The deferrable server algorithm for enhanced aperiodic responsiveness in hard real-time environments," IEEE Trans. On Computers, vol. 44, no. 1, pp. 73-91.
4. (Shen et al 1993) Shen, C., Ramamritham, K., and Stankovic, J. A., 1993, "Resource reclaiming in multiprocessor real-time systems," IEEE Tran. on Par. and Distr. Sys., vol. 4, n. 4, pp. 382-397.
5. (Sprunt et al 1989) Sprunt, B., Sha, L., and Lehoczky, J. P., 1989, "Aperiodic process scheduling for hard real-time systems," Journal of Real-Time Systems, vol. 1, pp. 27-60.
6. (Stewart et al 1997) Stewart, D. B., and Khosla, 1997, "Mechanisms for detecting and handling timing errors," Communications of the ACM, vol. 40, no. 1, pp. 87-90.
7. (Zhang 2003) Zhang, L., 2003, "Handling overruns and underruns in prerun-time scheduling in hard real-time systems," M. Sc. Thesis, York University, Toronto, Canada.
8. (Lin et al 2005) Lin, C., and Brandt, S. A., 2005, "Improving soft real-time performance through better slack reclaiming," Proc. 26th IEEE Real-Time Systems Symposium, Miami, pp. 410-420.
9. (Caccamo et al 2005) Caccamo, M., Buttazzo, G. C., and Thomas, D. C., 2005, "Efficient reclaiming in reservation-based real-time systems with variable execution times," IEEE Tran. Computers, vol. 54, n. 2, pp. 198-213.
10. (Xu 1993) Xu, J., 1993, "Multiprocessor scheduling of processes with release times, deadlines, precedence, and exclusion relations," IEEE Trans. on Software Engineering, Vol. 19 (2), pp. 139-154.
11. (Xu 2003) Xu, J., 2003, "On inspection and verification of software with timing requirements," IEEE Trans. on Software Engineering, Vol. 29 (8), pp. 705-720.
12. (Xu, Parnas 1990) Xu, J. and Parnas, D. L., 1990, "Scheduling processes with release times, deadlines, precedence, and exclusion relations," IEEE Trans. on Software Engineering, Vol. 16 (3), pp. 360-369.
13. (Xu, Parnas 1993) Xu, J. and Parnas, D. L., 1993, "On Satisfying Timing Constraints in Hard-Real-Time Systems," IEEE Trans. on Software Engineering, Vol. 19 (1), pp. 1-17.
14. (Xu, Parnas 2000) Xu, J. and Parnas, D. L., 2000, "Fixed priority scheduling versus pre-run-time scheduling," Real-Time Systems, Vol. 18 (1), pp. 7-23.
15. (Xu 2009) Xu, J., 2019 J. Xu, "A Software Architecture for Handling Complex Critical Section Constraints on Multiprocessors in a Fault-Tolerant Real-Time Embedded System," 32nd *International Conference on Computer Applications in Industry and Engineering*, San Diego, USA, Sep. 30-Oct. 2, 2019.
16. (Gupta et al 2000) Gupta, I., Manimaran, G. and Siva Ram Murthy, C., 2000, "A new strategy for improving the effectiveness of resource reclaiming algorithms in multi-processor real-time systems." J. of Parallel and Distributed Computing, 60, pp. 113-133.
17. (Caccamo et al 2005) Caccamo, M., Buttazzo, G. C., and Thomas, D. C., 2005, 'Efficient reclaiming in reservation-based real-time systems with variable execution times," IEEE Tran. Computers, vol. 54, n. 2, pp. 198-213.
18. (Xu 2014) Xu, J., 2014, "A method for handling process overruns and underruns in real-time embedded systems," 10th IEEE/ASME International Conference on Mechatronic and Embedded Systems and Applications, Senigallia, Italy, on Sep. 10-12, 2014.

19. (Xu 2015) Xu, J., 2015, "Efficiently handling process overruns and underruns in real-time em-bedded systems." 11th ASME/IEEE Int. Conf. on Mechatronic and Embedded Systems and Applications, August 2015, Boston, USA.
20. (Laprie 1985) Laprie, J. C., 1985, "Dependable computing and fault tolerance: concepts and terminology." Proceedings of 15th International Symposium on Fault-Tolerant Computing (FTSC-15), pp. 2-11, 1985.
21. (Avizienis et al 2004) Avizienis, A., Laprie, J. C. Randell, B., and Landwehr C., 2004, "Basic concepts and taxonomy of dependable and secure Computing." IEEE Trans. on Dependable and Secure Computing, Vol. 1, No. 1, 2004.
22. (Han et al 2003) Han, C-C., Shin, K. G., and Wu, J., 2003, "A fault-tolerant scheduling algorithm for real-time periodic tasks with possible software faults." IEEE Trans. on Computers, Vol. 52, No. 3, March 2003.
23. (Lima et al 2003) Lima, G. M. D., and Burns, A., 2003, An optimal fixed-priority assignment algorithm for supporting fault-tolerant hard real-time systems." IEEE Trans. on Computers, Vol. 52, No. 10, October 2003.
24. (Manimaran et al 1998) Manimaran G., and Murphy, C. S. R., 1998, "A fault-tolerant dynamic scheduling algorithm for multiprocessor real-time systems and its analysis." IEEE Trans. Parallel and Distr. Sys., vol. 9, no. 11, November 1998.
25. (Liestman et al 1986) Liestman A. L., and Campbell, R. H, 1986, "A fault-tolerant scheduling problem." IEEE Trans. Software Eng., vol. 12, no. 11, November 1986.
26. (Chetto et al 1989) Chetto, H., and Chetto, M., 1989, "Some Results of the earliest deadline scheduling algorithm." IEEE Trans. Software Eng., vol. 15, no. 10, pp. 1261-1269, October 1989.
27. (Xu 2016) Xu, J., 2016, "A method for handling process overruns and underruns on multiprocessors in real-time embedded systems," 12th IEEE/ASME International Conference on Mechatronic and Embedded Systems and Applications, Auckland, New Zealand, on Aug. 29-31, 2016.
28. (Xu 2017) Xu, J., 2017, "Efficiently handling process overruns and underruns on multiprocessors in real-time embedded systems," 13th IEEE/ASME International Conference on Mechatronic and Embedded Systems and Applications, Cleveland, Ohio, USA, on Aug. 6-9, 2017.
29. (Krishna 2014) Krishna, C. M., 2014, "Fault-tolerant scheduling in homogeneous real-time systems," ACM Computing Surveys, vol. 46, no. 4, pp. 134, April 2014.
30. (Bertossi et al 1999) Bertossi, A. A., Mancini, L. V., and Rossini, F., 1999, "Fault-tolerant rate-monotonic first-fit scheduling in hard-real-time systems," IEEE Trans. Parallel and Distr. Sys., Vol. 10, No. 9, pp. 934-945, September 1999.
31. (Bertossi et al 2006) Bertossi, A. A., Mancini, L. V., and Menapace, A., 2006, "Scheduling hard-real-time tasks with backup phasing delay," IEEE Symp. on Distributed Simulation and Real-Time Applications (DS-RT), 2006.
32. (Krishna et al 1996) Krishna, C. M., and Shin, K. G., 1996, "Scheduling tasks with a quick recovery from failure," IEEE Trans. on Computer, vol. C-35, no. 5, May. 1986.
33. (Pradhan 1996) Pradhan, D. K., 1996, "Fault-Tolerant Computer System design," Prentice Hall, 1996.
34. (Siewiorek 1999) Siewiorek, D., and Swarz, R., 1999, "Reliable Computer Systems: Design and Evaluation," A. K. Peters, 1999.
35. (Koren at al 2007) Koren, I., and Krishna, C. M., 2007, "Fault-Tolerant Systems," Morgan-Kaufman, 2007.
36. (Xu 2018) Xu, J., 2018, "Handling process overruns and underruns on multiprocessors in a fault-tolerant real-time embedded system," 14th IEEE/ASME International Conference on Mechatronic and Embedded Systems and Applications, Oulu, Finland, Jul. 1-4, 2018.

In operation of a computer system, executions of certain periodically or asynchronously occurring real-time processes must be guaranteed to be completed before specified deadlines, and in addition satisfying various constraints and dependencies, such as release times, offsets, precedence relations, and exclusion relations on either a single processor or a multiprocessor.

Embedded, real-time systems with high assurance requirements often must execute many different types of real-time processes with complex timing and other constraints.

Some of the real-time processes may be periodic and some of them may be asynchronous.

Some of the real-time processes may have hard deadlines and some of them may have soft deadlines. For some of the real-time processes, especially the hard real-time processes, complete knowledge about their characteristics can and must be acquired before run-time. For other real-time processes, a prior knowledge of their worst case computation time and their data requirements may not be known.

Some real-time processes may have complex constraints and dependencies between them. For example, a real-time process may need to input data that are produced by other real-time processes. In this case, a real-time process may not be able to start before those other real-time processes are completed. Such constraints are referred to herein as precedence relations.

Exclusion relations may exist between real-time processes when some real-time processes must prevent simultaneous access to shared resources such as data and I/O devices by other real-time processes. For some periodic real-time processes, they may not be able to start immediately at the beginning of their periods. In this case, those real-time processes have release time constraints. For some periodic real-time processes, the beginning of their first period may not start immediately from time zero, that is, the system start time. In this case, those real-time processes have offset constraints.

Examples of such systems include plant control systems, aviation control systems, air traffic control systems, satellite control systems, communication systems, multimedia systems, on-line financial service systems, various embedded systems such as for automotive applications, etc.

Systems and methods related to scheduling executions of real-time processes can be broadly divided into two categories:

(a) systems and methods in which determination of the execution schedule of all the real-time processes is done entirely at run-time (on-line); and (b) systems and methods in which a latest-start-time scheduler computes a latest-start-time schedule for a substantial subset of the real-time processes by before run-time (off-line); then at run-time, a run-time scheduler uses information in the latest-start-time schedule together with information that is available at run-time, to schedule the execution of all the real-time processes.

As explained in the article "Fixed priority scheduling versus pre-run-time scheduling," by Xu, J. and Parnas, D. L., Real-Time Systems, Vol. 18 (1), pp. 7-23 (Xu, Parnas 2000), and the article "On inspection and verification of software with timing requirements," by Xu, J., IEEE Trans. on Software Engineering, Vol. 29 (8), pp. 705-720 (Xu 2003), systems and methods that perform all scheduling activities at run-time, have the following disadvantages:

(a) High run-time overhead due to scheduling and context switching;
(b) Difficulty in analyzing and predicting the run-time behavior of the system;
(c) Difficulty in handling various application constraints and real-time process dependencies;
(d) Low processor utilization.

In contrast to conventional approaches where most of the real-time processes are scheduled at run-time, with pre-run-time scheduling the schedule for most of the real-time processes is computed off-line; this approach requires that the major characteristics of the real-time processes in the system be known, or bounded, in advance. It is known that it is possible to use pre-run-time scheduling to schedule periodic real-time processes. One possible technique consists of computing off-line a latest-start-time schedule for the entire set of periodic real-time processes occurring within a time period that is equal to the least common multiple of the periods of the given set of real-time processes, then at run-time, let a run-time scheduler use information in the latest-start-time schedule together with information that is available at run-time, to schedule the real-time process executions.

In pre-run-time scheduling, several alternative schedules may be computed off-line for a given time period, each such schedule corresponding to a different "mode" of operation. A small run-time scheduler can be used to select among the alternative schedules according to information that is available at run-time. This small run-time scheduler can also be used to allocate resources for asynchronous real-time processes that have not been converted into periodic real-time processes.

It is possible to translate an asynchronous real-time process into an equivalent periodic real-time process, if the minimum time between two consecutive requests is known in advance, and the deadline is not too short. Thus it is also possible to schedule such asynchronous real-time processes using pre-run-time scheduling. See U.S. Pat. Nos. 7,444,638, and 7,165,252.

Systems and methods that compute a latest-start-time schedule before run-time, then at run-time, let a run-time scheduler use information in the latest-start-time schedule together with information that is available at run-time, to schedule the real-time process executions, have the following advantages:

(a) ability to effectively handle complex constraints and dependencies;
(b) lower run-time overhead;
(c) higher processor utilization; and
(d) ease of predicting the system's behaviour.

In the majority of real-time applications, the bulk of the processing is performed by periodic real-time processes for which the major characteristics of the real-time processes, including offsets, release times, worst-case execution times, deadlines, precedence and exclusion relations, and any other constraints, are known before run-time. For asynchronous real-time processes, generally their worst-case computation times, deadlines, and the minimum time between two consecutive requests (interarrival times) are known in advance. Asynchronous real-time processes normally are few in number, and often can be converted into new periodic real-time processes that can be used to service the corresponding asynchronous real-time process requests in a manner similar to polling. Thus it is not only possible, but highly desirable to compute a pre-run-time schedule for all the periodic real-time processes, including the new periodic real-time processes that are converted from some of the asynchronous real-time processes, before run-time, rather than completely relying on a run-time scheduler to schedule them at run-time.

For the real-time processes whose characteristics are known before run-time, such as periodic real-time processes, one may realize important advantages if a pre-run-time schedule is computed before run-time, instead of completely relying on a run-time scheduler to schedule them at run-time. This is because when scheduling is done before run-time, there is almost no limit on the running time of the scheduler, optimal scheduling methods can be used to maximize the possibility of finding a feasible schedule for the set of real-time processes to be scheduled and to handle complex constraints and dependencies. In contrast, when real-time processes are scheduled at run-time, the time available to the scheduler is very limited. This limits the ability of the scheduler to find a feasible schedule and to take into account the different types of constraints and knowledge about the system real-time processes. Once a pre-run-time schedule for the periodic real-time processes has been computed before run-time, the run-time scheduler can also use this information to schedule asynchronous real-time processes more efficiently.

Other reasons for computing a pre-run-time schedule before run-time include: this greatly reduces the run-time resource requirements needed for scheduling and context switching. With pre-run-time scheduling, it is possible to avoid using sophisticated run-time synchronization mechanisms by directly defining precedence relations and exclusion relations on pairs of real-time process segments to achieve real-time process synchronization and prevent simultaneous access to shared resources. Because the schedule is known in advance, automatic code optimization is possible; one can determine in advance the minimum amount of information that needs to be saved and restored, and one can switch processor execution from one real-time process to another real-time process through very simple mechanisms such as method calls, or simply by concatenating code when no context needs to be saved or restored, which greatly reduces the amount of run-time overhead.

When the use of sophisticated run-time synchronization mechanisms is avoided, the benefits are multi-fold: not only is the amount of run-time overhead reduced, but it is also much easier to analyze and predict the run-time behavior of the system. Compared with the complex schedulability analysis required when run-time synchronization mechanisms are used, it is much more straightforward to verify that all real-time processes will meet their deadlines and that all the additional application constraints will be satisfied in an off-line computed schedule.

There has long been an interest in systems and methods for the purpose of automating the process of pre-run-time scheduling, as described in the article by S. R. Faulk and D. L. Parnas "On Synchronization in Hard-Real-time Systems", Commun. ACM vol 31, pp. 274-287, March, 1988. Cyclic executives, a form of pre-run-time scheduling, have been used in safety critical systems, e.g. as described by G. D. Carlow in the article "Architecture of the Space Shuttle Primary Avionics Software System", Commun. ACM, September 1984. However, in the past, cyclic executives have mainly been constructed by hand, and are difficult to construct and maintain. Techniques for transforming an asynchronous real-time process into an equivalent periodic real-time process, as well as methods for solving the problem of scheduling real-time processes with release times, deadlines, exclusion and precedence relations are given in U.S. Pat. Nos. 7,444,638, and 7,165,252, and in nonpatent publications by J. Xu and D. Parnas see the articles (Xu, Parnas 1990) J. Xu and D. Parnas in "Scheduling Processes with Release Times, Deadlines, Precedence and Exclusion Relations", IEEE Trans. on Software Engineering, vol 16, pp 360-369, March 1990, by J. Xu and D. L. Parnas in "Pre-run-time Scheduling of Processes with Exclusion Relations on Nested or Overlapping Critical Sections", Proc. Eleventh Annual IEEE International Phoenix Conference on Computers and Communications, IPCCC-92, Scottsdale, Arizona, Apr. 1-3, 1992, (Xu 1993) J. Xu in "Multiprocessor Scheduling of Processes with Release Times, deadlines, Precedence and Exclusion Relations", IEEE Trans. on Software Engineering, vol 19, pp 139-154, February 1993, and (Xu, Parnas 1993) J. Xu and D. L. Parnas in "On Satisfying Timing Constraints in Hard-Real-Time Systems", IEEE Trans. on Software Engineering, vol 19, pp 1-17, January 1993, which are incorporated herein by reference.

Real-time embedded systems are used in many safety-critical and complex applications, such as the control of aircraft, automobiles, medical equipment, nuclear reactors and power distribution systems, and all kinds of industrial process control systems. Failures of such systems can have catastrophic consequences such as loss of human life, or massive economic loss. In such systems, a permanent hardware failure may happen when a processor stops functioning, while a permanent software failure may happen when a process produces an incorrect output, or fails to complete before the process deadline.

As discussed in the article by Krishna, C. M., 2014, "Fault-tolerant scheduling in homogeneous real-time systems," ACM Computing Surveys, vol. 46, no. 4, pp. 134, April 2014, the article by Bertossi, A. A., Mancini, L. V., and Rossini, F., 1999, "Fault-tolerant rate-monotonic first-fit scheduling in hard-real-time systems," IEEE Trans. Parallel and Distr. Sys., Vol. 10, No. 9, pp. 934-945, September 1999, the article by Bertossi, A. A., Mancini, L. V., and Menapace, A., 2006, "Scheduling hard-real-time tasks with backup phasing delay," IEEE Symp. on Distributed Simulation and Real-Time Applications (DS-RT), 2006, the book by Siewiorek, D., and Swarz, R., 1999, "Reliable Computer Systems: Design and Evaluation," A. K. Peters, 1999, in order to provide a real-time embedded system with the capability to tolerate a permanent hardware failure, one can provide two versions of programs for each real-time process: a primary and a backup, and assign every primary and backup that belongs to a same process to different processors, so that whenever a permanent hardware failure on one processor occurs, recovery from the permanent hardware failure can be achieved by abandoning the primaries and backups that were lost due to the permanent processor failure, and executing the corresponding backups and primaries that had been assigned to the different, surviving processors. Similarly, as discussed in the article by Bertossi, A. A., Mancini, L. V., and Menapace, A., 2006, "Scheduling hard-real-time tasks with backup phasing delay," IEEE Symp. on Distributed Simulation and Real-Time Applications (DS-RT), 2006, in the book by Koren, I., and Krishna, C. M., 2007, "Fault-Tolerant Systems," Morgan-Kaufman, 2007, the article by Krishna, C. M., and Shin, K. G., 1996, "Scheduling tasks with a quick recovery from failure," IEEE Trans. on Computer, vol. C-35, no. 5, May. 1986, the book by Pradhan, D. K., 1996, "Fault-Tolerant Computer System design," Prentice Hall, 1996, the capability to tolerate permanent software failures can be achieved by aborting the primary, and executing the backup whenever a permanent software failure occurs. As discussed in the article by Krishna, C. M., 2014, "Fault-tolerant scheduling in homogeneous real-time systems," ACM Computing Surveys, vol. 46, no. 4, pp. 134, April 2014, the backup is often carefully designed to be of less complexity than the primary, producing output of lower, but still acceptable, quality. This is because backups are only occasionally invoked; it impose lighter constraints on the scheduling algorithm if backups take less computation time; also a simpler implementation tends to be more reliable.

It is often difficult to estimate the worst-case computation times of real-time processes with sufficient precision during real-time and embedded system design. As discussed in the article by Stewart, D. B., and Khosla, 1997, "Mechanisms for detecting and handling timing errors," Communications of the ACM, vol. 40; and in the article by Caccamo, M., Buttazzo, G. C., and Thomas, D. C., 2005, "Efficient reclaiming in reservation-based real-time systems with variable execution times," IEEE Tran. Computers, vol. 54 (Caccamo et al 2005); low-level mechanisms in modern computer architecture, such as interrupts, DMA, pipelining, caching, and prefetching, can introduce nondeterministic behaviour in the computation time of real-time processes. As the complexity and scale of embedded system applications have increased dramatically in recent years, the demand for average-case performance enhancing technologies that have a corresponding negative impact on worst-case performance, such as larger and larger caches, have also increased. Real time and embedded systems have also become more dependent on sophisticated operating system support, while operating systems, under constant pressure to provide more and more new features and capabilities, have also become more and more complex. All these developments present significant challenges to determining the worst-case computation times of real-time processes with sufficient precision. If the actual computation time of a real-time process during run-time is less than the estimated worst-case computation time, an underrun will occur, which may result in under-utilization of system resources. However, if the actual computation time of a real-time process during run-time exceeds the estimated worst-case computation time, an overrun will occur, which may cause the real-time process to not only miss its own deadline, but also cause a cascade of other real-time processes to also miss their deadline, possibly resulting in total system failure.

The system and method in the present invention further increase system robustness and reliability in fault tolerant real-time embedded systems which provide two versions of each program, a primary and a backup and assign the primary and the backup to different processors, by using primary and backup latest start times to allow primaries or backups to overrun, both before, and after, any permanent processor failure, by effectively utilizing any spare processor capacity including any additional processor capacity created at run-time due to primary or backup underruns, or due to not needing to execute a backup anymore, which significantly increases the chances that a primary or backup may meet its deadline despite permanent hardware failures and permanent software failures, and despite overrunning. The system and method in the present invention also satisfies additional complex constraints defined on the primaries and backups such as precedence and exclusion relations.

Prior art related to handling underruns and overruns that presently appear relevant are listed in the previously provided tabulation of U.S. Patents, U.S. Patent Applications, and nonpatent publications.

In the article by Zhang, L., 2003, "Handling overruns and underruns in prerun-time scheduling in hard real-time systems," M. Sc. Thesis, York University, Toronto, Canada (Zhang, 2003), a method is presented that is not capable of handling exclusion relations or preemptions between tasks, because in Zhang, the slack time of a task is defined to be "the difference between its adjusted deadline and pre-computed finish time," and it assumes that each task, once started, should always be able to continuously execute for the duration of that task's entire worst-case execution time plus all of its slack time, right up to that task's adjusted deadline without being preempted by any other task. In Zhang it states that, " . . . we assume that there is no preemption in the pre-computed schedule, that is, every task is treated as an independent task without any relations between them. If task A is preempted by B, A is divided into two parts, . . . these are treated as separate tasks in our algorithm." This assumption in Zhang rules out the possibility of defining any exclusion relation between other tasks and A, and enforcing those exclusion relations at run-time; it also rules out the possibility of allowing the run-time scheduler to have the capability to allow tasks to preempt other tasks at any appropriate time at run-time. The latter capability is also very important and necessary because the preemption points at run-time will in general be different from the preemption points in the pre-run-time schedule, and allowing tasks to preempt other tasks at any appropriate time at run-time can allow tasks to have more room to overrun, thus increase the chances that real-time processes will be able to complete their computations, reduce the chances of system failure, and increase both system utilization and robustness.

Zhang does not compute latest start times for processes that can preempt other processes at arbitrary points in time. For example, Zhang is not capable of calculating task attributes, including latest start times, for the run-time preemption scenarios shown in Example 5 in this disclosure, In contrast Example 5 of this disclosure describe how embodiments allow tasks to preempt other tasks at any appropriate time.

The article by Shen, C., Ramamritham, K., and Stankovic, J. A., 1993, "Resource reclaiming in multiprocessor real-time systems," IEEE Tran. on Par. and Distr. Sys., vol. 4 (Shen et al, 1993), considers resource reclaiming, but do not consider overruns; furthermore, preemptions are not allowed. It also does not compute latest start times for uncompleted processes. The methods in the article by Caccamo, M., Buttazzo, G. C., and Thomas, D. C., 2005, "Efficient reclaiming in reservation-based real-time systems with variable execution times," IEEE Tran. Computers, vol. 54 (Caccamo et al, 2005); and the article by Lehoczky, J. P., Sha, L., and Strosnider, J. K., 1995, "The deferrable server algorithm for enhanced aperiodic responsiveness in hard real-time environments," IEEE Trans. On Computers, vol. 44, do not compute latest start times for uncompleted processes, do not consider latest-start-time schedules, or release times or precedence relations. The article by Sprunt, B., Sha, L., and Lehoczky, J. P., 1989, "Aperiodic process scheduling for hard real-time systems," Journal of Real-Time Systems, vol. 1, presents the Sporadic Server algorithm, which utilizes spare processor capacity to service sporadic processes, but does not compute latest start times for uncompleted processes, does not consider latest-start-time schedules, or release times or precedence relations. The article by Koren, G., and Shasha, D., 1995, "Dover: an optimal on-line scheduling algorithm for overloaded uniprocessor real-time systems," SIAM Journal on Computing, Vol. 24, presents an on-line scheduling algorithm for overloaded systems, but it does not compute latest start times for uncompleted processes, does not consider latest-start-time schedules, and the algorithm is only applicable to completely unrelated processes. The article by Lin, C., and Brandt, S. A., 2005, "Improving soft real-time performance through better slack reclaiming," Proc. 26th IEEE Real-Time Systems Symposium, introduces slack reclaiming algorithms, but does not compute latest start times for uncompleted processes, does not consider latest-start-time schedules; the algorithms only consider soft real-time processes, and do not guarantee that deadlines of real-time processes will not be missed.

None of the prior art, including
U.S. Pat. No. 8,321,065, to Kirchhof-Falter, U.S. Pat. No. 6,085,218, to Carmon, U.S. Pat. No. 7,613,595 to MacLay, U.S. Pat. No. 6,189,022 to Binns, U.S. Pat. No. to 7,302,685 to Binns, et al., U.S. Pat. No. 7,140,022 to Binns, U.S. Pat. No. 6,964,048 to Isham, U.S. Patent Application No. 20020138542 by Bollella, U.S. Patent Application No. 20090013322 by MacLay, U.S. Patent Application No. 20060200795 by MacLay; consider using a latest-start-time schedule. Furthermore, none of them are capable of simultaneously satisfying various important constraints and dependencies, such as release times, offsets, precedence relations, and exclusion relations with other real-time processes, while effectively handling underruns and overruns.

Prior art on reclaiming resources on multiprocessors, such as the article by Shen, C., Ramamritham, K., and Stankovic, J. A., 1993, "Resource reclaiming in multiprocessor real-time systems," IEEE Tran. on Par. and Distr. Sys., vol. 4, n. 4, pp. 382-397 (Shen et al 1993), and the article by Gupta, I., Manimaran, G. and Siva Ram Murthy, C., 2000, "A new strategy for improving the effectiveness of resource reclaiming algorithms in multiprocessor real-time systems." J. of Parallel and Distributed Computing, 60, pp. 113-133 (Gupta et al 2000), assume that each process can only execute nonpreemptively on one processor. In comparison, in the system and method presented in this application, multiple processor resources are effectively utilized: real-time process executions can be selectively preempted by other real-time process executions to provide greater flexibility in meeting deadlines.

As mentioned earlier, using primaries and backups in a real-time system has been discussed by others in the article by Krishna, C. M., 2014, "Fault-tolerant scheduling in homogeneous real-time systems," ACM Computing Surveys, vol. 46, no. 4, pp. 134, April 2014, the article by Bertossi, A. A., Mancini, L. V., and Rossini, F., 1999, "Fault-tolerant rate-monotonic first-fit scheduling in hard-real-time systems," IEEE Trans.

Parallel and Distr. Sys., Vol. 10, No. 9, pp. 934-945, September 1999, the article by Bertossi, A. A., Mancini, L. V., and Menapace, A., 2006, "Scheduling hard-real-time tasks with backup phasing delay," IEEE Symp. on Distributed Simulation and Real-Time Applications (DS-RT), 2006, the book by Siewiorek, D., and Swarz, R., 1999, "Reliable Computer Systems: Design and Evaluation," A. K. Peters, 1999, and in the article by Bertossi, A. A., Mancini, L. V., and Menapace, A., 2006, "Scheduling hard-real-time tasks with backup phasing delay," IEEE Symp. on Distributed Simulation and Real-Time Applications (DS-RT), 2006, in the book by Koren, I., and Krishna, C. M., 2007, "Fault-Tolerant Systems," Morgan-Kaufman, 2007, the article by Krishna, C. M., and Shin, K. G., 1996, "Scheduling tasks with a quick recovery from failure," IEEE Trans. on Computer, vol. C-35, no. 5, May. 1986, the book by Pradhan, D. K., 1996, "Fault-Tolerant Computer System design," Prentice Hall, 1996; while handling underruns and overruns has been discussed by others in the article by Zhang, L., 2003, "Handling overruns and underruns in prerun-time scheduling in hard real-time systems," M. Sc. Thesis, York University, Toronto, Canada (Zhang, 2003), the article by Shen, C., Ramamritham, K., and Stankovic, J. A., 1993, "Resource reclaiming in multiprocessor real-time systems," IEEE Tran. on Par. and Distr. Sys., vol. 4 (Shen et al, 1993), in the article by Caccamo, M., Buttazzo, G. C., and Thomas, D. C., 2005, "Efficient reclaiming in reservation-based real-time systems with variable execution times," IEEE Tran. Computers, vol. 54 (Caccamo et al, 2005); and the article by Lehoczky, J. P., Sha, L., and Strosnider, J. K., 1995, "The deferrable server algorithm for enhanced aperiodic responsiveness in hard real-time environments," IEEE Trans. On Computers, vol. 44, the article by Sprunt, B., Sha, L., and Lehoczky, J. P., 1989, "Aperiodic process scheduling for hard real-time systems," Journal of Real-Time Systems, vol. 1, the article by Koren, G., and Shasha, D., 1995, "Dover: an optimal on-line scheduling algorithm for overloaded uniprocessor real-time systems," SIAM Journal on Computing, Vol. 24, the article by Lin, C., and Brandt, S. A., 2005, "Improving soft real-time performance through better slack reclaiming," Proc. 26th IEEE Real-Time Systems Symposium, the article by Gupta, I., Manimaran, G. and Siva Ram Murthy, C., 2000, in the article by Stewart, D. B., and Khosla, 1997, "Mechanisms for detecting and handling timing errors," Communications of the ACM, vol. 40, no. 1, pp. 87-90; and by this inventor in prior application Ser. No. 15/669,898, filed Oct. 6, 2017, now U.S. Pat. No. 10,552, 215 B1, prior application Ser. No. 14/451,420, filed Aug. 4, 2014, now U.S. Pat. No. 9,753,772 B2, in the article by J. Xu, "A Software Architecture for Handling Complex Critical Section Constraints on Multiprocessors in a Fault-Tolerant Real-Time Embedded System," 32nd International Conference on Computer Applications in Industry and Engineering, San Diego, USA, Sep. 30-Oct. 2, 2019, in the article Xu, J., 2018, "Handling process overruns and underruns on multiprocessors in a fault-tolerant real-time embedded system," 14th IEEE/ASME International Conference on Mechatronic and Embedded Systems and Applications, Oulu, Finland, Jul. 1-4, 2018, in the article by Xu, J., 2017, "Efficiently handling process overruns and underruns on multiprocessors in real-time embedded systems," 13th IEEE/ASME International Conference on Mechatronic and Embedded Systems and Applications, Cleveland, Ohio, USA, on Aug. 6-9, 2017, in the article by Xu, J., 2016, "A method for handling process overruns and underruns on multiprocessors in real-time embedded systems," 12th IEEE/ASME International Conference on Mechatronic and Embedded Systems and Applications, Auckland, New Zealand, on Aug. 29-31, 2016, in the article by Xu, J., 2015, "Efficiently handling process overruns and underruns in real-time em-bedded systems." 11th ASME/IEEE Int. Conf. on Mechatronic and Embedded Systems and Applications, August 2015, Boston, USA, in the article by Xu, J., 2014, "A method for handling process overruns and underruns in real-time embedded systems," 10th IEEE/ASME International Conference on Mechatronic and Embedded Systems and Applications, Senigallia, Italy, on Sep. 10-12, 2014, in the article by Xu, J., 2013, "Handling overruns and underruns of real-time processes with precedence and exclusion relations using a pre-run-time schedule," 9th ASME/IEEE International Conference on Mechatronic and Embedded Systems and Applications, Portland, Oregon, Aug. 4-7, 2013.

A significant contribution of the present invention, is that, to our knowledge, this is the first time that a system and method has been devised that is capable of using primary and backup latest start times to effectively handle primary and backup overruns and underruns both before, and after, a permanent processor failure, in a real-time embedded system that tolerates both permanent hardware failures and permanent software failures, while also satisfying additional complex constraints defined on the primaries and backups such as precedence and exclusion relations. None of the earlier work, including other peoples' work, and this inventor's earlier work mentioned above, include the methods and strategies presented in the present invention which significantly increase the chances that a primary or backup will meet its deadline despite permanent hardware failures and permanent software failures, and despite overrunning, both before, and after, a permanent processor failure.

SUMMARY

An embodiment providing a system and method which tolerates both permanent processor failures and permanent software failures by scheduling a primary and a separate backup on different processors for every real-time process, while further increasing system robustness and reliability, by using primary and backup latest start times to allow primaries or backups to overrun, both before, and after, any permanent processor failure, by effectively utilizing any spare processor capacity including any additional processor capacity created at run-time due to primary or backup underruns, or due to not needing to execute a backup anymore, which significantly increases the chances that a primary or backup may meet its deadline despite permanent hardware failures and permanent software failures, and despite overrunning, while also satisfying additional complex constraints defined on the primaries and backups such as precedence and exclusion relations, in a fault tolerant real-time embedded system.

An embodiment providing a system and method which tolerates both permanent processor failures and permanent software failures, by computing a "latest start time" $LS(p_P)$ for every uncompleted primary $p_P$ and a "latest start time" $LS(p_B)$ for every backup $p_B$ that has not overrun for each process p on a multiprocessor, in which each primary $p_jP$ and each backup $p_jB$ of a same process $p_j$ are not allowed to be scheduled on a same processor, before and/or during, run-time, which satisfies the following properties:

(1) Every primary $p_P$ and every backup $p_B$ on any surviving processor is guaranteed to be able to start execution on or before its respective latest start time $LS(p_P)$ or $LS(p_B)$;

(2) Every primary $p_P$ and every backup $p_B$ on any surviving processor which starts execution on or before its respective latest start time $LS(p_P)$, and does not fault or overrun, is guaranteed to complete its computation on or before its process deadline d(p);

(3) If any primary $p_P$ or any backup $p_B$ on any surviving processor overruns, that is, does not complete after executing for a number of time units equal to its worst-case computation time, then that primary or backup can continue to execute, as long as no other primary or backup with an earlier deadline is prevented from starting on or before its latest start time, while guaranteeing that every other primary $p_{i_P}$ and every other backup $p_{i_B}$ will still be able to:

(3a) start execution on or before their respective latest start times $LS(p_{i_P})$ or $LS(p_{i_B})$;

(3b) complete their computations on or before their respective deadlines d(pip) or $d(p_{i_B})$ as long as they do not fault or overrun.

Thus this method is able to efficiently utilize any spare capacity in the system, including any spare capacity created at run-time due to primary or backup underruns, or due to not needing to execute a backup any more, in order to increase the chances that either the primary or the backup of each process will be able to successfully complete its computation before its deadline, even after a processor failure has occurred.

An embodiment providing a system and method which computes a "feasible-pre-run-time schedule $S_O$ in which each primary $p_jP$ and each backup $p_jB$ of a same process $p_j$ are not allowed to be scheduled on a same processor' on a multiprocessor, for a set of uncompleted periodic processes P, in order to tolerate hardware failure of a single processor, and in which arbitrary release time and deadline constraints defined on the processes in P, and arbitrary PRECEDES and EXCLUDES relations defined on ordered pairs of processes in P, are satisfied.

An embodiment providing a system and method which, both before, and after, any permanent processor failure, computes a "latest-start-time schedule" $S_L$ and latest-start-times for all the surviving primaries and all the backups $p_{PB}$ that have not overrun and have not been abandoned in a set of uncompleted periodic processes P, in which each primary $p_jP$ and each backup $p_jB$ of a same process $p_j$ are not allowed to be scheduled on a same processor if there exists more than one surviving processor", by scheduling all the primaries and all the backups $p_{PB}$ in each process p that have not overrun and have not been abandoned in a set of uncompleted periodic processes P, starting from time t equal to the latest deadline among all the primaries and all the backups $p_{PB}$ in P, that is, t=max $\{d_p | \forall p_{PB} \in P\}$, in reverse time order, using a "Latest-Release-Time-First" scheduling strategy that is equivalent to a reverse application of the well known Earliest-Deadline-First strategy, which satisfies arbitrary release time and deadline constraints defined on the processes in P, and arbitrary PRECEDES and EXCLUDES relations defined on ordered pairs of processes in P.

An embodiment providing a system and method which, both before, and after, any permanent processor failure, computes a "latest-start-time schedule" $S_L$ and latest-start-times for all the surviving primaries and all the backups $p_{PB}$ that have not overrun and have not been abandoned in a set of uncompleted periodic processes P, in which each primary $p_jP$ and each backup $p_jB$ of a same process $p_j$ are not allowed to be scheduled on a same processor if there exists more than one surviving processor", and uses the primary and backup latest start times to allow surviving primaries or backups to overrun, both before, and after, any permanent processor failure, by effectively utilizing any spare processor capacity including any additional processor capacity created at run-time due to primary or backup underruns, or due to not needing to execute a backup anymore, while also satisfying additional complex constraints defined on the primaries and backups such as precedence and exclusion relations. The run-time scheduler is invoked to perform a scheduling action during the following main situations:

(a) At a time t when a permanent processor failure has occurred.

(b) At a time t when some primary $p_P$ or backup $p_B$ has just completed its computation.

(c) At a time t that is equal to the latest start time $LS(p_P)$ of some primary $p_P$ or the latest start time $LS(p_B)$ of some backup $p_B$.

(d) At a time t that is equal to the release time $R_{p_k}$ of some process $p_k$.

(e) At a time t that is equal to the deadline $d_{p_i}$ of an uncompleted process $p_i$. In this case, $p_i$ has just missed its deadline, and the system should handle the error.

(f) At a time t when some primary $p_P$ generates a fault, in which case the corresponding backup $p_B$ will be activated, and the primary $p_P$ will be aborted.

(g) At a time t when some backup $p_B$ generates a fault, and the system should handle the error.

Let t be the current time.

Step 0. In situation (a) above, when a permanent processor failure has occurred, each primary $p_{i_P}$ that was previously scheduled to execute on the failed processor will be abandoned, and the existing corresponding backup $p_{i_B}$ on a surviving processor will be activated for recovery: let ActivationTime($p_{i_B}$)=t. Each backup $p_{j_B}$ that was previously scheduled to execute on the failed processor will be abandoned, and the corresponding surviving primary $p_{i_P}$ on a surviving processor will be activated for recovery: let ActivationTime($p_{i_P}$)=t.

After a permanent processor failure, we call any primary pip for which the corresponding backup $p_{i_B}$ was previously scheduled before run-time on the permanently failed processor, a "surviving primary", and denote it as "$p_{i_{P'}}$". Any surviving primary $p_{i_{P'}}$ will have the same deadline that its corresponding backup $p_{i_B}$ had on the permanently failed processor, when re-computing latest start times, and when the run-time scheduler selects primaries and backups for execution on each surviving processor at run-time. Any surviving primary $p_{i_{P'}}$ will be given the same priority as a backup when the run-time scheduler selects primaries and backups for execution on each surviving processor at run-time.

Recompute the latest start times for the primaries and backups on each surviving processor.

In situation (e) above, check whether any process p has missed its deadline $d_p$. If so perform error handling.

In situation (g) above, check whether any backup $p_B$ has generated a fault. If so perform error handling.

Step 1. In situation (f) above, if a primary $p_P$ generates a permanent software failure, then the primary $p_P$ will be aborted, and the corresponding backup $p_B$ will be activated; let ActivationTime($p_B$)=t.

Step 2. Whenever the run-time scheduler is invoked due to any of the situations (b), (c) and (d) above at time t, do the following:

In situation (c) above, if the latest start time of a backup $p_B$ has been reached, that is, $LS(p_B)$=t, then the primary $p_P$ will be aborted, and the corresponding backup $p_B$ will be activated; let ActivationTime($p_B$)=t.

Any primary $p_P$ or backup $p_B$ that was previously executing at time t−1 but has either completed or has overrun at time t will be removed from the latest start time schedule.

Step 3. If any primary $p_P$ has reached its latest start time $LS(p_P)$ at time t, but was not selected to execute on any processor at time t, then abort primary $p_P$ and activate its corresponding backup $p_B$ at time t; let ActivationTime($p_B$)=t.

Recompute the latest start time $LS(p_P)$ or $LS(p_B)$ for each uncompleted primary $p_P$ or backup $p_B$ that was executing at time t−1 and has not overrun at time t. Note that once the initial latest start times have been computed before run-time, at run-time the run-time overhead can be significantly reduced by only recomputing the latest start time $LS(p_P)$ or $LS(p_B)$ for each uncompleted primary $p_P$ or backup $p_B$ that had just been preempted that was executing at time t−1 using the method described in the article by Xu, J., 2017, "Efficiently handling process overruns and underruns on multi-processors in real-time embedded systems," 13th IEEE/ASME International Conference on Mechatronic and Embedded Systems and Applications, Cleveland, Ohio, USA, on Aug. 6-9, 2017.

Run-Time Scheduler Method: Before and after a permanent processor failure, the run-time scheduler method selects primaries and backups for execution on each surviving processor $m_q$ at run-time in the following priority order:

Priority 0 Tasks: The highest priority is given to any backup $p_B$ or any surviving primary $p_{i_{P'}}$, such that the latest start time of $p_B$ or $p_{i_{P'}}$ has been reached, that is, $LS(p_B)=t$ or $LS(p_{i_{P'}})=t$; or any backup $p_B$ or any surviving primary $p_{i_{P'}}$ such that $p_B$ has been activated or $p_{i_{P'}}$ has been activated; and has the earliest adjusted deadline $d'(p_B)$ or $d'(p_{i_{P'}})$ among all such tasks on $m_q$ that are ready and have not completed at time t. This is because successful completion of backup $p_B$ before its adjusted deadline $d'(p_B)$ or surviving primary $p_{i_{P'}}$ before its adjusted deadline $d'(p_{i_{P'}})$, is considered to be the "last chance to avoid failure of the task/process" p or $p_i$, and potentially, the "last chance to avoid failure of the entire system."

Priority 1 Tasks: The next highest priority is given to any primary $p_P$ such that the latest start time of primary $p_P$ has been reached, that is, $LS(p_P)=t$, and $p_P$ has the earliest adjusted deadline $d'_{pP}$ among all such tasks on $m_q$ that are ready at time t.

Priority 2 Tasks: The next highest priority is given to any primary $p_P$ such that $p_P$ is ready at time t and $p_P$ has the earliest adjusted deadline $d'_{pP}$ among all such tasks on $m_q$ that are ready at time t.

Step 4. At time 0 and after servicing each timer interrupt, and performing necessary error detection, error handling, latest start time re-calculations, and making scheduling decisions; —reset the timer to interrupt at the earliest time that any of the events (c), (d), and (e) above may occur.

Step 5. Let the primaries $p_P$ or backups $p_B$ that were selected in Step 3 start to execute at run-time t.

According to yet another embodiment of the present invention, Before and after a permanent processor failure, primaries and backups are selected for execution on each surviving processor $m_q$ at run-time in the following priority order:

Priority 0 Tasks: The highest priority is given to any backup $p_B$ or any surviving primary $p_{i_{P'}}$, such that the latest start time of $p_B$ or $p_{i_{P'}}$ has been reached, that is, $LS(p_B)=t$ or $LS(p_{i_{P'}})=t$; or any backup $p_B$ or any surviving primary $p_{i_{P'}}$ such that $p_B$ has been activated or $p_{i_{P'}}$ has been activated; and has the earliest adjusted deadline $d'(p_B)$ or $d'(p_{i_{P'}})$ among all such tasks on $m_q$ that are ready and have not completed at time t. This is because successful completion of backup $p_B$ before its adjusted deadline $d'(p_B)$ or surviving primary $p_{i_{P'}}$ before its adjusted deadline $d'(p_{i_{P'}})$, is considered to be the "last chance to avoid failure of the task/process" p or $p_i$, and potentially, the "last chance to avoid failure of the entire system."

Priority 1 Tasks: The next highest priority is given to any primary $p_P$ such that the latest start time of primary $p_P$ has been reached, that is, $LS(p_P)=t$, and $p_P$ has the earliest adjusted deadline $d'_{pP}$ among all such tasks on $m_q$ that are ready at time t.

Priority 2 Tasks: The next highest priority is given to any primary $p_P$ such that $p_P$ is ready at time t and $p_P$ has the earliest adjusted deadline $d'_{pP}$ among all such tasks on $m_q$ that are ready at time t.

According to yet another embodiment of the present invention, a system and method for tolerating permanent processor failures and permanent software failures, at a time t when a permanent processor failure has occurred, each primary $p_{i_P}$ that was previously scheduled to execute on the failed processor will be abandoned, and the existing corresponding backup $p_{i_B}$ on a surviving processor will be activated for recovery: let ActivationTime($p_{i_B}$)=t. Each backup $p_{j_B}$ that was previously scheduled to execute on the failed processor will be abandoned, and the corresponding surviving primary $p_{i_{P'}}$ on a surviving processor will be activated for recovery: let ActivationTime($p_{i_{P'}}$)=t.

Any surviving primary $p_{i_{P'}}$, for which the corresponding backup $p_{i_B}$ was previously scheduled before run-time on the permanently failed processor, will have the same deadline that its corresponding backup $p_{i_B}$ had on the permanently failed processor, when re-computing latest start times, and when the run-time scheduler selects primaries and backups for execution on each surviving processor at run-time. Any surviving primary $p_{i_{P'}}$ will be given the same priority as a backup when the run-time scheduler selects primaries and backups for execution on each surviving processor at run-time.

According to yet another embodiment of the present invention, a system and method for tolerating permanent processor failures and permanent software failures, at a time t when a permanent processor failure has occurred, each primary $p_{i_P}$ that was previously scheduled to execute on the failed processor will be abandoned, and the existing corresponding backup $p_{i_B}$ on a surviving processor will be activated for recovery: let ActivationTime($p_{i_B}$)=t.

For each backup $p_{j_B}$ that was previously scheduled to execute on the failed processor, if there exists a feasible schedule in which all timing constraints are satisfied for that same backup $p_{j_B}$ together with all other surviving primaries and backups that are used for recovery on the surviving processor m, when that same backup $p_{j_B}$ is used to replace the corresponding primary $p_{j_P}$ on the surviving processor m for recovery, then use that same backup $p_{j_B}$ to replace the corresponding primary $p_{j_P}$ on the surviving processor m for recovery; otherwise use the corresponding existing primary $p_{j_P}$ on a surviving processor for recovery. In the latter case, when an existing primary $p_{j_P}$ on a surviving processor is used for recovery, then $p_{j_P}$ will be called a "surviving primary" and denoted as $p_{j_{P'}}$. Let ActivationTime($p_{j_{P'}}$)=t, and let surviving primary $p_{i_{P'}}$, for which the corresponding backup $p_{i_B}$ was previously scheduled before run-time on the permanently failed processor, have the same deadline that its corresponding backup $p_{i_B}$ had on the permanently failed processor, when re-computing latest start times, and when the run-time scheduler selects primaries and backups for execution on each surviving processor at run-time.

Any surviving primary $p_{i_{P'}}$ will be given the same priority as a backup when the run-time scheduler selects primaries and backups for execution on each surviving processor at run-time.

According to yet another embodiment of the present invention, it is also possible to employ an alternative system and method which, before and after a permanent processor failure, assigns different relative priorities to different primary-backup pairs based on the specific characteristics of each backup and primary when selecting primaries and backups for execution on the surviving processors at run-time.

ADVANTAGES

An embodiment providing a system and method which tolerates both permanent processor failures and permanent software failures by scheduling a primary and a separate backup on different processors for every real-time process, while further increasing system robustness and reliability, by using primary and backup latest start times to allow primaries or backups to overrun, both before, and after, any permanent processor failure, by effectively utilizing any spare processor capacity including any additional processor capacity created at run-time due to primary or backup underruns, or due to not needing to execute a backup anymore, which significantly increases the chances that a primary or backup may meet its deadline despite permanent hardware failures and permanent software failures, and despite overrunning, while also satisfying additional complex constraints defined on the primaries and backups such as precedence and exclusion relations, in a fault tolerant real-time embedded system.

In accordance with another embodiment, a system and methods a system and method which tolerates both permanent processor failures and permanent software failures by scheduling a primary and a separate backup on different processors for every real-time process, while further increasing system robustness and reliability, both before, and after, any permanent processor failure, by creating a plurality of different latest-start-time schedules for real-time process primaries and backups on either a single processor or a multiprocessor with different characteristics and different advantages, and using the information in the latest-start-time schedule to schedule the executions of real-time process primaries and backups with constraints and dependencies, such as offsets, release times, precedence relations, and exclusion relations, exploiting to a maximum extent any knowledge about real-time process primaries and backups characteristics that are available to the scheduler both before run-time and during run-time, and both before, and after, any permanent processor failure, and in which multiple processor resources are effectively utilized: real-time process primaries and backups executions can be selectively preempted by other real-time process primaries and backups executions to provide greater flexibility in utilizing any unused processor capacity and meeting deadlines. This allows the scheduler to, both before, and after, any permanent processor failure, on either a single processor or a multiprocessor:

(a) effectively handle complex application constraints and dependencies between the real-time process primaries and backups;
(b) minimize run-time overhead;
(c) make the most efficient use of available processor capacity;
(d) maximize the chances of satisfying all the timing constraints;
(e) provide firm and tight response time guarantees for all the real-time process primaries and backups whose characteristics are known before run-time;
(f) make it easier to verify that all timing constraints and dependencies of all the real-time process primaries and backups will always be satisfied.

In accordance with another embodiment, the following advantages are achieved: both before, and after, any permanent processor failure (a) real-time process primaries and backups do not need to be interrupted as soon as they overrun on either a single processor or a multiprocessor. Instead, the only times at which a real-time process primary or backup is interrupted is when its deadline has expired, or when the latest start time of another real-time process primary or backup has been reached.
(b) thus real-time process primaries and backups which overrun, are able to utilize any spare processor capacity in the system on either a single processor or a multiprocessor, including any additional unused processor capacity made available at run-time by real-time process primaries and backups underruns, to maximize their chances of still meeting deadlines despite overrunning.
(c) the most complex scheduling decisions, such as the overall order in which real-time process primaries and backups are to be executed on either a single processor or a multiprocessor, are made before run-time, thus better algorithms can be used to take advantage of known real-time process primaries and backups characteristics, handle more complex constraints, and achieve higher schedulability.
(d) it is possible to avoid the use of complicated single processor or multiprocessor run-time synchronization mechanisms in which deadlocks or starvation can happen, and for which it is often extremely difficult to obtain reasonable and accurate execution time bounds. Thus the system and method makes it much easier to verify the system timing properties, both before, and after, any permanent processor failure in a single processor or multiprocessor real-time system.

DRAWINGS—FIGURES

FIG. 1 is a flowchart diagram showing an embodiment of a method which computes a "feasible-pre-run-time schedule in which each primary $p_jP$ and each backup $p_jB$ of a same process $p_j$ are not allowed to be scheduled on a same processor" $S_O$ on a multiprocessor, for a set of uncompleted periodic processes P, in order to tolerate hardware failure of a single processor, and in which arbitrary PRECEDES and EXCLUDES relations defined on ordered pairs of processes in P are satisfied.

FIGS. 2A and 2B are flowchart diagrams showing an embodiment of a method which, when given an original feasible pre-run-time schedule in which each primary $p_jP$ and each backup $p_jB$ of a same process $p_j$ are not allowed to be scheduled on a same processor $S_O$, computes a latest-start-time schedule $S_L$ in which each primary $p_jP$ and each backup $p_jB$ of a same process $p_j$ are not allowed to be scheduled on a same processor, by scheduling all the primaries and all the backups $p_{PB}$ in each process p in P starting from time t equal to the latest deadline among all the primaries and all the backups $p_{PB}$ in P, that is, t=max $\{d_p|\forall p_{PB}\in P\}$, in reverse time order, using a "Latest-Release-Time-First" scheduling strategy that is equivalent to a reverse application of the well known Earliest-Deadline-First strategy, which satisfies all the PREC relations.

FIGS. 3A, 3B and 3C are flowchart diagrams showing an embodiment of a run-time scheduler method for selecting primaries and backups for execution on a single processor or a multiprocessor at run-time, in which each primary $p_jP$ and each backup $p_jB$ of a same process $p_j$ are not allowed to be scheduled on a same processor, both before, and after, any permanent processor failure.

FIGS. 4A, 4B, 4C, and 4D are flowchart diagrams showing a first illustrative embodiment of a main run-time scheduler method for scheduling primaries and backups for execution on either a single processor or a multiprocessor at run-time both before, and after, any permanent processor failure, in which each primary $p_jP$ and each backup $p_jB$ of a same process $p_j$ are not allowed to be executed on a same processor.

Figure 5A:
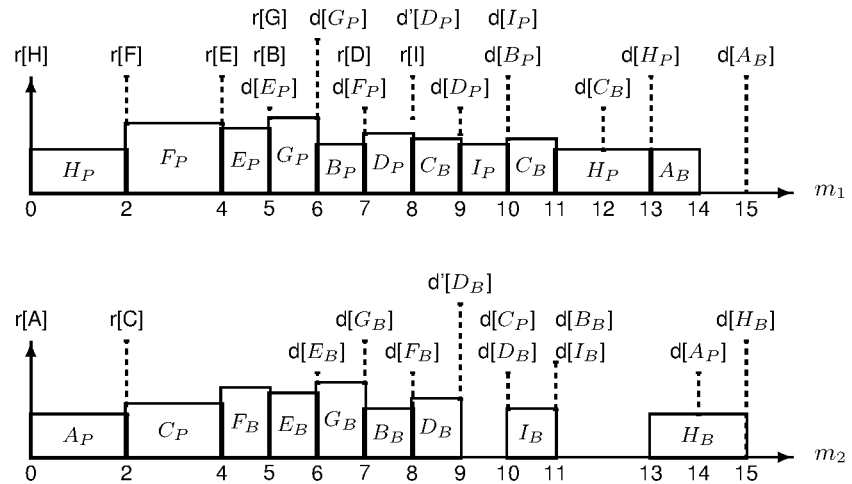
FIG. 5A shows an original feasible pre-run-time schedule on two processors for the primaries and/or backups in the real-time processes A, B, C, D, E, F, G, H, I in Example 1 in which each primary $p_jP$ and each backup $p_jB$ of a same process $p_j$ are not allowed to be scheduled on a same processor.
Figure 5B:
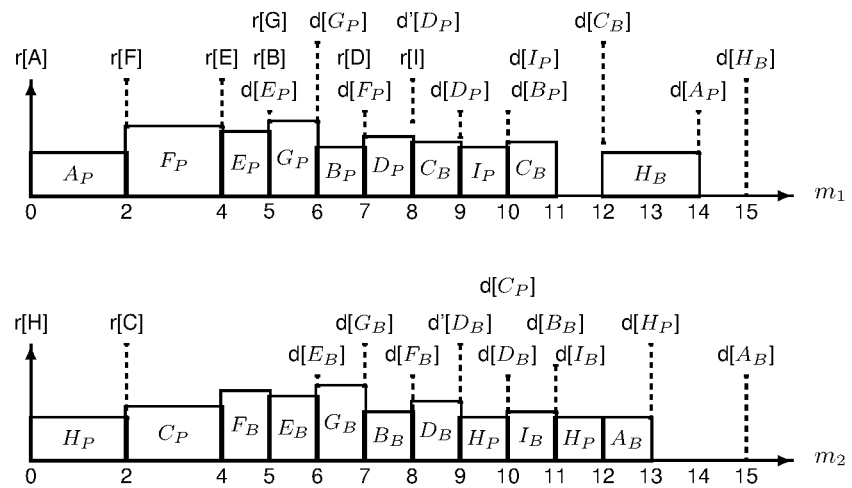
FIG. 5B shows an improved feasible pre-run-time schedule on two processors for the primaries and/or backups in the real-time processes A, B, C, D, E, F, G, H, I in Example 2 in which each primary $p_jP$ and each backup $p_jB$ of a same process $p_j$ are not allowed to be scheduled on a same processor.
Figure 5C:
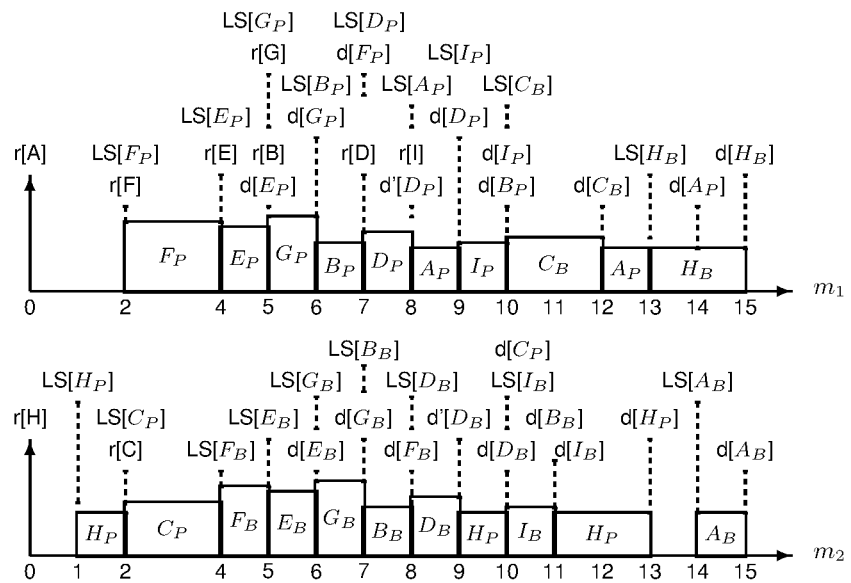

FIG. 5C shows an initial latest-start-time schedule and the latest start times and end times for the primaries and/or backups in the real-time processes A, B, C, D, E, F, G, H, I on two processors in which each primary $p_jP$ and each backup $p_jB$ of a same process $p_j$ are not allowed to be scheduled on a same processor, computed off-line from the improved feasible pre-run-time schedule in FIG. 5B. The initial latest-start-time schedule and the latest start times and end times on two processors for the set of real-time processes are computed off-line by the method from the improved feasible pre-run-time schedule, and will be used at run-time t=0, and at the beginning of each Least Common Multiple of the real-time process periods in Example 4.

Figure 5D:
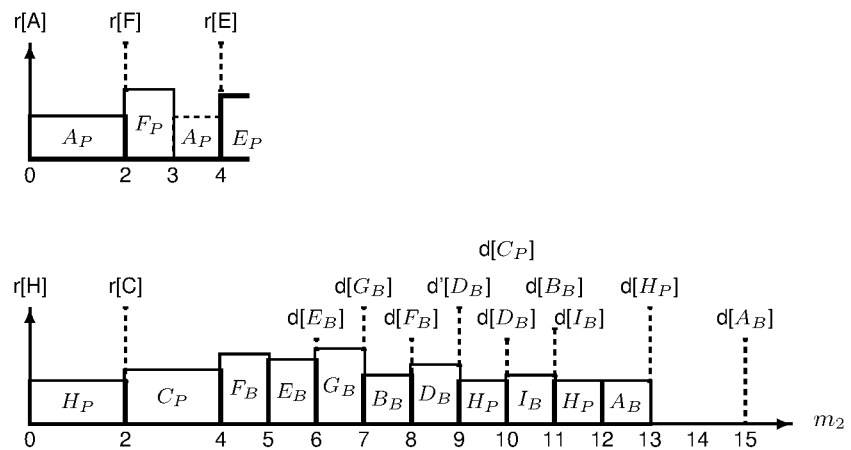

FIG. 5D shows a timing diagram of a possible run-time execution of the primaries and/or backups in the real-time processes A, B, C, D, E, F, G, H, I on two processors in which each primary $p_jP$ and each backup $p_jB$ of a same process $p_j$ are not allowed to be scheduled on a same processor, using the latest-start-time schedule and the latest start times and end times in FIGS. 5C, 5E, 5F, 5G, 5H, 5I, 5J, 5K, 5L, 5M, 5N and 5O in Example 4, both before, and after, a permanent failure of processor $m_1$.

Figure 5E:
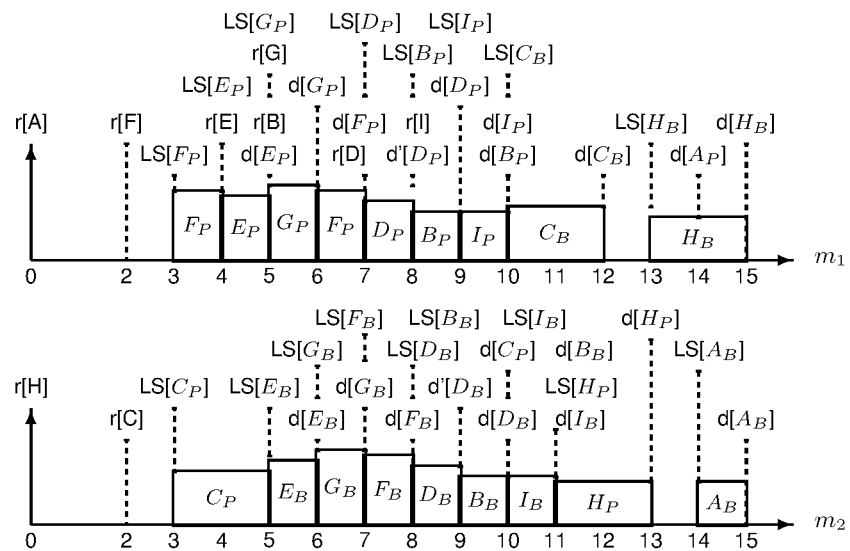

FIG. 5E shows examples of a latest-start-time schedule and the latest start times and end times for primaries and/or backups in the real-time processes A, B, C, D, E, F, G, H, I on two processors in which each primary $p_jP$ and each backup $p_jB$ of a same process $p_j$ are not allowed to be scheduled on a same processor, computed at run-time t=2 in Example 4 before a permanent processor failure.

Figure 5F:
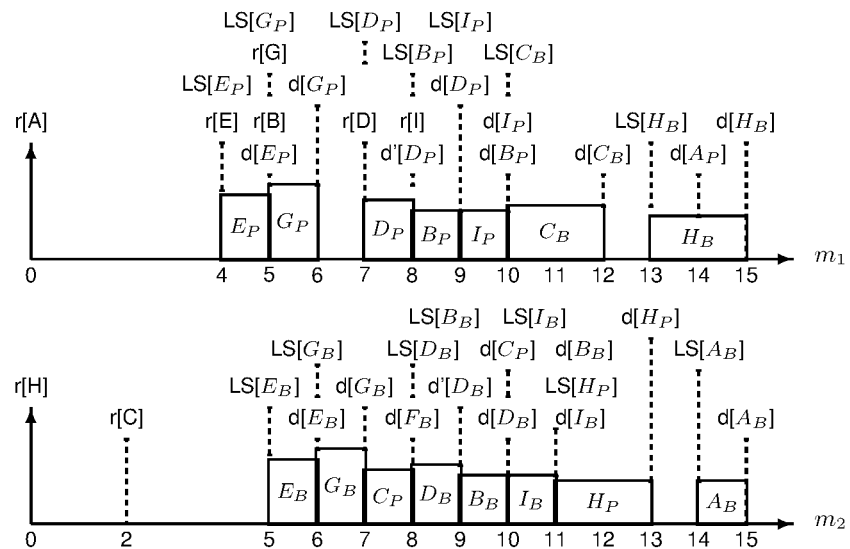

FIG. 5F shows examples of a latest-start-time schedule and the latest start times and end times for primaries and/or backups in the real-time processes A, B, C, D, E, F, G, H, I on two processors in which each primary $p_jP$ and each backup $p_jB$ of a same process $p_j$ are not allowed to be scheduled on a same processor, computed at run-time t=3 in Example 4 before a permanent processor failure.

Figure 5G:
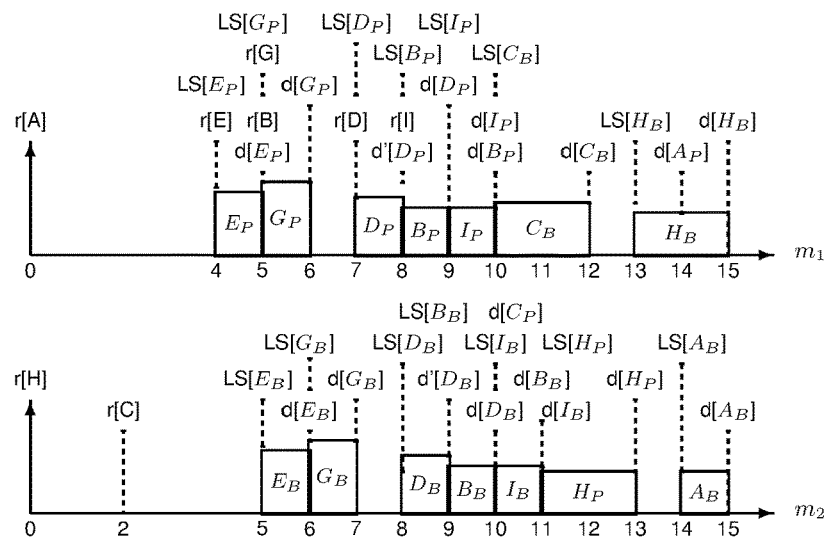

FIG. 5G shows examples of a latest-start-time schedule and the latest start times and end times for primaries and/or backups in the real-time processes A, B, C, D, E, F, G, H, I on two processors in which each primary $p_jP$ and each backup $p_jB$ of a same process $p_j$ are not allowed to be scheduled on a same processor, computed at run-time t=4 in Example 4 before a permanent processor failure.

Figure 5H:
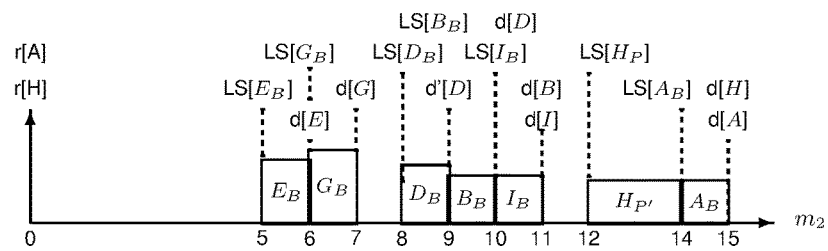

FIG. 5H shows examples of a latest-start-time schedule and the latest start times and end times for primaries and/or backups in the real-time processes A, B, C, D, E, F, G, H, I on two processors in which each primary $p_jP$ and each backup $p_jB$ of a same process $p_j$ are not allowed to be scheduled on a same processor, computed at run-time t=4.5 and t=5 in Example 4 after a permanent failure of processor $m_1$ at time t=4.5.

Figure 5I:
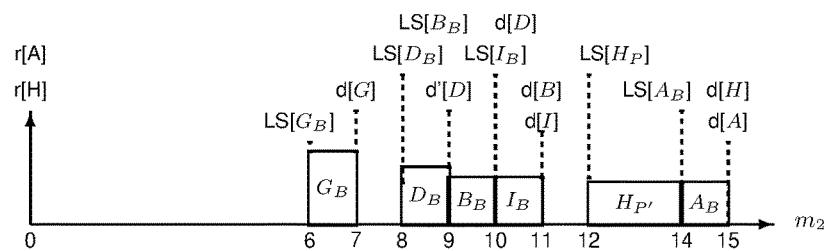

FIG. 5I shows examples of a latest-start-time schedule and the latest start times and end times for primaries and/or backups in the real-time processes A, B, C, D, E, F, G, H, I, computed at run-time t=6 in Example 4 after a permanent failure of processor $m_1$.

Figure 5J:
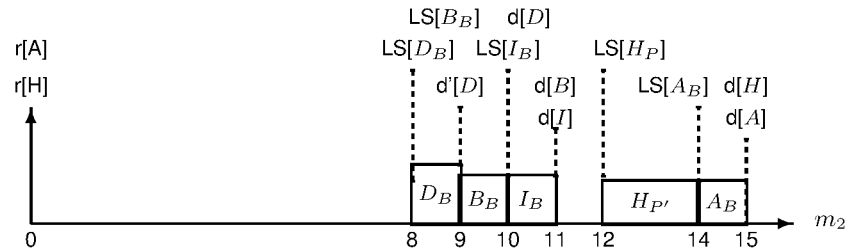

FIG. 5J shows examples of a latest-start-time schedule and the latest start times and end times for primaries and/or backups in the real-time processes A, B, C, D, E, F, G, H, I, computed at run-time t=7 in Example 4 after a permanent failure of processor $m_1$.

Figure 5K:
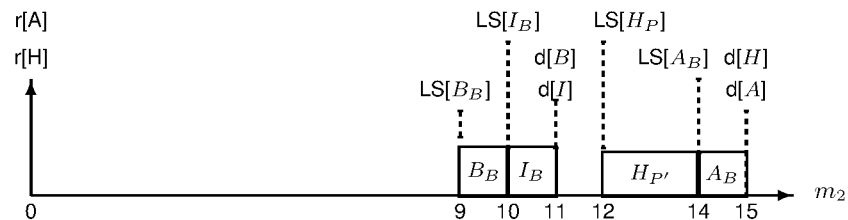

FIG. 5K shows examples of a latest-start-time schedule and the latest start times and end times for primaries and/or backups in the real-time processes A, B, C, D, E, F, G, H, I, computed at run-time t=8 in Example 4 after a permanent failure of processor $m_1$.

Figure 5L:
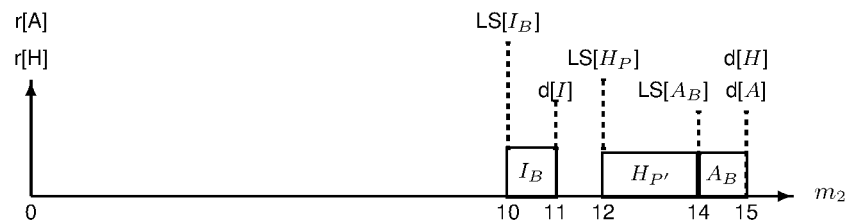

FIG. 5L shows examples of a latest-start-time schedule and the latest start times and end times for primaries and/or backups in the real-time processes A, B, C, D, E, F, G, H, I, computed at run-time t=9 in Example 4 after a permanent failure of processor $m_1$.

Figure 5M:

FIG. 5M shows examples of a latest-start-time schedule and the latest start times and end times for primaries and/or backups in the real-time processes A, B, C, D, E, F, G, H, I, computed at run-time t=10 and 11 in Example 4 after a permanent failure of processor $m_1$.

Figure 5N:

FIG. 5N shows examples of a latest-start-time schedule and the latest start times and end times for primaries and/or backups in the real-time processes A, B, C, D, E, F, G, H, I, computed at run-time t=14 in Example 4 after a permanent failure of processor $m_1$.

Figure 5O:

FIG. 5O shows examples of a latest-start-time schedule and the latest start times and end times for primaries and/or backups in the real-time processes A, B, C, D, E, F, G, H, I, computed at run-time t=15 in Example 4 after a permanent failure of processor $m_1$.

Figure 6:
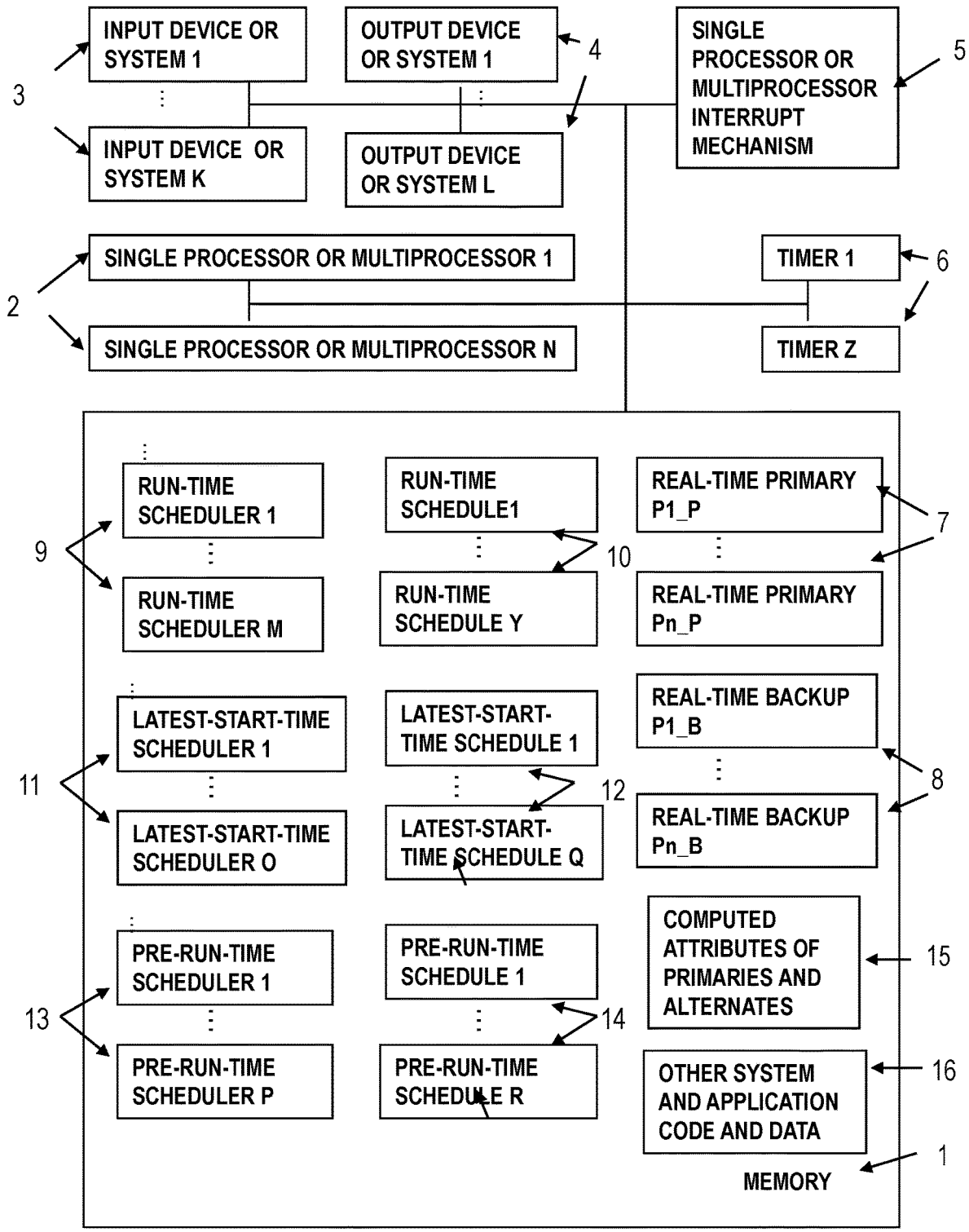

FIG. 6 is a block diagram showing various possible computer system components that various embodiments may involve, including input device or system 1 to K, output device or system 1 to L, processors 1 to N, timers 1 to Z, single processor or multiprocessor interrupt mechanism, system and application code and data in memory, including run-time scheduler 1 to M, run-time schedule 1 to Y, latest-start-time scheduler 1 to O, latest start-time schedule 1 to Q, pre-run-time scheduler 1 to P, pre-run-time schedule 1 to R, real-time periodic process primaries $P_1P$ to $P_nP$, real-time periodic process backups $P_1B$ to $P_nB$, and other system and application code and data, etc.

Figure 7:
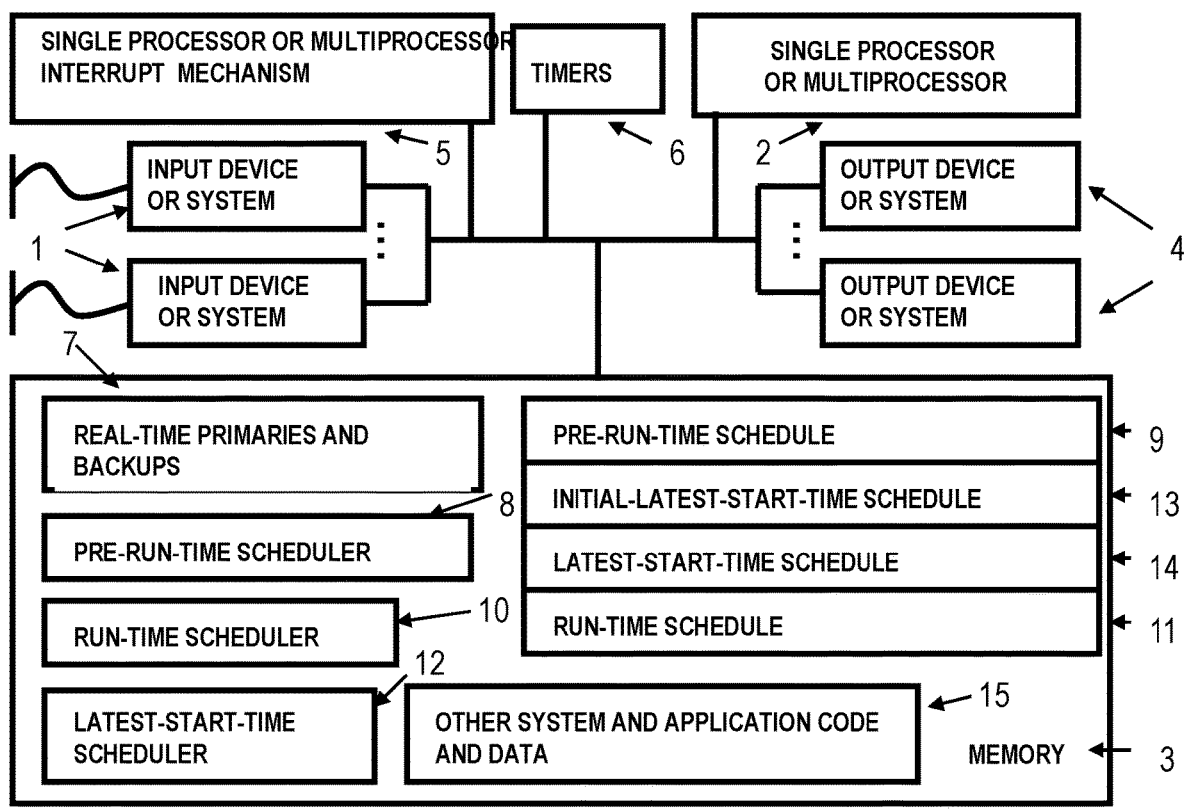

FIG. 7 is a block diagram showing various possible computer system components that various embodiments may involve, including single processor or multiprocessor, timers, single processor or multiprocessor interrupt mechanism, system and application code and data in memory, including run-time scheduler, run-time schedule, latest-start-time scheduler, latest start-time schedule, pre-run-time scheduler, pre-run-time schedule, real-time periodic process primaries and backups, and other system and application code and data, etc.

Figure 8A:
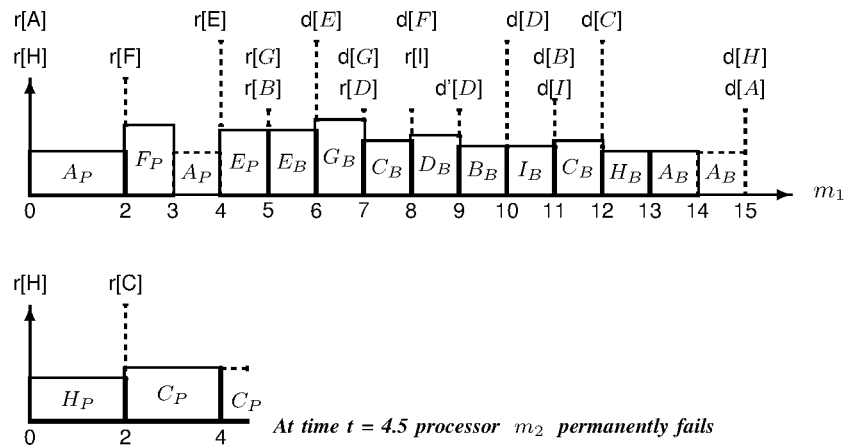

FIG. 8A shows a timing diagram of a possible run-time execution of the primaries and/or backups in the real-time processes A, B, C, D, E, F, G, H, I on two processors in which each primary $p_jP$ and each backup $p_jB$ of a same process $p_j$ are not allowed to be scheduled on a same processor, using the latest-start-time schedule and the latest start times and end times in FIGS. 5C, 5E, 5F, 5G, 5H, 5I, 5J, 5K, 5L, 5M, 5N and 5O in Example 5, both before, and after, a permanent failure of processor $m_2$.

Figure 8B:
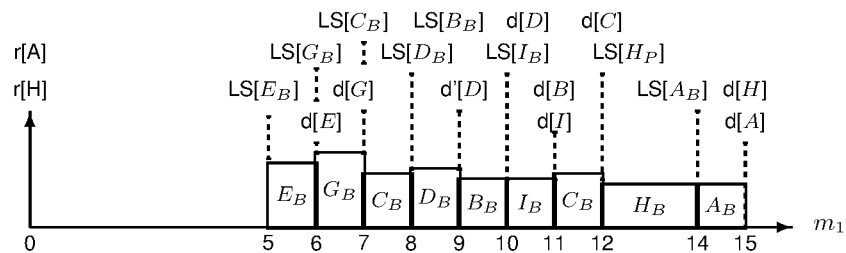

FIG. 8B shows examples of a latest-start-time schedule and the latest start times and end times for primaries and/or backups in the real-time processes A, B, C, D, E, F, G, H, I on two processors in which each primary $p_jP$ and each backup $p_jB$ of a same process $p_j$ are not allowed to be scheduled on a same processor, computed at run-time t=4.5 and t=5 in Example 5 after a permanent failure of processor $m_2$ at time t=4.5.

Figure 8C:
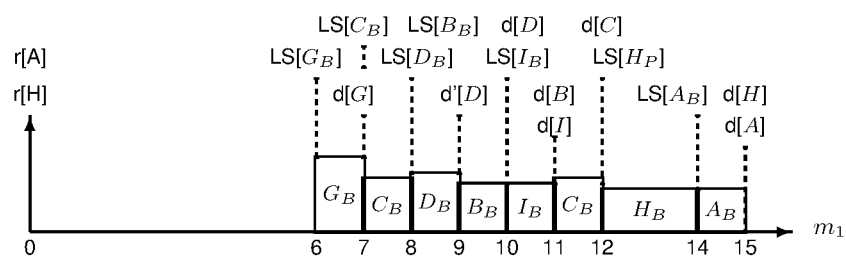

FIG. 8C shows examples of a latest-start-time schedule and the latest start times and end times for primaries and/or backups in the real-time processes A, B, C, D, E, F, G, H, I on two processors in which each primary $p_jP$ and each backup $p_jB$ of a same process $p_j$ are not allowed to be scheduled on a same processor, computed at run-time t=6 in Example 5 after a permanent failure of processor $m_2$.

Figure 8D:
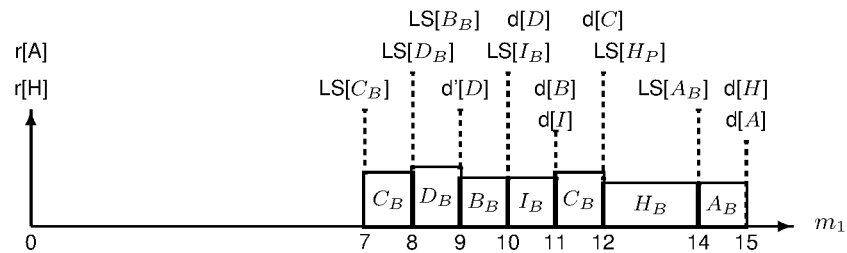

FIG. 8D shows examples of a latest-start-time schedule and the latest start times and end times for primaries and/or backups in the real-time processes A, B, C, D, E, F, G, H, I on two processors in which each primary $p_jP$ and each backup $p_jB$ of a same process $p_j$ are not allowed to be scheduled on a same processor, computed at run-time t=7 in Example 5 after a permanent failure of processor $m_2$.

Figure 8E:
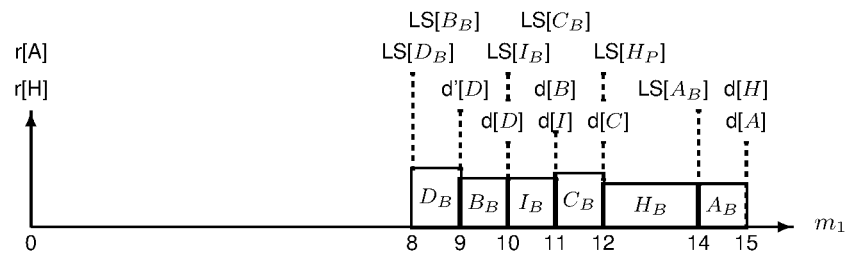

FIG. 8E shows examples of a latest-start-time schedule and the latest start times and end times for primaries and/or backups in the real-time processes A, B, C, D, E, F, G, H, I on two processors in which each primary $p_jP$ and each backup $p_jB$ of a same process $p_j$ are not allowed to be scheduled on a same processor, computed at run-time t=8 in Example 5 after a permanent failure of processor $m_2$.

Figure 8F:
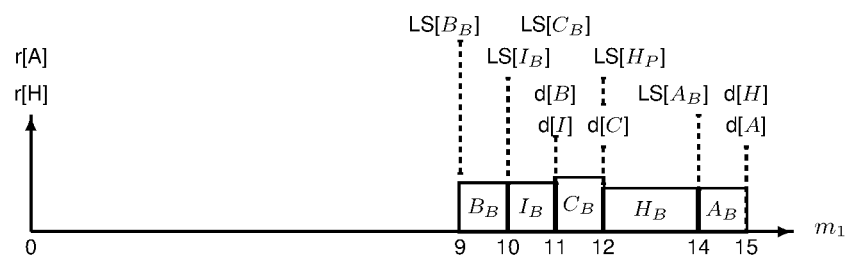

FIG. 8F shows examples of a latest-start-time schedule and the latest start times and end times for primaries and/or backups in the real-time processes A, B, C, D, E, F, G, H, I on two processors in which each primary $p_jP$ and each backup $p_jB$ of a same process $p_j$ are not allowed to be scheduled on a same processor, computed at run-time t=9 in Example 5 after a permanent failure of processor $m_2$.

Figure 8G:
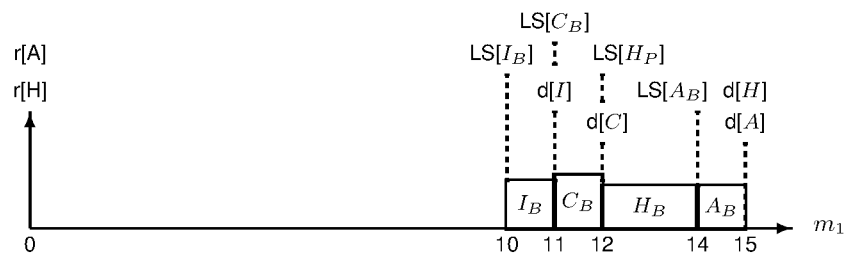

FIG. 8G shows examples of a latest-start-time schedule and the latest start times and end times for primaries and/or backups in the real-time processes A, B, C, D, E, F, G, H, I on two processors in which each primary $p_jP$ and each backup $p_jB$ of a same process $p_j$ are not allowed to be scheduled on a same processor, computed at run-time t=10 in Example 5 after a permanent failure of processor $m_2$.

Figure 8H:

FIG. 8H shows examples of a latest-start-time schedule and the latest start times and end times for primaries and/or backups in the real-time processes A, B, C, D, E, F, G, H, I on two processors in which each primary $p_jP$ and each backup $p_jB$ of a same process $p_j$ are not allowed to be scheduled on a same processor, computed at run-time t=11 in Example 5 after a permanent failure of processor $m_2$.

Figure 8I:

FIG. 8I shows examples of a latest-start-time schedule and the latest start times and end times for primaries and/or backups in the real-time processes A, B, C, D, E, F, G, H, I on two processors in which each primary $p_jP$ and each backup $p_jB$ of a same process $p_j$ are not allowed to be scheduled on a same processor, computed at run-time t=12 in Example 5 after a permanent failure of processor $m_2$.

Figure 8J:

FIG. 8J shows examples of a latest-start-time schedule and the latest start times and end times for primaries and/or backups in the real-time processes A, B, C, D, E, F, G, H, I on two processors in which each primary $p_jP$ and each backup $p_jB$ of a same process $p_j$ are not allowed to be scheduled on a same processor, computed at run-time t=13 in Example 5 after a permanent failure of processor $m_2$.

Figure 8K:
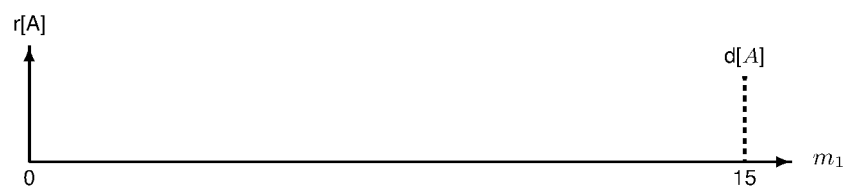

FIG. 8K shows examples of a latest-start-time schedule and the latest start times and end times for primaries and/or backups in the real-time processes A, B, C, D, E, F, G, H, I on two processors in which each primary $p_jP$ and each backup $p_jB$ of a same process $p_j$ are not allowed to be scheduled on a same processor, computed at run-time t=15 in Example 5 after a permanent failure of processor $m_2$.

Figure 9A:
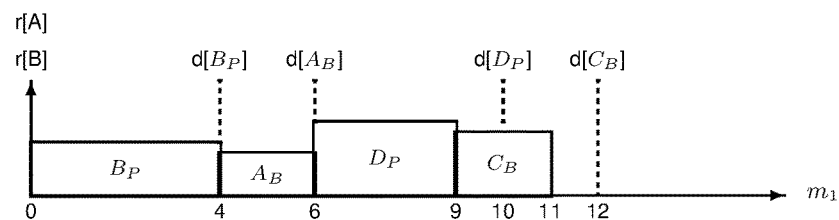
Figure 9A:
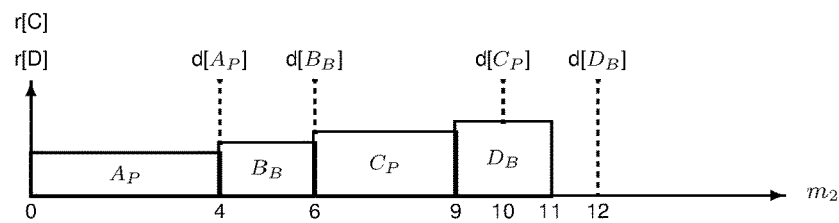

FIG. 9A shows an original feasible pre-run-time schedule on two processors for the primaries and/or backups in the real-time processes A, B, C, D in Example 6 in which each primary $p_jP$ and each backup $p_jB$ of a same process $p_j$ are not allowed to be scheduled on a same processor.

Figure 9B:
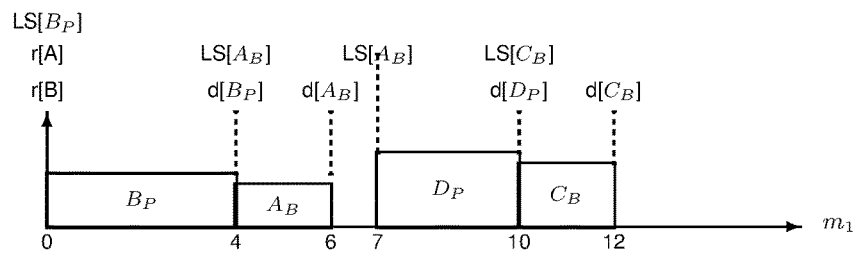
Figure 9B:
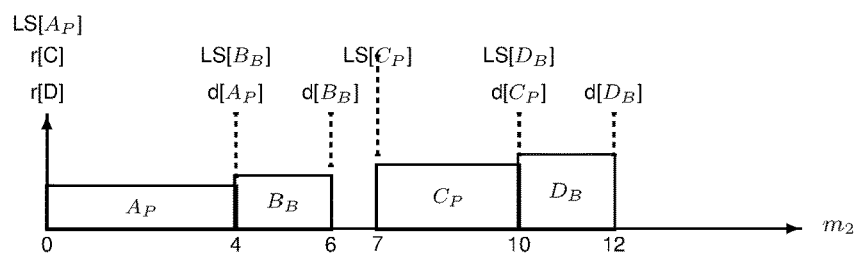

FIG. 9B shows an initial latest-start-time schedule and the latest start times and end times for the primaries and/or backups in the real-time processes A, B, C, D on two processors in which each primary $p_jP$ and each backup $p_jB$ of a same process $p_j$ are not allowed to be scheduled on a same processor, which can be computed off-line from the feasible pre-run-time schedule in FIG. 9A. The initial latest-start-time schedule and the latest start times and end times on two processors for the set of real-time processes can be computed off-line by the method for computing a feasible pre-run-time schedule, and will be used at run-time t=0, and at the beginning of each Least Common Multiple of the real-time process periods in Example 6.

Figure 9C:
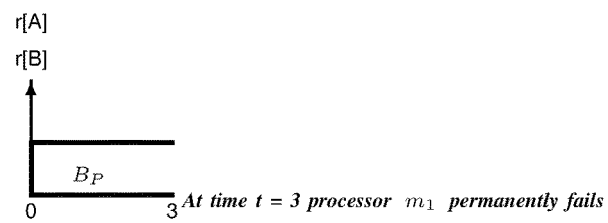
Figure 9C:
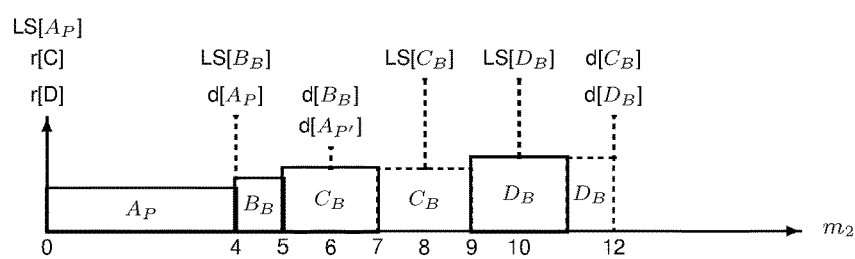

FIG. 9C shows a timing diagram of a possible run-time execution of the primaries and/or backups in the real-time processes A, B, C, D on two processors in which each primary $p_jP$ and each backup $p_jB$ of a same process $p_j$ are not allowed to be scheduled on a same processor, using the latest-start-time schedule and the latest start times and end times in FIGS. 9B, 9E, 9F, 9G, 9H, 9I in Example 6, both before, and after, a permanent failure of processor $m_1$.

Figure 9D:
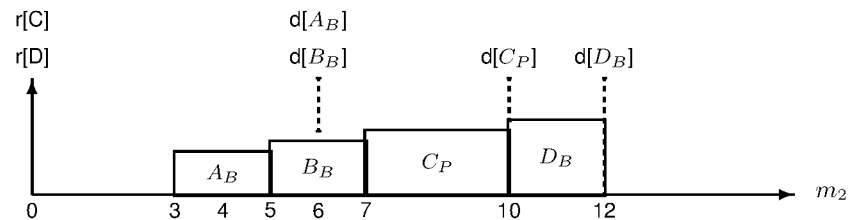

FIG. 9D shows a schedule form the primaries and/or backups in the real-time processes A, B, C, D in Example 6, assuming that, after a permanent failure of processor $m_1$ at time t=3, the backup $A_B$ that was previously scheduled to execute on the failed processor $m_1$ is used to replace the corresponding primary $A_P$ on the surviving processor $m_2$. Note that if backup $A_B$ is used to replace the corresponding primary $A_P$ on the surviving processor $m_2$, then because the earliest time that either backup $A_B$ or backup $B_B$ can start on the surviving processor $m_2$ is immediately after processor $m_1$ fails at time 3, if backup $A_B$ executes for a duration equal to its worst-case computation time of 2 time units, and backup $B_B$ also executes for a duration equal to its worst-case computation time of 2 time units, then either backup $A_B$ or backup $B_B$ will end at time 7, in which case either backup $A_B$ or backup $B_B$ will miss its deadline at time 6.

Figure 9E:
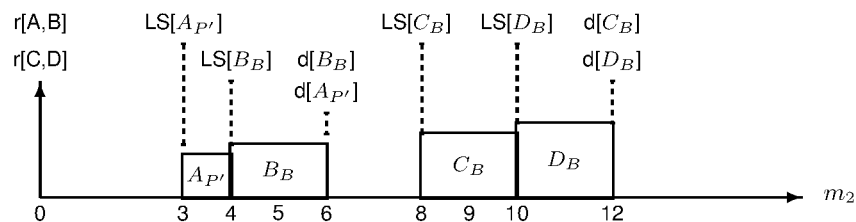

FIG. 9E shows examples of a latest-start-time schedule and the latest start times and end times for primaries and/or backups in the real-time processes A, B, C, D, computed at run-time t=3 in Example 6 after a permanent failure of processor $m_1$ at time t=3.

Figure 9F:
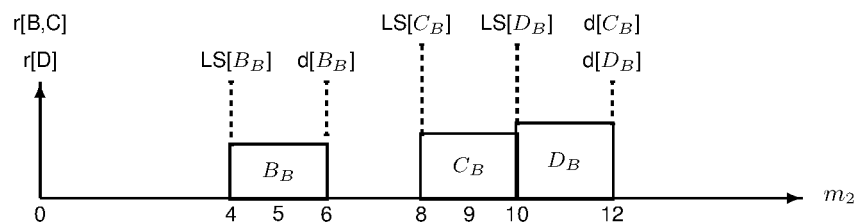

FIG. 9F shows examples of a latest-start-time schedule and the latest start times and end times for primaries and/or backups in the real-time processes A, B, C, D, computed at run-time t=4 in Example 6 after a permanent failure of processor $m_1$.

Figure 9G:
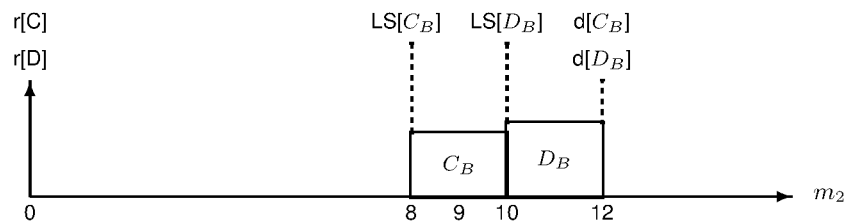

FIG. 9G shows examples of a latest-start-time schedule and the latest start times and end times for primaries and/or backups in the real-time processes A, B, C, D, computed at run-time t=5 in Example 6 after a permanent failure of processor $m_1$.

Figure 9H:
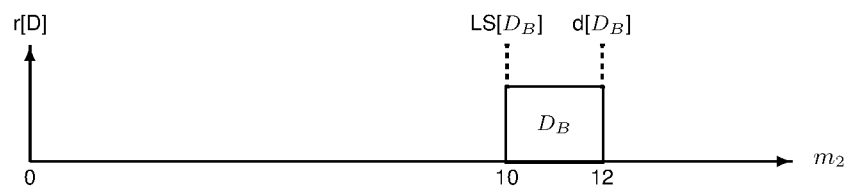

FIG. 9H shows examples of a latest-start-time schedule and the latest start times and end times for primaries and/or backups in the real-time processes A, B, C, D, computed at run-time t=7 in Example 6 after a permanent failure of processor $m_1$.

Figure 9I:
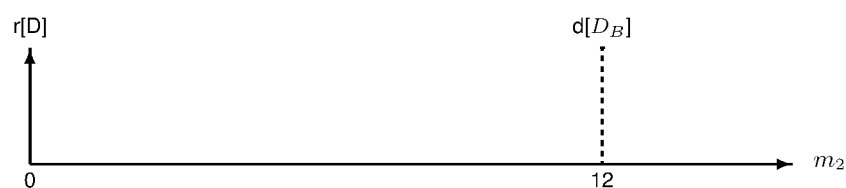
Figure 10B:
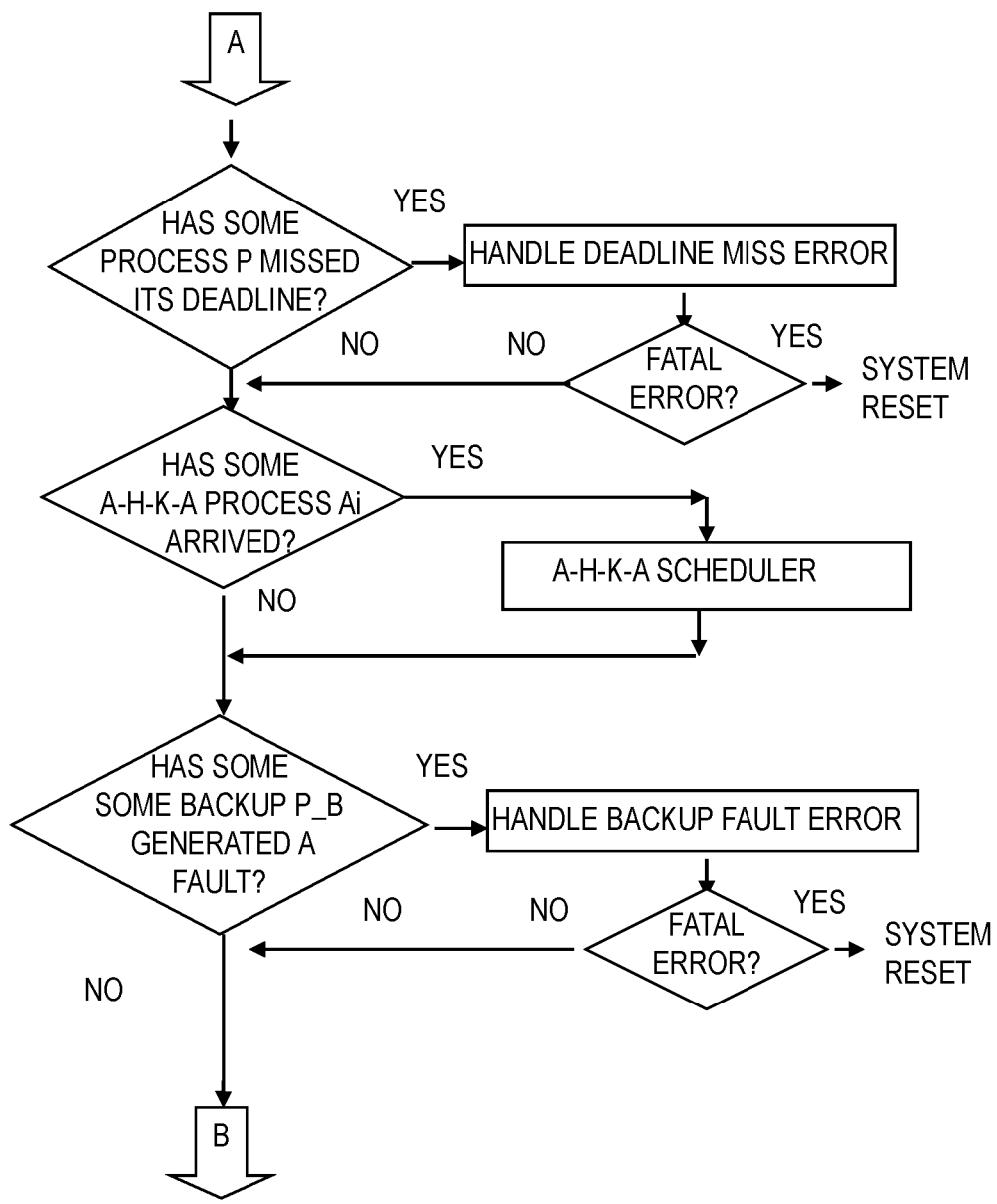
Figure 10C:
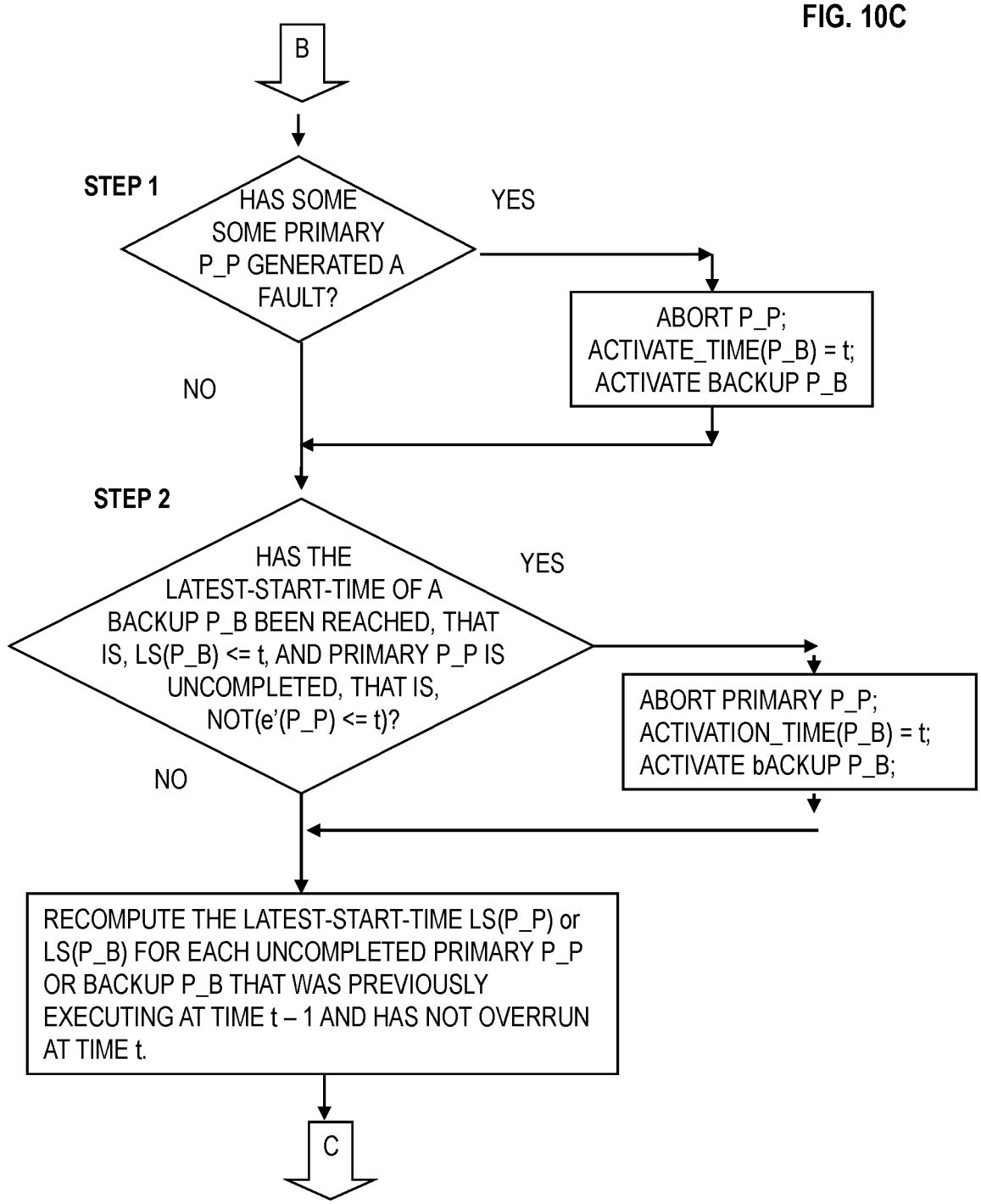
Figure 10D:
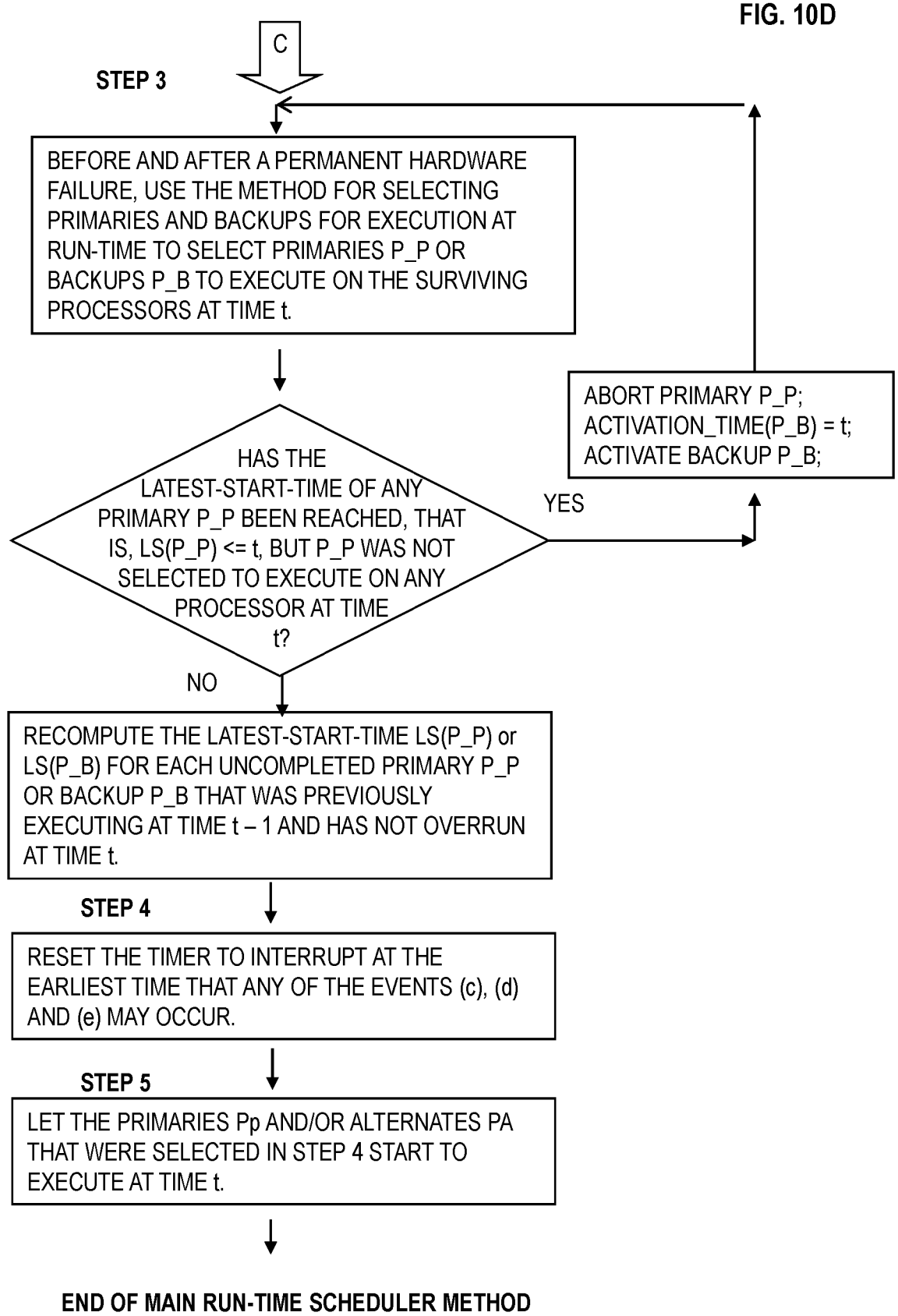

FIG. 9I shows examples of a latest-start-time schedule and the latest start times and end times for primaries and/or backups in the real-time processes A, B, C, D, computed at run-time t=11 in Example 6 after a permanent failure of processor $m_1$.

FIGS. 10A, 10B, 10C, and 10D are flowchart diagrams showing a second illustrative embodiment of a main run-time scheduler method for scheduling primaries and backups for execution on either a single processor or a multiprocessor at run-time both before, and after, any permanent processor failure, in which each primary $p_jP$ and each backup $p_jB$ of a same process $p_j$ are not allowed to be executed on a same processor.

DESCRIPTION OF THE EMBODIMENTS

In the following detailed description of embodiments of the system and method, reference is made to the accompanying drawings which form a part hereof, and in which is shown by way of illustration specific embodiments in which the methods may be practiced. These embodiments are described in sufficient detail to enable those skilled in the art to practice the method, and it is to be understood that other embodiments may be utilized and that logical, mechanical, and electrical changes may be made without departing from the spirit and scope of the present methods. The following detailed description is, therefore, not to be taken in a limiting sense, and the scope of the present method is defined only by the appended claims.

Example embodiments will now be given which illustrate operation and advantages of the present system and method. Some of the embodiments will be described in pseudocode, which is a shorthand form of English understandable to persons skilled in the field of this method.

FIG. 7 illustrates an example of a system on which the embodiments described herein can be carried out. Plural input devices or systems 1, plural output devices or systems 4, a single processor or multiprocessor interrupt mechanism 5, plural timers 6, a single processor or multiprocessor 2, and memory 3 are coupled together in a system on which the embodiments described herein can be carried out.

Any of plural input devices or systems 1 provides input signals which require processing. For example, input devices or systems can be a keyboard, a sensor, an emergency response telephone system, an alarm clock, a program running in background on a processor, a pipeline, an automotive navigation system, an on-board aircraft surveillance radar system, etc.

Any of plural output devices or systems 4, which receives the output result of the execution of the real-time periodic process primaries and backups 7 by the single processor or multiprocessor 2. For example, output devices or systems can be actuators, a display, an automotive navigation system, an on-board aircraft surveillance radar system, etc.

A single processor or multiprocessor 2 can be any physical or virtual structure which can perform one or more functions. A single processor or multiprocessor can be one or more machines, computer processors, logic devices, etc. It should be noted that while the described embodiments can be carried out in a software programmed single processor or multiprocessor, and have been described with such a single processor or multiprocessor as an example, they, or one or more steps in the embodiments, can alternatively be carried out by hardware such as gate arrays or by other fixed or programmable structures, or combinations of these structures.

A single processor or multiprocessor interrupt mechanism 5 in combination with plural timers 6 can be programmed to interrupt and cause the preemption of the executions of one or more particularly chosen real-time periodic process primaries and backups 7 on one or more particularly chosen processors on the single processor or multiprocessor 2 at any particularly chosen times, and activate a run-time scheduler 10 to perform run-time scheduling of the real-time periodic process primaries and backups 7 on the single processor or multiprocessor 2 at predetermined times. The plural timers 6 can also be used to keep track of the current time, and the amount of time that each of the real-time periodic process primaries and backups 7 had been executing on the single processor or multiprocessor 2.

A memory 3 stores real-time periodic process primaries and backups 7, e.g. series of instructions, for carrying out various real-time industrial processes. The memory can be in the form of any storage structure, and can be, for instance a store for a series of electronic, pneumatic, hydraulic, etc. control signals for operating a plurality of industrial real-time processes that require scheduling in accordance with the demands of the input signals. In one embodiment, the memory can be a random access memory, of well known form and the input signals can be electronic. In another embodiment, in the case in which the memory is in the form of industrial real-time process structures, the input signals can be fluids, photons, objects, audio, data or other signals, etc, which are to be scheduled to be processed by the various real-time periodic and asynchronous industrial processes.

The memory 3 may also store a run-time scheduler 10, a run-time schedule 11, a latest-start-time scheduler 12, an initial latest-start-time schedule 13 which is computed off-line and used at the beginning of each least-common-multiple of the periodic real-time process periods, a latest-start-time schedule 14 which is updated from time to time, and a pre-run-time scheduler 8 and pre-run-time schedule 9, for scheduling the execution of the real-time periodic process primaries and backups 7 stored in the memory 3.

Any one of the real-time periodic process primaries and backups 7 can be any task or job that requires a finite amount of time to complete on a certain processor 2 and must be completed before a specified deadline. For example, one of the real-time periodic process primaries and backups 7 can be an avionics task in a traffic alert and collision avoidance system which inputs transponder interrogation signals sent by other aircraft that are received by an input device or system 1 consisting of an on-board aircraft surveillance radar system, processes those transponder interrogation signals sent by other aircraft to detect the location, direction, and speed of nearby aircraft, and generates output transponder signals to an output device or system 4 consisting of an on-board aircraft surveillance radar system to interrogate all other aircraft in a determined range about their position, direction, and speed, and reply to the interrogations sent by other aircraft, and automatically negotiate a mutual avoidance manoeuver between two (or more) conflicting aircraft in order to avoid a midair collision whenever a midair collision threat is detected. This interrogation-and-response cycle may occur periodically and the task has a specified deadline—the task must be completed on or before the end of each interrogation-and-response cycle period, otherwise the entire traffic alert and collision avoidance system may fail and result in a midair collision, so in this case the task will be one of the safety-critical real-time periodic process primaries and backups 7. When a pilot presses a button on the input button device or system 1, to initiate an emergency operation to modify the flight path of the aircraft in order to avoid a midair collision, the task which detects the input signal from the input button device or system 1, initiates the emergency operation, and sends output signals to an output device or system 4 consisting of an on-board aircraft surveillance radar system, to send an output transponder signal to the other aircraft, to inform the other aircraft of details of the emergency operation such as whether this aircraft will climb or descend, could be a task that is started at any point in time, and the task must also be completed so that the output devices or systems receive the output results on or before a specified strict deadline, otherwise the other aircraft may not receive information about the emergency operation, and the flight paths of both aircraft may not be modified correctly or in time to avoid a midair collision, so in the latter case the task could be one of the safety-critical real-time periodic process primaries and backups 7.

Computation time is the amount of time that one of the real-time periodic process primaries and backups 7 requires from start to completion on a certain single processor or multiprocessor.

In operation, the system receives input signals from the input devices and systems 1 which demand that specific real-time periodic process primaries and backups 7 stored in the memory 3 (or which are received from other control or interrupt inputs, not shown) are executed on either a single processor or a multiprocessor 2 and completed before their respective deadlines and also satisfy various additional constraints such as exclusion relations to prevent errors caused by simultaneous access a shared data resource by the real-time periodic and asynchronous processes, and precedence relations to ensure proper order of the executions of the real-time periodic and asynchronous processes. Before run-time, the latest start time scheduler 12, may use information in the pre-run-time schedule 9 and other system and application code and data 15 stored in the memory 3, and the characteristics of the real-time periodic process primaries and backups 7 from the memory 3, to create an initial latest-start-time schedule 13 on either a single processor or a multiprocessor. At run-time, the run-time scheduler 10 uses information about the latest start times of the real-time periodic processes that have not completed and have not overrun in the initial latest-start-time schedule 13, or in a latest start time schedule 14 which is updated from time to time during run-time and stored in memory 3 by the run-time scheduler when there is sufficient time to perform the update and when the current latest start time has changed when compared with the most recently stored latest start time for one or more real-time periodic process primaries and backups 7 that have not completed and have not overrun, to schedule the real-time periodic process primaries and backups 7 on either a single processor or a multiprocessor 2, producing output signals to the output devices or systems 4, and producing a run-time schedule 11 on the single processor or multiprocessor in which all the real-time periodic process primaries or backups 7 are completed and the corresponding output devices or systems 4 receive the output results of the computations of the real-time periodic process primaries or backups 7 before specified deadlines and also satisfy various additional constraints such as exclusion relations and precedence relations. The single processor or multiprocessor timer interrupt mechanism 5 in combination with the one or more timers 6 can be programmed before run-time, or during run-time by the run-time scheduler 10, to interrupt and cause the preemption of one or more particularly chosen real-time periodic process primaries or backups 7 on one or more particularly chosen processors on the single process or multiprocessor 2 at any particularly chosen times, for example at the deadline, or latest start time, or release time of a real-time periodic process primary or backup 7, and re-activate the run-time scheduler 10. The run-time scheduler 10 can be activated by interrupts generated by the single processor or multiprocessor timer interrupt mechanism 5 in combination with the one or more timers 6, or can be activated by the completion of one of the real-time periodic process primaries or backups 7, or can be activated by a request for an execution of a specific real-time periodic process primary or backup 7. The run-time scheduler 10 can schedule any of real-time periodic process primaries and backups 7 to start execution on any of the available processors on the single processor or multiprocessor 2 at any appropriate time, let any of the real-time periodic process primaries and backups 7 be preempted by any other real-time periodic process primaries and backups 7 at any appropriate time if the preempting real-time periodic process primaries and backups 7 and preempted real-time periodic process primaries and backups 7 do not access a shared data memory resource, and let any of those real-time periodic process primaries and backups 7 later resume execution on any of the available processors on the single processor or multiprocessor 2, including on a processor that is different from the previously processor that any of the preempted real-time periodic process primaries and backups 7 most recently executed on, at any appropriate time.

In a real-time system, it is critical that, once input signals from the plural input devices or systems 1 have been received by the system, the executions of real-time periodic process primaries and backups 7, on the single processor or multiprocessor 2, must be able to complete processing of those input signals, and produce output signals that must be received by the plural output devices or systems 4 on or before very strict specified deadlines, otherwise the whole real-time system will fail with potentially very significant negative consequences, such as significant financial loss when a real-time control system for a chemical plant fails to function, or even loss of human life when an aircraft collision avoidance system fails or when the control system of a self driving car fails.

A main purpose of the system and method described in this application, is to maximize the chances that, once input signals from the plural input devices or systems 1 have been received by the system, the executions of real-time periodic process primaries and backups 7, despite overrunning on the single processor or multiprocessor 2, will still be able to complete processing of those input signals, and produce the output signals that must be received by the plural output devices or systems 4 within the very strict specified deadlines, thereby increasing both system utilization and robustness in the presence of inaccurate estimates of the worst-case computations of the real-time periodic process primaries and backups 7, while simultaneously satisfying important constraints and dependencies, such as offsets, release times, precedence relations, and exclusion relations on either a single processor or a multiprocessor.

FIG. 6 provides another example of a single or multiprocessor system on which the embodiments described herein can be carried out. The real-time system includes memory 1, one or more single processors or one or more multiprocessors 2, one or more input devices or systems 3, one or more output devices or systems 4, one or more single processor or multiprocessor interrupt mechanisms 5, one or more timers 6; a plurality of real-time periodic process primaries and backups 7 and 8, one or more run-time schedulers 9, one or more run-time schedules 10, one or more latest-start-time schedulers 11, one or more latest-start-time schedules 12, one or more pre-run-time schedulers 13, one or more pre-run-time schedules 14, a plurality of computed real-time periodic process primaries and backups attributes 15, and other system data and application data and code 16, are stored in a memory 1. Each processor in the one or more single processors or one or more multiprocessors 2 may have local memory and shared memory (not shown). One or more pre-run-time schedulers 13 may construct one or more pre-run-time schedules 14, and one or more latest-start-time schedulers 11 may construct one or more latest-start-time schedules 12 before run-time, then one or more run-time schedulers 9 may use information in the one or more pre-run-time schedules 14, information in the one or more latest-start-time schedules 12, information in the one or more run-time schedules 6, to compute a plurality of real-time periodic process primaries and backups attributes 15, and to schedule executions of the plurality of real-time periodic process primaries and backups 7 and 8, on the one or more single processors or one or more multiprocessors 2. The one or more run-time schedulers 9, working in combination with the one or more latest-start-time schedulers 11, may also generate or update one or more latest-start-time schedules 12, and may also modify or generate one or more run-time schedules 10 in the course of scheduling the plurality of real-time periodic process primaries and backups 7 and 8.

The plurality of real-time periodic process primaries and backups 7 and 8 may share memory and other resources.

Consequently, it is important to enforce exclusion relations on the execution of the real-time processes to prevent more than one real-time process from accessing a shared data memory resource at the same time.

The plurality of run-time schedulers 9, the plurality of latest-start-time schedulers 11, the plurality of pre-run-time schedulers 13, work together to control the execution of all the real-time periodic process primaries and backups 7 and 8, and guarantee that the executions of the real-time periodic process primaries and backups 7 and 8 on the one or more single processors or one or more multiprocessors 2 are completed before their respective deadlines and that all the constraints and relations among the real-time processes are satisfied.

Some applications of the present method can be in aircraft flight control, aircraft collision avoidance, control of a self driving car, plant process control, traffic control, communication systems, multimedia, signal control of the internet, electronic commerce, electronic buses, computer operation, etc.

It should be noted that, in the remaining portion of this specification, in order to avoid use of an exceedingly large number of repetitions of use of the words "real-time periodic process primary" or real-time process backup", these terms have been in many places herein abbreviated to the word "primary", and to "backup" respectively.

Real-Time Periodic Processes, Schedules, Precedence and Exclusion Relations, Primaries, Backups A periodic process consists of a computation that is executed repeatedly, once in each fixed period of time. A typical use of periodic processes is to read sensor data and update the current state of internal variables and outputs.

A periodic process p can be described by a quintuple $(o_p, r_p, c_p, d_p, prd_p)$, wherein $prd_p$ is the period. c, is the worse case computation time required by process p, $d_p$ is the deadline, i.e., the duration of the time interval between the beginning of a period and the time by which an execution of process p must be completed in each period, $r_p$ is the release time, i.e., the duration of the time interval between the beginning of a period and the earliest time that an execution of process p can be started in each period, and $o_p$ is the offset, i.e., the duration of the time interval between the beginning of the first period and time 0.

When there exists flexibility in assigning an offset value for a periodic process, a permitted range of the offset, offsetlowerbound(p)$\leq o_p \leq$offsetupperbound(p), instead of one fixed offset, can be specified for that process. A single offset value constraint is a special case of a permitted range of offset constraint.

It is assumed that $o_p, r_p, c_p, d_p, prd_p$ as well as any other parameters expressed in time have integer values. A periodic process p can have an infinite number of periodic process executions $p_0, p_1, p_2, \ldots$, with one process execution for each period. For the ith process execution $p_i$ corresponding to the ith period, $p_i$'s release time is $r_{p_i} = o_p + r_p + prd_p \times (i-1)$; and $p_i$'s deadline is $d_{p_i} = o_p + d_p + prd_p \times (i-1)$.

Either uppercase letters or lowercase letters may be used to denote the release time and deadline respectively of a periodic process execution of some periodic process p.

It is noted that it is of common practice to include the system overhead in the computation time of the processes.

Reference is made to FIG. 11 and FIG. 12 in U.S. Pat. Nos. 7,444,638, and 7,165,252, for examples of periodic processes. FIG. 11 in U.S. Pat. Nos. 7,444,638, and 7,165,252, illustrates the periodic process $p_B = (o_{P_B}, r_{P_B}, c_{P_B}, d_{P_B}, prd_{P_B})$ where $r_{P_B}=1, c_{P_B}=3, d_{P_B}=4, prd_{P_B}=12, o_{P_B}=0$. FIG. 12 in U.S. Pat. Nos. 7,444,638, and 7,165,252, illustrates the periodic process $p_D = (o_{P_C}, r_{P_C}, c_{P_C}, d_{P_C}, prd_{P_C})$ where $r_{P_C}=0, c_{P_C}=4, d_{P_C}=4, prd_{P_C}=12, o_{P_C}=7$.

Asynchronous Processes

An example of an asynchronous process is one which consists of a computation that responds to internal or external events. A typical use of an asynchronous process is to respond to operator requests. Although the precise request times for executions of an asynchronous process a are not known in advance, usually the minimum amount of time between two consecutive requests $min_a$ is known in advance. An asynchronous process a can be described by a triple $(c_a, d_a, min_a)$. $c_a$ is the worse case computation time required by process a. $d_a$ is the deadline, i.e., the duration of the time interval between the time when a request is made for process a and the time by which an execution of process a must be completed.

An asynchronous process a can have an infinite number of asynchronous process executions $a_0, a_1, a_2, \ldots$, with one process execution for each asynchronous request. For the ith asynchronous process execution $a_i$ which corresponds to the ith request, if $a_i$'s request (arrival) time is $R_{a_i}$, then $a_i$'s deadline is $D_{a_i} = R_{a_i} + d_a$.

Either uppercase letters or lowercase letters may be used to denote the request (arrival) time and deadline respectively of an asynchronous process execution of some asynchronous process a.

Schedules

If a periodic process p or an asynchronous process a has a computation time of $c_p$ or $c_a$, then it is assumed that that process execution $p_i$ or $a_i$ is composed of $c_p$ or $c_a$ process execution units. Each processor is associated with a processor time axis starting from 0 and is divided into a sequence of processor time units.

A schedule is a mapping from a possibly infinite set of process execution units to a possibly infinite set of processor time units on one or more processor time axes. The number of processor time units between 0 and the processor time unit that is mapped to by the first unit in a process execution is called the start time of that process execution. The number of time units between 0 and the time unit subsequent to the processor time unit mapped to by the last unit in a process execution is called the completion time of that process execution. A feasible schedule is a schedule in which the start time of every process execution is greater than or equal to that process execution's release time or request time, and its completion time is less than or equal to that process execution's deadline.

Reference is made to FIGS. 4, 5, 6, 8, 11A, 12A, 13A, 14A in U.S. Pat. Nos. 7,444,638, and 7,165,252, which show examples of feasible schedules, wherein the horizontal axis is the time axis, and time period segments are separated by vertical lines which represent release times and deadlines.

It should be noted that, in order to avoid use in this specification of an exceedingly large number of repetitions of use of the word "executions of process", or "executions of process i", these terms have been in many places herein abbreviated to the word "process", or to simply "i". Thus whenever there is a reference to the term "process" as related to a schedule, the term "process", or "process i", or "i" when i is the name of a process should be understood as meaning "process execution" or "the execution of process i".

Process Segments

Each process p may consist of a finite sequence of segments p(0), p(1), . . . , p(n(p)), where p(0) is the first segment and p(n(p)) is the last segment in process p. Given the release time $r_p$, deadline $d_p$ of process p and the computation time of each segment p[i] in process p, one can easily compute the release time and deadline for each segment, as described in the aforenoted 1993 article by Xu and Parnas.

Parallel computations can be represented by several processes, with various types of relations defined between individual segments belonging to different processes, and processes can be executed concurrently; thus requiring each process to be a sequence of segments does not pose any significant restrictions on the amount of parallelism that can be expressed.

Precedence and Exclusion Relations

Various types of relations such as precedence relations and exclusion relations may exist between ordered pairs of processes segments. A process segment i is said to precede another process segment j if j can only start execution after i has completed its computation. Precedence relations may exist between process segments when some process segments require information that is produced by other process segments.

A process segment i is said to exclude another process segment j if no execution of j can occur between the time that i starts its computation and the time that i completes its computation. Exclusion relations may exist between process segments when some process segments must prevent simultaneous access to shared resources such as data and I/O devices by other process segments.

Embodiments of Using Primaries and Backups of Real-Time Periodic Processes to Provide the System with the Capability to Recover from Hardware and Software Permanent Failures It is assumed that each real-time periodic process p is described by a quintuple ($o_p$, $r_p$, $c_p$, $d_p$, $prd_p$), where $prd_p$ is the period. $c_p$ is the worst case computation time required by process p. $d_p$ is the deadline of process p. $r_p$ is the release time of process p. $o_p$ is the offset, i.e., the duration of the time interval between the beginning of the first period and time 0. In order to provide a real-time embedded system with the capability to survive and recover from both hardware and software permanent failures, two versions of programs are provided for each real-time process p: (1) a primary $p_P$; and (2) a backup $p_B$.

The following method is used to provide the system with the capability to survive and recover from hardware permanent failures and software permanent failures:

(a) Before run-time, the primary $p_P$, and the backup $p_B$ for each process p, are always scheduled to be run on different processors.

(b) During run-time, when the system hardware and software are functioning normally, only the primary $p_P$ of each process p will be executed. If a primary $p_P$ successfully completes, the corresponding backup $p_B$ will not be executed. The processor time slot reserved for that backup $p_B$ that is not executed can be used to execute other processes' primaries or backups. Primaries or backups are able to use the time slots for backups that are not executed, or use any unused processor capacity due to primaries or backups underruns, to overrun, thus significantly increasing the chances that primaries or backups will be able to successfully complete before their respective deadlines.

(c) During run-time, if the primary $p_P$ of each process p suffers a permanent software failure, then the primary $p_P$ of that process will be abandoned; and the backup $p_B$ of that process will be executed, thus guaranteeing that for each process, at least one of either its primary or backup will always be executed in spite of any possible primary permanent software failure.

(d) During run-time, if one of the processors suffers a failure, then the primaries and backups on the surviving processors which correspond to a same process of any of the abandoned primaries or backups on the failed processor will be executed, thus guaranteeing that for each process, at least one of either its primary or backup will always be executed in spite of a permanent hardware failure of any one of the processors.

Embodiments of Methods for Computing a Feasible Pre-Run-Time Schedule for Primaries and Backups in which Each Primary and Backup of a Same Process are not Allowed to be Scheduled on a Same Processor The method below computes a "feasible-pre-run-time schedule in which each primary $p_jP$ and each backup $p_jB$ of a same process $p_j$ are not allowed to be scheduled on a same processor" $S_O$ on a multiprocessor, for a set of uncompleted periodic processes P, in order to tolerate hardware failure of a single processor, and in which arbitrary PRECEDES and EXCLUDES relations defined on ordered pairs of processes in P are satisfied.

Let the set of processors be M={$m_1$, . . . , $m_q$, . . . , $m_N$}. In the method below, "$p_{j_{PB}}$" means "primary $p_jP$ or backup $p_jB$ of process $p_j$", "$p_{j_{PB}}$ on $m_q$" means "primary $p_jP$ or backup $p_jB$ of process $p_i$ has been previously assigned processor time on processor $m_q$". In the method "s($p_{j_{PB}}$)" refers to the "start time" of $p_{j_{PB}}$, or the beginning (left hand side) of $p_{j_{PB}}$'s time slot in the pre-run-time schedule $S_O$; "e($p_{j_{PB}}$)" refers to the "end time" of $p_{j_{PB}}$, or the end (right hand side) of $p_{j_{PB}}$'s time slot in the pre-run-time schedule $S_O$.

Initially, a PRECEDES relation is defined between each primary $p_jP$ and backup $p_jB$ pair of a same process. The adjusted deadline $d'_{pj}{d'}_{p_{jPB}}$ for each primary or backup $p_{jPB}$ is computed, such that if there does not exists $p_{iPB}$ such that $p_{iPB}$ PRECEDES $p_{jPB}$ then $d'_{pj}{d'}_{p_{jPB}} = d_{pj}{d'}_{p_{jPB}}$; else $d'_{pj}{d'}_{p_{jPB}} = \min\{d_{pj}{d'}_{p_{jPB}}, d'_{pj}{d'}_{p_{jPB}} - c_{pi}{d'}_{p_{jPB}} | p_{iPB}$ PRECEDES $p_{jPB}\}$.

```
t ← 0
while ¬(∀p_{iPB} ∈ P : ¬(e(p_{iPB})) ≤ t) do
    begin
        for m_q = m_1 to m_N do
            begin
                Among the set
                { p_{jPB} ∈ P | ((¬(s(p_{jPB}) ≤ t)
                ∧(p_{jPB} on m_q ∧ (s(p_{jPB}) < t)
                % p_{jPB} not started yet or p_{jPB} started on m_q
                ∧(r(P'_{jPB}) ≥ t) ∧ ¬(e(p_{jPB}) ≤ t)
                % p_{jPB} ready and p_{jPB} uncompleted
                ∧¬(p_{jPB} = p_jB ∧ p_jB on m_q)
                % if p_{jPB} is a backup, then the primary p_jP was
                % not previously scheduled on processor m_q
                ∧(∄p_k ∈ P : (p_k EXCLUDES p_j)
                    ∧(s(p_{kPB}) < t) ∧ ¬(e(p_{kPB}) ≤ t))
                % no p_{kPB} that has started but not completed
                % such that p_k EXCLUDES p_j
                ∧(∄p_k ∈ P : (p_k PRECEDES p_j)
                    ∧¬(e(P_{kPB}) ≤ t))
                % no uncompleted p_{kPB} such that
                % p_k PRECEDES p_j
                }
                select p_{jPB} that has min d'p_{jPB}.
                % earliest-adjusted-deadline-first
                in case of ties, select p_{jPB} that has a
                smaller index number j.
                if ¬(s(p_{jPB}) ≤ t) then s(p_{jPB}) ← t.
                assign the time unit [t, t + 1] on m_q to p_{jPB}'s time
                slot in the pre-run-time schedule S_O.
                if the total number of time units assigned to p_{jPB}'s
                time slot is equal to c_{pjPB}, then e(p_{jPB}) ← t.
            end
        t ← t + 1
    end
```

Example 1

FIG. 5A shows a feasible pre-run-time schedule $S_O$ for the primaries and backups in the set of processes A, B, C, D, E, F, G, H, I on two processors $m_1$ and $m_2$, in which each primary and each backup of a same process are not allowed to be scheduled on a same processor in order to tolerate hardware failure of a single processor, computed by the method above. The following EXCLUSION and PRECEDES relations are satisfied: D EXCLUDES I and D PRECEDES I (D PREC I).

Embodiments of Method for Reducing the Maximum Lateness of a Feasible Pre-Run-Time Schedule for Primaries and Backups Computed by the Procedure Above.

Once a feasible schedule for primaries and backups is computed by the method above, it may be possible to use the following method to reduce the maximum lateness of the feasible schedule:

(1) Identify the process $p_i$, for which the backup $p_{i_B}$ has maximum lateness among all backups of all processes in the feasible pre-run-time schedule computed by the method above.

(2) Re-apply the method above with the additional constraint that the primary $p_{i_P}$ of the process $p_i$ identified in (1) must be scheduled on a processor that is different from the processor in the previous feasible pre-run-time schedule.

Example 2

FIG. 5B shows an improved feasible pre-run-time schedule $S_i$ for all the primaries and backups in the set of processes A, B, C, D, E, F, G, H, I on two processors $m_1$ and $m_2$, in which each primary and each backup of a same process are not allowed to be scheduled on a same processor in order to tolerate hardware failure of a single processor. The maximum lateness of all processes in feasible pre-run-time schedule $S_1$ is reduced when compared with the feasible schedule $S_0$ in FIG. 5A in Example 1. $S_1$ can be computed by adding the constraint that the primary $H_P$ of the process H which has maximum lateness in the feasible schedule $S_O$ in FIG. 5A in Example 1, must be scheduled on a processor that is different from the processor $m_1$ in the feasible schedule $S_0$ in FIG. 5A in Example 1, then reapplying the method above. The following EXCLUSION and PRECEDES relations are satisfied: D EXCLUDES I and D PRECEDES I (D PREC I).

Embodiments of Methods of Using Latest Start Times to Effectively Handle Overruns and Underruns of Primaries and Backups in the Presence of Permanent Hardware and Software Failures A latest start time $LS(p_P)$ for each primary $p_P$, and a latest start time $LS(p_B)$ for each backup $p_B$ in which each primary $p_jP$ and each backup $p_jB$ of a same process $p_j$ are not allowed to be scheduled on a same processor is determined before and during run-time.

Both before, and after, any permanent processor failure, or permanent software failure, the latest start time $LS(p_P)$ for each primary $p_P$, and a latest start time $LS(p_B)$ for each backup $p_B$ in which each primary $p_jP$ and each backup $p_jB$ of a same process $p_j$ are not allowed to be scheduled on a same processor will satisfy the following properties:

(1) Every primary $p_P$ and every backup $p_B$ on any surviving processor is guaranteed to be able to start execution on or before its respective latest start time $LS(p_P)$ or $LS(p_B)$;

(2) Every primary $p_P$ and every backup $p_B$ on any surviving processor which starts execution on or before its respective latest start time $LS(p_P)$, and does not fault or overrun, is guaranteed to complete its computation on or before its process deadline $d(p)$;

(3) If any primary $p_P$ or any backup $p_B$ on any surviving processor overruns, that is, does not complete after executing for a number of time units equal to its worst-case computation time, then that primary or backup can continue to execute, as long as no other primary or backup with an earlier deadline is prevented from starting on or before its latest start time, while guaranteeing that every other primary $p_{i_P}$ and every other backup $p_{i_B}$ will still be able to:

(3a) start execution on or before their respective latest start times $LS(p_{i_P})$ or $LS(p_{i_B})$;

(3b) complete their computations on or before their respective deadlines $d(p_{i_P})$ or $d(p_{i_B})$ as long as they do not fault or overrun.

Thus this method is able to efficiently utilize any spare capacity in the system, including any spare capacity created at run-time due to primary or backup underruns, or due to not needing to execute a backup any more, in order to increase the chances that either the primary or the backup of each process will be able to successfully complete its computation before its deadline, both before, and after, any permanent processor failure.

Embodiments of Methods for Computing a Latest Start Time Schedule and Latest Start Times for Primaries and Backups in which Each Primary and Backup of a Same Process are not Allowed to be Scheduled on a Same Processor The following method, when given an original feasible pre-run-time schedule in which each primary $p_jP$ and each backup $p_jB$ of a same process $p_j$ are not allowed to be scheduled on a same processor $S_O$, computes a latest-start-time schedule $S_L$ in which each primary $p_jP$ and each backup $p_jB$ of a same process $p_j$ are not allowed to be scheduled on a same processor, by scheduling all the primaries and all the backups $p_{PB}$ in each process p in P starting from time t equal to the latest deadline among all the primaries and all the backups $p_{PB}$ in P, that is, t=max $\{d_p | \forall p_{PB} \in P\}$, in reverse time order, using a "Latest-Release-Time-First" scheduling strategy that is equivalent to a reverse application of the well known Earliest-Deadline-First strategy, which satisfies all the PREC relations defined below: Given any original feasible pre-run-time schedule $S_O$ on a multiprocessor, we first define a set of "PREC" relations on primaries and backups $p_{PB}$ in the set of processes p in P in the feasible pre-run-time schedule $S_O$:

$\forall p_{i_{PB}} \in p_{j_{PB}} \in P$,
if $e(p_{i_{PB}}) \leq ep_{j_{PBPB}}) \wedge ((p_i \text{ EXCLUDES } p_j) \vee (p_{i_{PB}} \text{ PRECEDES } p_{j_{PB}}))$
then let $p_{i_{PB}}$ PREC $p_{j_{PB}}$ Let the set of processors be M={$m_1, \ldots, m_q, \ldots, m_N$}. In the method below, "$p_j$ on $m_q$ in $S_O$" means "process $p_j$ is scheduled on processor $m_q$ in the original feasible pre-run-time schedule $S_O$". "$LS(p_{j_{PB}})$" refers to the "latest-start-time" of $p_{j_{PB}}$, or the beginning (left hand side) of $p_{j_{PB}}$'s time slot in the newly constructed latest-start-time schedule $S_L$, which is also equal to the time value of the left boundary of the last time unit [t−1, t] that will be assigned by the method to $p_{j_{PB}}$'s time slot while constructing the latest-start-time schedule $S_L$. "$e(p_{j_{PB}})$" refers to the "end time" of $p_{j_{PB}}$, or the end (right hand side) of $p_{j_{PB}}$'s time slot in the newly constructed latest-start-time schedule $S_L$.

Initially, compute the adjusted release time $r'_{pj}{d'}_{p_{jPB}}$ for each primary or backup $p_{jPB}$ where if there does not exists $p_{iPB}$ such that $p_{iPB}$ PREC $p_{jPB}$ then $r'_{pj}{d'}_{p_{jPB}} = r_{pj}{d'}_{p_{jPB}}$; else $r'_{pj}{d'}_{p_{jPB}} = \max\{r_{pj}{d'}_{p_{jPB}}, r'_{pj}{d'}_{p_{jPB}} + c_{pi}{d'}_{p_{jPB}} | p_{iPB} \text{ PREC } p_{jPB}\}$.

```
t ← max {d_p | ∀p ∈ P}
while ¬(∀p_{i_PB} ∈ P : ¬(LS(P_{j_PB}) ≥ t) do
  begin
    for m_q = m_1 to m_N do
      begin
        if (∃p_{i_PB} : p_{i_PB} on m_q in S_O
           ∧(t = d_{p_{iPB}} ∨ t = LS(p_{i_PB})))
        % if for some p_{i_PB} on m_q in S_O
        % t is equal to the deadline of p_{i_PB} or t is equal to
        % the latest-start-time of p_{i_PB} on m_q in S_L
        then
          begin
            Among the set
            { p_{j_PB} | p_{j_PB} on m_q in S_O
              ∧(t ≤ d_{p_{jPB}} ∧ ¬(LS(p_{j_PB}) ≥ t)
            % Among the set of p_{j_PB} on m_q in S_O such that
            % t is less than or equal to the deadline of p_{j_PB}
            % or t is less than or equal to the latest-start-time
            % of P_{j_PB} on m_q in S_L and
            ∧(∄p_{i_PB} ∈ P :
              p_{j_PB} PREC P_{k_PB} ∧ ¬(LS(P_{k_PB}) ≥ t))
            % no p_{k_PB} such that t is greater than the start
            % time of p_{k_PB} on mg in S_L and p_k PREC p_j
            }
            select P_{j_PB} that has max r' p_{j_PB}.
            % latest-adjusted-release-time-first
            in case of ties, select P_{j_PB} that has a
            greater index number j.
            if ¬(e(P_{j_PB}) ≥ t) then e(p_{j_PB}) ← t.
            assign the time unit [t − 1, t] on m_q to p_{j_PB}'s
            time slot in the latest-start-time schedule S_L.
            if the total time units assigned to p_{j_PB}'s time
              slot is equal to c_{pj_PB}, then LS(P_{j_PB}) ← t − 1.
          end
        else if the time unit [t, t + 1] on m_q was previously
            assigned to some p_{k_PB} and t ≠ LS(p_{k_PB}) then
          begin
            assign the time unit [t − 1, t] on m_q to p_{k_PB} in
              the latest-start-time schedule S_L.
            if the total time units assigned to p_{k_PB}'s time
              slot is equal to c_{pk_PB}, then LS(P_{k_PB}) ← t − 1.
          end
      end
    t ← t − 1
  end
```

Example 3

FIG. 5C shows a latest-start-time schedule $S_L$ and the latest start times for all the primaries and backups in the set of processes A, B, C, D, E, F, G, H, I on two processors $m_1$ and $m_2$, in which each primary and each backup of a same process are not allowed to be scheduled on a same processor, which can be computed by the method above from the feasible pre-run-time schedule $S_O$ in FIG. 5B, in which D PREC I is satisfied.

Embodiments of Methods of Handling Primary and Backup Overruns and Underruns while Tolerating Permanent Hardware and Permanent Software Failures at Run-Time In the following, before a permanent processor failure, all the processors are called "surviving processors"; after a permanent processor failure, all the processors except the failed processor are called "surviving processors."

Embodiments of Methods of Primary and Backup Recovery Methods after a Permanent Processor Failure After a permanent processor failure, there exist at least the following possible recovery methods concerning which entity should be executed on a surviving processor to replace each primary $p_{i_P}$ or each backup $p_{j_B}$ that was previously scheduled to execute on the failed processor:

(1) Primary Recovery Method A: For each primary $p_{i_P}$ that was previously scheduled to execute on the failed processor, use the existing corresponding backup $p_{i_B}$ on a surviving processor for recovery.

(2) Primary Recovery Method B: For each primary $p_{i_P}$ that was previously scheduled to execute on the failed processor, try to execute that same primary $p_{i_P}$ on a surviving processor for recovery.

(3) Backup Recovery Method A: For each backup $p_{j_B}$ that was previously scheduled to execute on the failed processor, use the corresponding existing primary $p_{j_P}$ on a surviving processor for recovery.

(4) Backup Recovery Method B: For each backup $p_{j_B}$ that was previously scheduled to execute on the failed processor, if there exists a feasible schedule in which all timing constraints are satisfied for that same backup $p_{j_B}$ together with all other surviving primaries and backups that are used for recovery on the surviving processor m, when that same backup $p_{j_B}$ is used to replace the corresponding primary $p_{j_P}$ on the surviving processor m for recovery, then use that same backup $p_{j_B}$ to replace the corresponding primary $p_{j_P}$ on the surviving processor m for recovery; otherwise use the corresponding existing primary $p_{j_P}$ on a surviving processor for recovery.

When an existing primary $p_{j_P}$ on a surviving processor is used for recovery, then $p_{j_P}$ will be called a "surviving primary" and denoted as $p_{j_{P^s}}$. Let ActivationTime($p_{j_{P^s}}$)=t, and let surviving primary $p_{i_{P^s}}$, for which the corresponding backup $p_{i_B}$ was previously scheduled before run-time on the permanently failed processor, have the same deadline that its corresponding backup $p_{i_B}$ had on the permanently failed processor, when re-computing latest start times, and when the run-time scheduler selects primaries and backups for execution on each surviving processor at run-time.

The main advantages and disadvantages of the above methods can be summarized as follows:

With recovery methods (1) and (3), the existing feasible pre-run-time schedule, latest start time schedule, and latest start times can be used without significant changes to guarantee that all the surviving primaries and backups will be able to meet their deadlines.

With recovery methods (1) and (3), each processor would also only need to be able to access the copies of the primaries and backups that were assigned to that processor in the existing latest start time schedule.

In contrast, with recovery method (2) and (4), each processor would also need to always be able to access copies of all the primaries and copies of all the backups, including the primaries and backups that were assigned to other processors in the existing latest start time schedule, in case any one of the processors fail.

If recovery method (4) can be used, the system reliability could be increased compared with using recovery method (3), as simpler backups tend to be more reliable than primaries, but using recovery method (4) may require recomputing the latest-start-time schedule, and using recovery method (4) instead of recovery method (3) may not always be possible.

With recovery method (2) and (3), the primary $p_{i_P}$ used to replace the backup $p_{i_B}$ will likely be of higher quality but of less reliability compared with the replaced backup $p_{i_B}$.

With recovery methods (1) and (4), the backup $p_{j_B}$ used to replace the primary $p_{j_P}$ will likely be of less quality but of higher reliability compared with the replaced primary $p_{j_P}$.

A major issue with recovery method (2) is that the existing feasible pre-run-time schedule, latest start time schedule, and latest start times cannot be used anymore to guarantee that all the surviving primaries and backups will be able to meet their deadlines, because the length of the time slot reserved for the backup in the existing latest start time schedule can be shorter than the length needed to execute the primary. With recovery method (2), one would need to pre-compute alternative feasible pre-run-time schedules, latest start time schedules, and latest start times that cover all the possible processor failure scenarios, in order to determine whether all primaries and backups will still be able to meet their deadlines when any processor fails.

In Example 5, recovery method (1) and recovery method (3) are used, because of their advantages:
(a) recovery method (1) and method 3 are the simplest to implement, since the existing feasible pre-run-time schedule and latest start time schedule and latest start times can be used without significant changes to guarantee that all the surviving primaries and backups will be able to meet their deadlines after any permanent processor failure;
(b) recovery method (1) and method 3 require the least amount of redundant information, memory, and communication resources, since each processor would also only need to be able to access the primaries and backups that were assigned to that processor in the existing latest start time schedule.

In Example 5, recovery method (1) and recovery method (4) are used, because using recovery method (4) will increase system reliability compared with using recovery method (3), as simpler backups tend to be more reliable than primaries.

Embodiments of Methods of Tolerating Permanent Processor Failures and Permanent Software Failures If one backup is used for each primary, then the methods described in the present application provide the capability to recover from one permanent processor failure, as well as recover from any number of permanent primary software failures.

Note that if there is only one backup for each primary, then the system can only recover from one permanent processor failure that does not occur in conjunction with a software failure that occurs on a surviving processor. If (i) the capability to recover from more than one permanent processor failure, and/or (ii) the capability to recover from a permanent processor failure that occurs in conjunction with a software failure that occurs on a surviving processor is required, then a higher level of processor and process backup redundancy, that is, more than two processors and more than one backup for each primary will be required.

Although the embodiments of the methods described in the present application show examples of systems consisting of two processors and one backup for each primary, persons skilled in the art should be able to apply the methods to systems consisting of more than two processors and more than one backup for each primary, to attain the capabilities (i) and/or (ii).

By applying the methods described in the present application to a system that consists of even more processors, and even more backups for each primary, the resulting system can tolerate even more permanent processor failures and permanent processor failures, and achieve even higher levels of system robustness and reliability.

For example, by applying the methods described in the present application to a system that consists of three processors, and two backups for each primary, and scheduling the primary, first backup, and second backup each to a different processor, and computing a latest start time for the first backup, second backup and primary for each real-time process, as well as using the latest start times to handle the executions of all the backups and primaries on each processor at run-time, then one can further increase system robustness and reliability, by using primary and backup latest start times to allow primaries or backups to overrun, and significantly increase the chances that a primary or backup may meet its deadline both before, and after, up to two permanent processor failures, or any permanent processor failure that occurs in conjunction with a software failure that occurs on one of the surviving processors.

Run-Time Phase: Illustrative Embodiments of the Run-Time Scheduler Method

Figure 1:
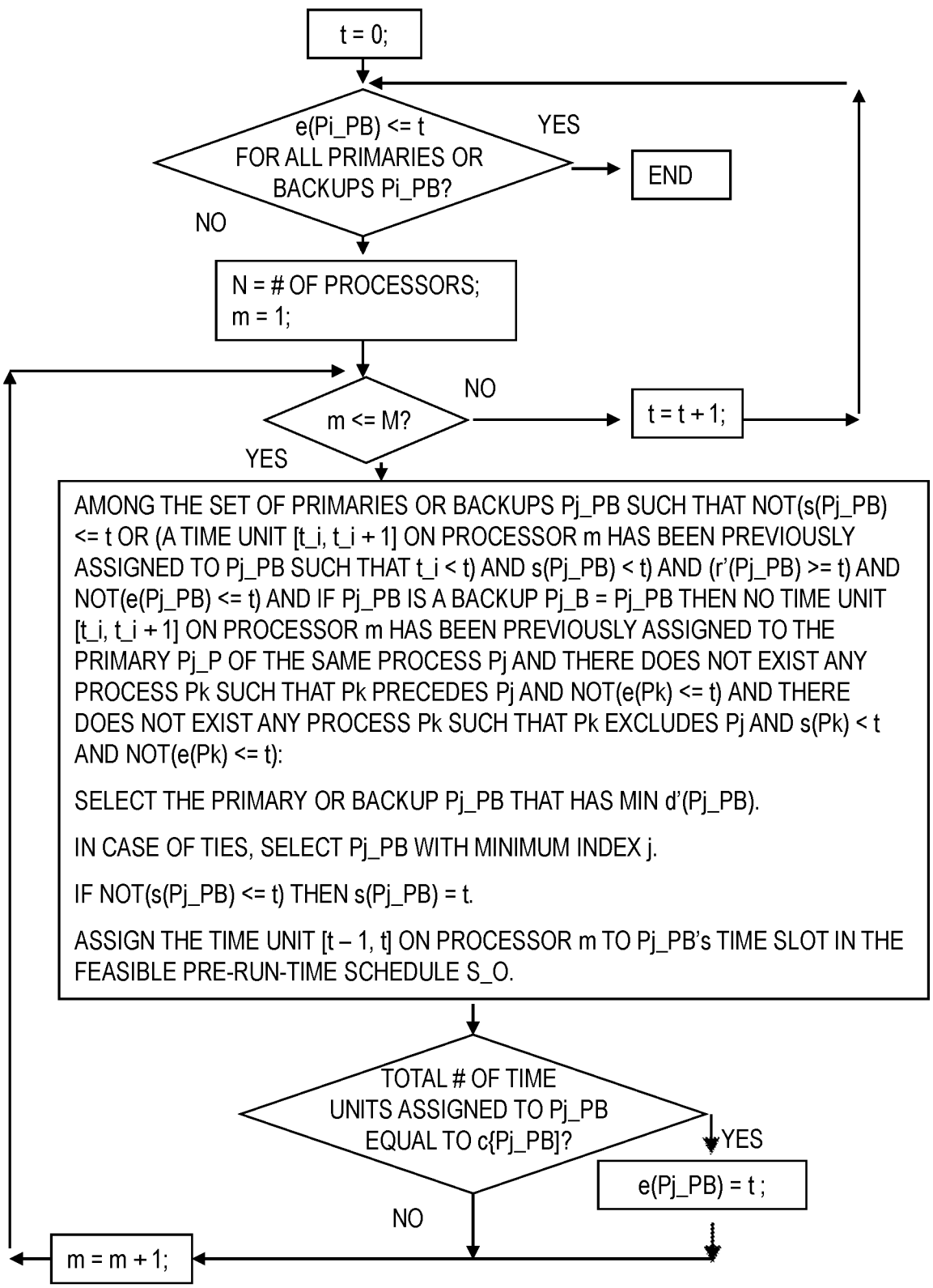
Figure 2A:
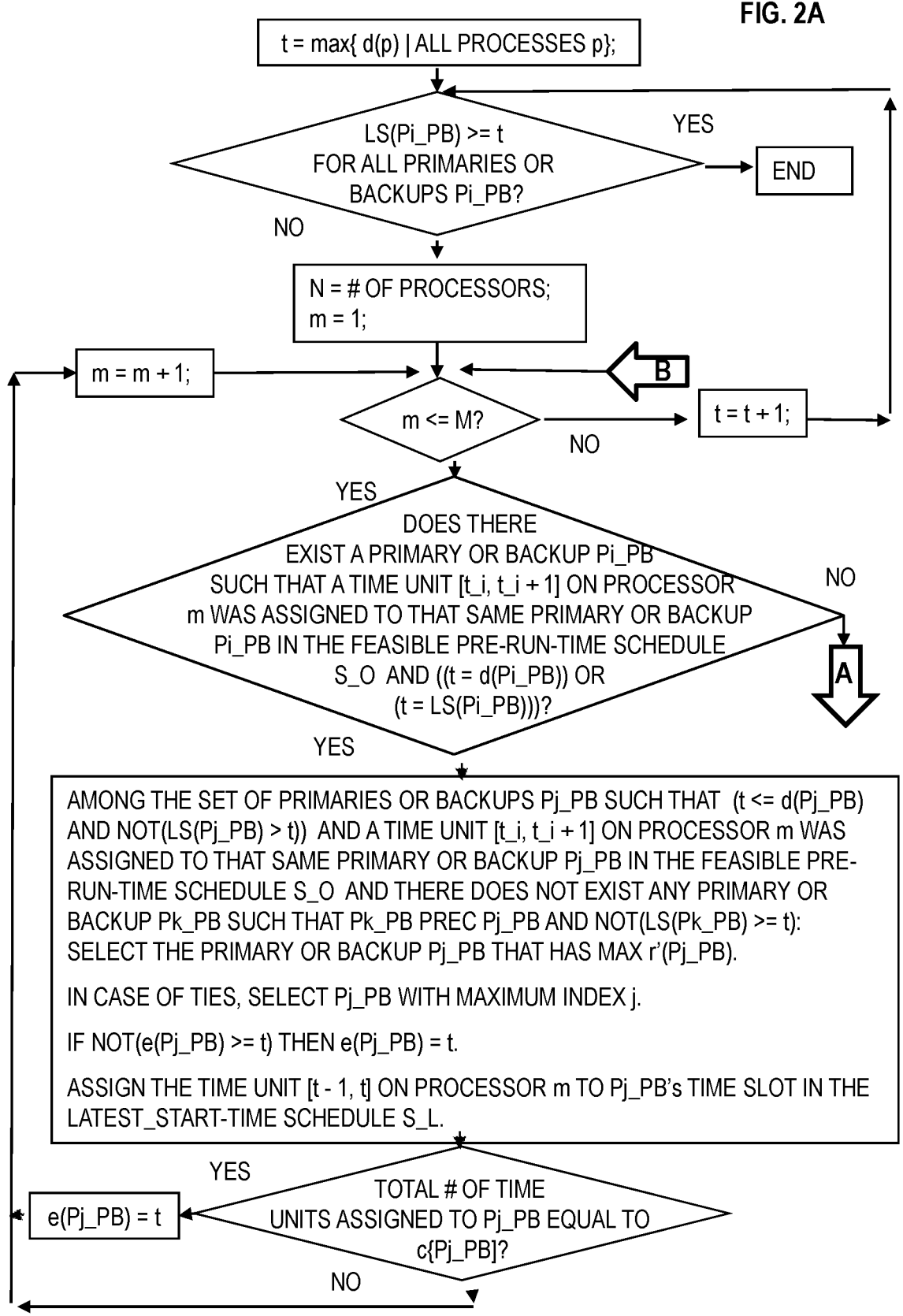
Figure 2B:
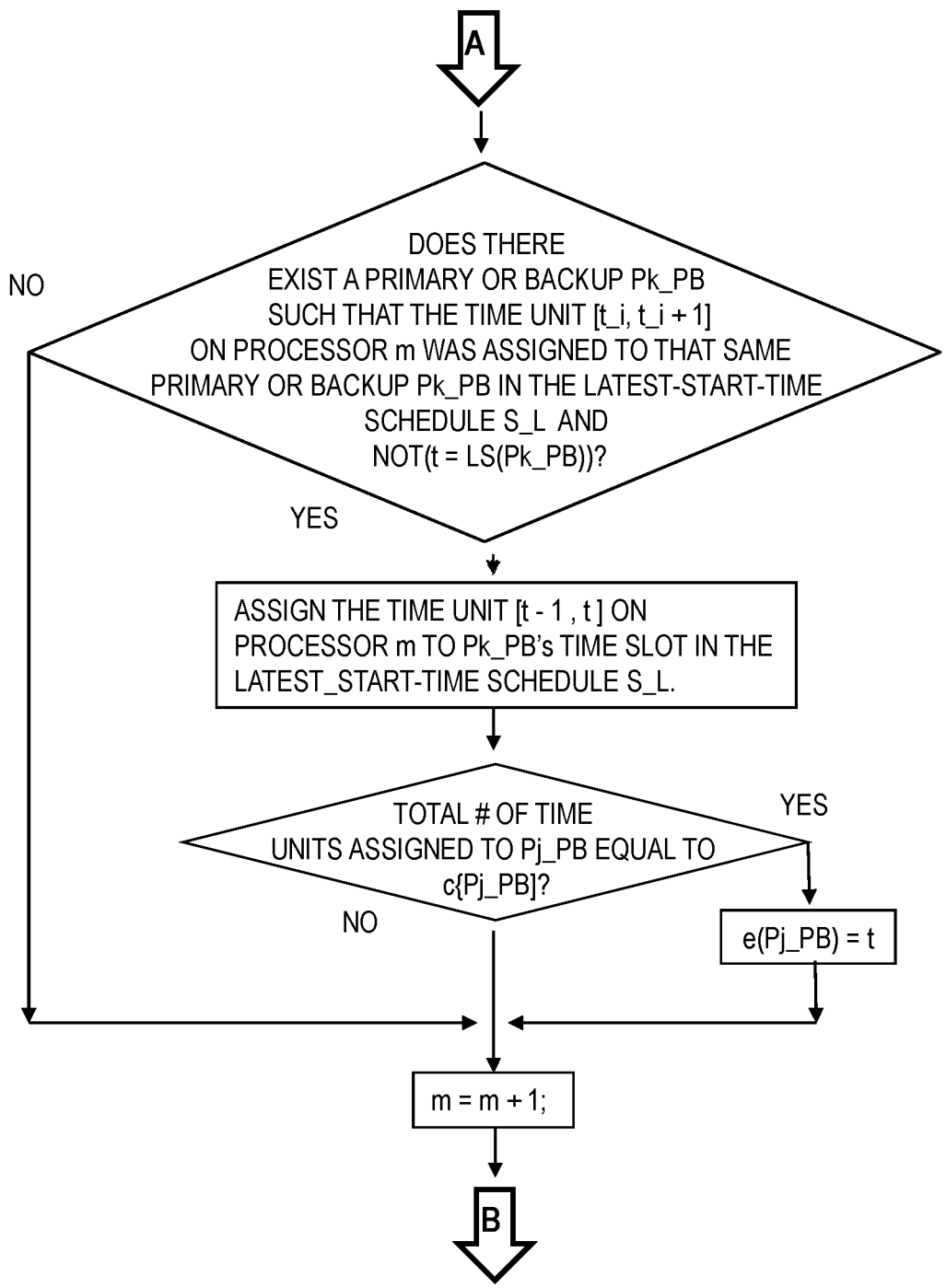
Figure 3B:
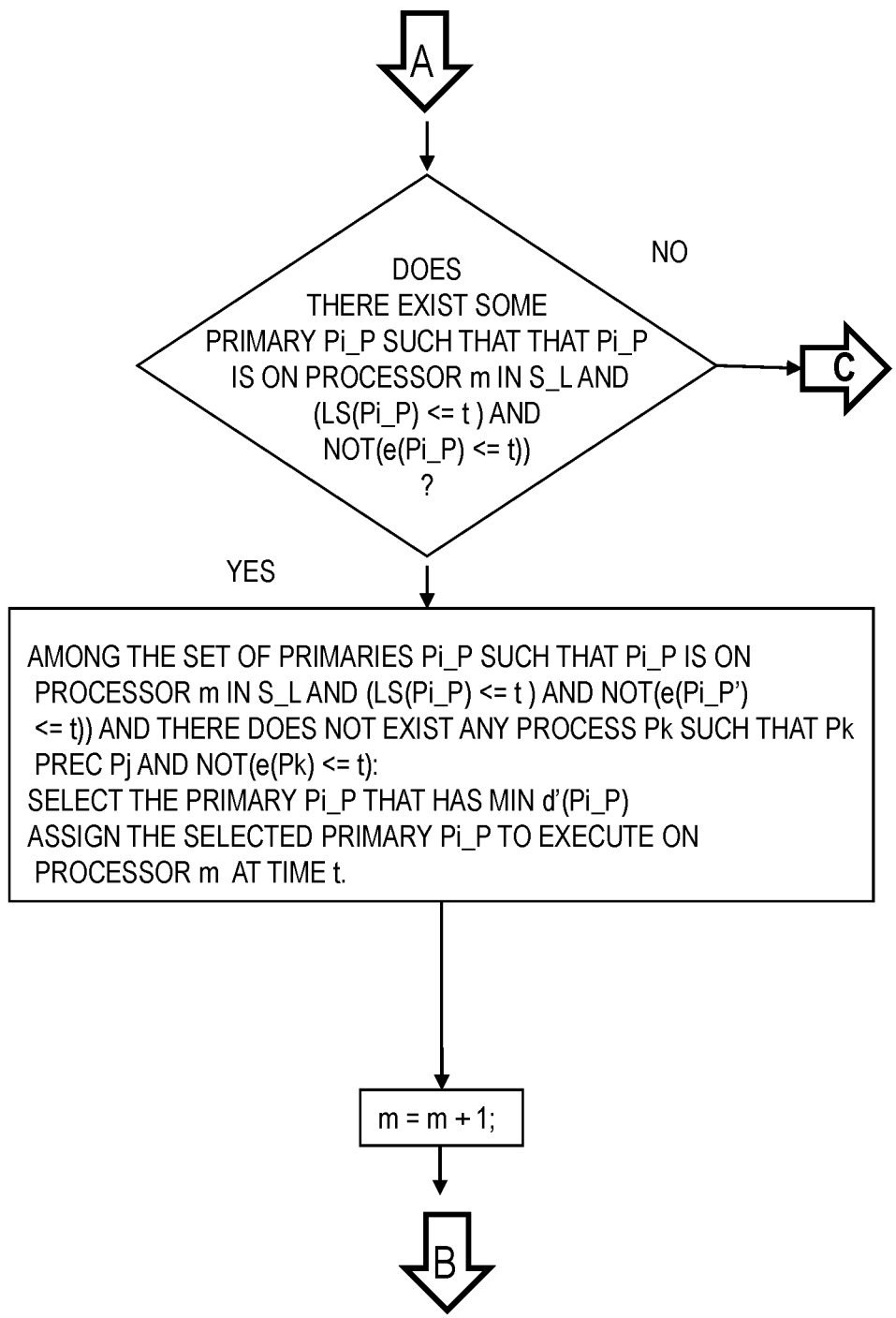
Figure 3C:
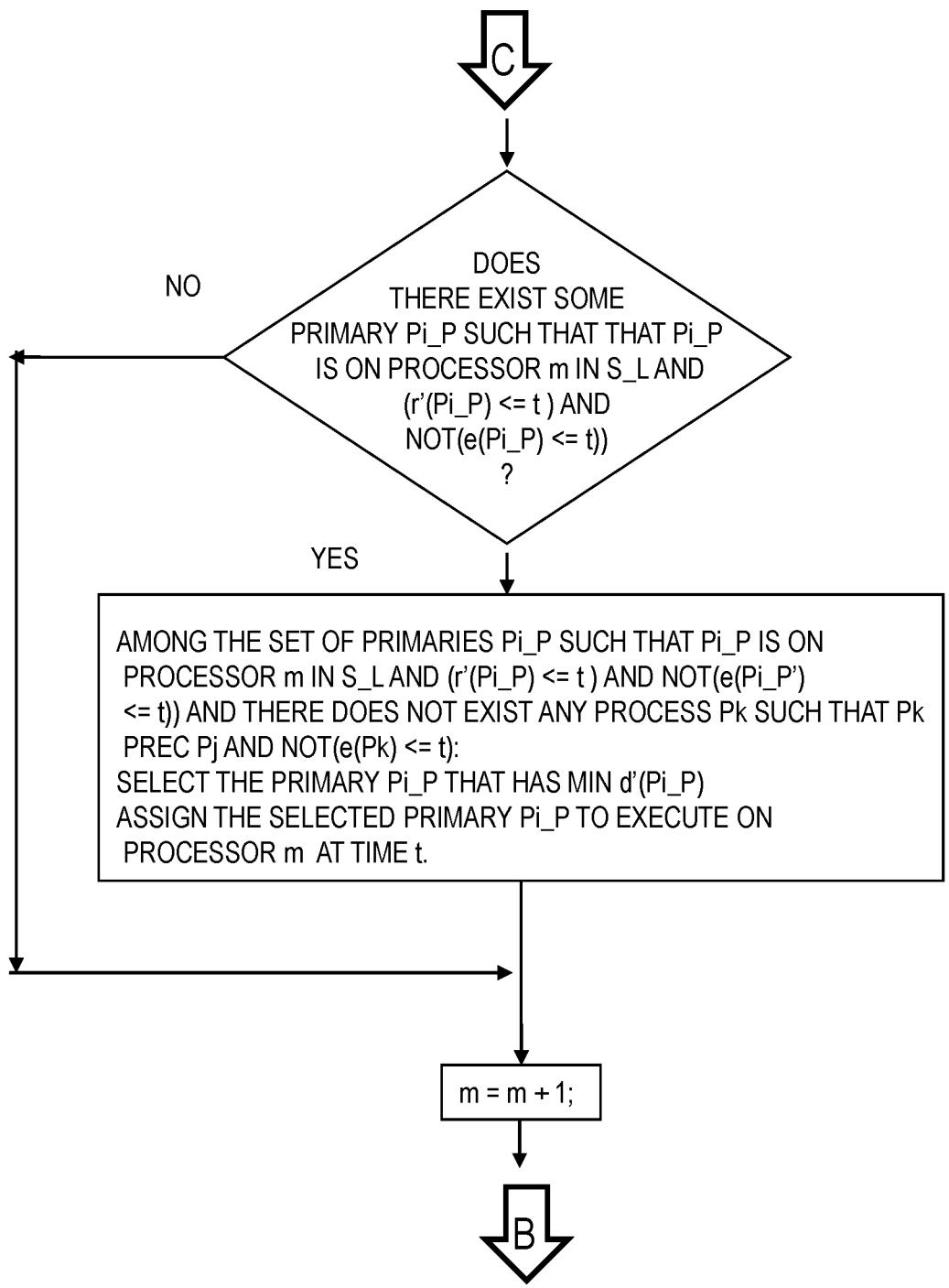

In the following we present illustrative embodiments of the run-time scheduler method, shown in FIGS. 3A-3C, for selecting real-time process primary or backups for execution, both before, and after, any permanent processor failure, on either a single processor or multiprocessors at run-time, while satisfying additional timing constraints such as release times, deadlines, precedence and exclusion relations, in a real-time system where for every real-time process, a primary and a separate backup are scheduled on different processors.

If recovery methods (1) and (3) are used, then when a permanent processor failure has occurred, each primary $p_{i_P}$ that was previously scheduled to execute on the failed processor will be abandoned, and the existing corresponding backup $p_{i_B}$ on a surviving processor will be activated for recovery: let ActivationTime($p_{i_B}$)=t. Each backup $p_{j_B}$ that was previously scheduled to execute on the failed processor will be abandoned, and the corresponding surviving primary $p_{j_{P'}}$ on a surviving processor will be activated for recovery: let ActivationTime($p_{j_{P'}}$)=t.

If recovery methods (1) and (4) are used, then when a permanent processor failure has occurred, each primary $p_{i_P}$ that was previously scheduled to execute on the failed processor will be abandoned, and the existing corresponding backup $p_{i_B}$ on a surviving processor will be activated for recovery: let ActivationTime($p_{i_B}$)=t. For each backup $p_{j_B}$ that was previously scheduled to execute on the failed processor, if there exists a feasible schedule in which all timing constraints are satisfied for that same backup $p_{j_B}$ together with all other surviving primaries and backups that are used for recovery on the surviving processor m, when that same backup $p_{j_B}$ is used to replace the corresponding primary $p_{j_P}$ on the surviving processor m for recovery, then use that same backup $p_{j_B}$ to replace the corresponding primary $p_{j_P}$ on the surviving processor m for recovery; otherwise use the corresponding existing primary $p_{j_P}$ on a surviving processor for recovery.

After a permanent processor failure, we call any primary $p_{i_P}$ for which the corresponding backup $p_{i_B}$ was previously scheduled before run-time on the permanently failed processor, a "surviving primary", and denote it as "$p_{i_{P'}}$". Any surviving primary $p_{i_{P'}}$ will have the same deadline that its corresponding backup $p_{i_B}$ had on the permanently failed processor, when re-computing latest start times, and when the run-time scheduler selects primaries and backups for execution on each surviving processor at run-time. Any surviving primary $p_{i_{P'}}$ will be given the same priority as a backup when the run-time scheduler selects primaries and backups for execution on each surviving processor at run-time.

Before and after a permanent processor failure, the run-time scheduler method selects primaries and backups for execution on each surviving processor $m_q$ at run-time in the following priority order:

Priority 0 Tasks: The highest priority is given to any backup $p_B$ or any surviving primary $p_{i_{P'}}$, such that the latest start time of $p_B$ or $p_{i_{P'}}$ has been reached, that is, $LS(p_B)$=t or $LS(p_{i_{P'}})$=t; or any backup $p_B$ or any surviving primary $p_{i_{P'}}$ such that $p_B$ has been activated and is ready, or $p_{i_{P'}}$ has been activated and is ready, and has the earliest adjusted deadline d'($p_B$) or d'($p_{i_{P'}}$) among all such tasks on $m_q$ that are ready and have not completed at time t. This is because successful completion of backup $p_B$ before its adjusted deadline d'($p_B$) or surviving primary $p_{i_{P'}}$ before its adjusted deadline d'($p_{i_{P'}}$), is considered to be the "last chance to avoid failure of the task/process" p or $p_i$, and potentially, the "last chance to avoid failure of the entire system."

Priority 1 Tasks: The next highest priority is given to any primary $p_P$ such that the latest start time of primary $p_P$ has been reached, that is, $LS(p_P)$=t, and $p_P$ has the earliest adjusted deadline d'$_{pP}$ among all such tasks on $m_q$ that are ready at time t.

Priority 2 Tasks: The next highest priority is given to any primary $p_P$ such that $p_P$ is ready at time t and $p_P$ has the earliest adjusted deadline d'$_{pP}$ among all such tasks on $m_q$ that are ready at time t.

Step (A)

At any time t, if for any backup $p_{i_B}$ or any surviving primary $p_{i_{P'}}$ that was scheduled on processor $m_q$ in the latest-start-time schedule $S_L$, the latest start time of $p_{i_B}$ or $p_{i_{P'}}$ has been reached, that is, $LS(p_{i_B})$=t or $LS(p_{i_{P'}})$=t; or if any backup $p_{i_B}$ or any surviving primary $p_{i_{P'}}$ such that $p_{i_B}$ has been activated and is ready or $p_{i_{P'}}$ has been activated and is ready, that is, ActivationTime($p_{i_B}$)≤t and r'($p_{i_B}$)≤t, or ActivationTime($p_{i_{P'}}$)≤t and r'($p_{i_{P'}}$)≤t, then for each processor $m_1$, . . . , $m_q$, . . . $m_N$ in turn, select, among all such backups $p_{i_B}$ and surviving primaries $p_{i_{P'}}$, a backup $p_{i_B}$ or a surviving primary $p_{i_{P'}}$ that has the earliest adjusted deadline d'[p] and which has not already been selected for execution on any processor at time t, for execution on each processor $m_q$ at time t.

---

At any time t
  if (∃p ∈ P: ($p_{i_B}$ on $m_q$) ∧
    ($LS(p_{i_B})$ = t) ∨ (ActivationTime($p_{i_B}$) ≤ t) ∧ (r'($p_{i_B}$) ≤ t)
    ∧¬(e'(p) ≤ t)))
  ∨ if (∃p ∈ P: ($p_{i_{P'}}$ on $m_q$) ∧
    (($LS(p_{i_{P'}})$ = t) ∨ (ActivationTime($p_{i_{P'}}$) <t) ∧ (r'($p_{i_{P'}}$) ≤ t)
    ∧¬(e'(p) ≤ t)))
  for $m_q$ = $m_1$ to $m_N$ do
    begin
      Among the set of backups
      { $P_{i_B}$ | ((($p_{i_B}$ on $m_q$) ∧ (($LS(p_{i_B})$ = t)
      ∧ ((ActivationTime($p_{i_B}$) ≤ t ∧ (r'($p_{i_B}$) ≤ t) ∧¬(e'($p_i$) ≤ t)))
      ∧ $p_{i_B}$ has not been selected for execution at time t) }
      and the set of surviving primaries
      { $p_{i_{P'}}$ | (($p_{i_{P'}}$ on $m_q$) ∧ (($LS(p_{i_{P'}})$ = t)
      ∨ ((ActivationTime($p_{i_{P'}}$) ≤ t) A (r'($p_{i_{P'}}$) ≤ t) ∧-(e'($p_i$) ≤ t)))
      ∧ $p_{i_{P'}}$ has not been selected for execution at time t) }
      ∧(∄$p_k$∈ P : $p_k$ PREC $p_i$ ∧ ¬(e' ($p_k$) ≤ t)))
      % no uncompleted $p_k$ such that $p_k$ PREC $p_i$
      }
      select the backup $p_{i_B}$ or surviving primary $p_{i_{P'}}$ that
      has min d'($p_i$).
      assign the selected $p_{i_B}$ or $p_{i_{P'}}$ to execute on $m_q$
      at time t.
    end

---

Step (B)

If after executing Step (A), there still exist some remaining processors that have not been assigned a process at time t, then for each remaining processor $m_q$, select for execution at time t a primary $p_{i_P}$ that was scheduled on processor $m_q$ in the latest-start-time schedule $S_L$, such that the latest start time of primary $p_{i_{P'}}$ has been reached, that is, $LS(p_{i_P})$=t, and $p_{i_P}$ has the earliest adjusted deadline d'$_{pP}$ among all such primaries on $m_q$ that are ready at time t and which has not already been selected for execution on any processor at time t, for execution on each processor $m_q$ at time t.

---

At any time t
  if (∃p ∈ P: ($p_{i_P}$ on $m_q$) ∧
    (($LS(p_{i_P})$ = t) ∧¬(e'(p) ≤ t))) then
  for $m_q$ = $m_1$ to $m_N$ do
    begin
      Among the set of primaries
      { $P_{i_P}$ | ($p_{i_P}$ on $m_q$) ∧ (($LS(p_{i_P})$ = t) ∧¬(e'($p_i$) ≤ t)))
      ∧ $p_{i_P}$ has not been selected for execution at time t) }
      ∧(∄$p_k$∈ P: $p_k$ PREC $p_i$ ∧ ¬(e'($p_k$) ≤ t)))
      % no uncompleted $p_k$ such that pk PREC $p_i$
      }
      select the primary $p_{i_P}$ that has min d' ($p_i$).

```
    assign the selected primary p_{i_P} to execute on m_q
       at time t.
    end
```

Step (C)
If after executing Step (B), there still exist some remaining processors that have not been assigned a process at time t, then for each remaining processor $m_q$, select for execution at time t a primary $p_{i_P}$ that was scheduled on processor $m_q$ in the latest-start-time schedule $S_L$, such that primary $p_{i_P}$ is ready, that is, $r'(p_{i_P}) \leq t$, and $p_{i_P}$ has the earliest adjusted deadline $d'_{p_iP}$ among all such primaries on $m_q$ that are ready at time t and which has not already been selected for execution on any processor at time t, for execution on each processor $m_q$ at time t.

```
At any time t
   if (∃p ∈ P: (p_{i_P} on m_q) ∧
         (r'(p_{i_P}) ≤ t) ∧¬(e'(p) ≤ t))) then
      for m_q = m_1 to m_N do
         begin
            Among the set of primaries
               { p_{iP} | (p_{iP} on m_q) ∧ ((r'(p_{iP}) ≤ t) ∧¬(e'(p_i) ≤ t)))
                 ∧ p_{iP} has not been selected for execution at time t) }
                 ∧(∄p_k∈ P: p_k PREC p_i ∧ ¬(e'(p_k) ≤ t)))
                 % no uncompleted pk such that p_k PREC p_i
               }
            select the primary p_{iP} that has min d' (p_i).
            assign the selected primary p_{iP} to execute on mq
               at time t.
         end
```

First Illustrative Embodiment of the Main Run-Time Scheduler Method for Effectively Handling Primary and Backup Overruns and Underruns while Tolerating Permanent Processor Failures and Permanent Software Failures At run-time there are the following main situations when the run-time scheduler may need to be invoked to perform a scheduling action:
  (a) At a time t when a permanent processor failure has occurred.
  (b) At a time t when some primary $p_P$ or backup $p_B$ has just completed its computation.
  (c) At a time t that is equal to the latest start time $LS(p_P)$ of some primary $p_P$ or the latest start time $LS(p_B)$ of some backup $p_B$.
  (d) At a time t that is equal to the release time $R_{p_k}$ of some process $p_k$.
  (e) At a time t that is equal to the deadline $d_{p_i}$ of an uncompleted process $p_i$. In this case, $p_i$ has just missed its deadline, and the system should handle the error.
  (f) At a time t when some primary $p_P$ generates a fault, in which case the corresponding backup $p_B$ will be activated, and the primary $p_P$ will be aborted.
  (g) At a time t when some backup $p_B$ generates a fault, and the system should handle the error.

Let t be the current time.
  Step 0. In situation (a) above, when a permanent processor failure has occurred, in this first illustrative embodiment of the main run-time scheduler method, the recovery methods (1) and (3) are used as follows. Each primary $p_{i_P}$ that was previously scheduled to execute on the failed processor will be abandoned, and the existing corresponding backup $p_{i_B}$ on a surviving processor will be activated for recovery: let ActivationTime($p_{i_B}$)=t. Each backup $p_{j_B}$ that was previously scheduled to execute on the failed processor will be abandoned, and the corresponding surviving primary $p_{i_{P'}}$ on a surviving processor will be activated for recovery: let ActivationTime($p_{i_{P'}}$)=t.

After a permanent processor failure, we call any primary $p_{i_P}$ for which the corresponding backup $p_{i_B}$ was previously scheduled before run-time on the permanently failed processor, a "surviving primary", and denote it as "$p_{i_{P'}}$". Any surviving primary $p_{i_{P'}}$ will have the same deadline that its corresponding backup $p_{i_B}$ had on the permanently failed processor, when re-computing latest start times, and when the run-time scheduler selects primaries and backups for execution on each surviving processor at run-time. Any surviving primary $p_{i_{P'}}$ will be given the same priority as a backup when the run-time scheduler selects primaries and backups for execution on each surviving processor at run-time.

Recompute the latest start times for the primaries and backups on each surviving processor.

In situation (e) above, check whether any process p has missed its deadline $d_p$. If so perform error handling.

In situation (g) above, check whether any backup $p_B$ has generated a fault. If so perform error handling.

Step 1. In situation (f) above, if a primary $p_P$ generates a permanent software failure, then the primary $p_P$ will be aborted, and the corresponding backup $p_B$ will be activated; let ActivationTime($p_B$)=t.
  Step 2. Whenever the run-time scheduler is invoked due to any of the situations (b), (c) and (d) above at time t, do the following:

In situation (c) above, if the latest start time of a backup $p_B$ has been reached, that is, $LS(p_B)=t$, then the primary $p_P$ will be aborted, and the corresponding backup $p_B$ will be activated; let ActivationTime($p_B$)=t.

Any primary $p_P$ or backup $p_B$ that was previously executing at time t−1 but has either completed or has overrun at time t will be removed from the latest start time schedule.

Step 3. If any primary $p_P$ has reached its latest start time $LS(p_P)$ at time t, but was not selected to execute on any processor at time t, then abort primary $p_P$ and activate its corresponding backup $p_B$ at time t; let ActivationTime($p_B$)=t.

Recompute the latest start time $LS(p_P)$ or $LS(p_B)$ for each uncompleted primary $p_P$ or backup $p_B$ that was executing at time t−1 and has not overrun at time t. Note that once the initial latest start times have been computed before run-time, at run-time the run-time overhead can be significantly reduced by only recomputing the latest start time $LS(p_P)$ or $LS(p_B)$ for each uncompleted primary $p_P$ or backup $p_B$ that had just been preempted that was executing at time t−1.

Apply the Run-Time Scheduler Method Described Earlier:

Before and after a permanent processor failure, the run-time scheduler method selects primaries and backups for execution on each surviving processor $m_q$ at run-time in the following priority order:

Priority 0 Tasks: The highest priority is given to any backup $p_B$ or any surviving primary $p_{i_{P'}}$ such that the latest start time of $p_B$ or $p_{i_{P'}}$ has been reached, that is, $LS(p_B)=t$ or $LS(p_{i_{P'}})=t$; or any backup $p_B$ or any surviving primary $p_{i_{P'}}$ such that $p_B$ has been activated or $p_{i_{P'}}$ has been activated; and has the earliest adjusted deadline $d'(p_B)$ or $d'(p_{i_{P'}})$ among all such tasks on $m_q$ that are ready and have not completed at time t. This is because successful completion of backup $p_B$ before its adjusted deadline $d'(p_B)$ or surviving primary $p_{i_{P'}}$ before its adjusted deadline $d'(p_{i_{P'}})$, is considered to be the "last chance to avoid failure of the task/process" p or $p_i$, and potentially, the "last chance to avoid failure of the entire system."

Priority 1 Tasks: The next highest priority is given to any primary $p_P$ such that the latest start time of primary $p_P$ has been reached, that is, $LS(p_P)=t$, and $p_P$ has the earliest adjusted deadline $d'_{pP}$ among all such tasks on $m_q$ that are ready at time t.

Priority 2 Tasks: The next highest priority is given to any primary $p_P$ such that $p_P$ is ready at time t and $p_P$ has the earliest adjusted deadline $d'_{pP}$ among all such tasks on $m_q$ that are ready at time t.

Step 4. At time 0 and after servicing each timer interrupt, and performing necessary error detection, error handling, latest start time re-calculations, and making scheduling decisions; —reset the timer to interrupt at the earliest time that any of the events (c), (d), and (e) above may occur.

Step 5. Let the primaries $p_P$ or backups $p_B$ that were selected in Step 3 start to execute at run-time t.

The theoretical worst-case time complexity of all the steps in the Run-Time-Scheduler is O(n).

An important and desirable property of this method is that, in a case where there may not be enough spare time available, one can always "skip" re-computing some subset of the latest start times $LS(p_{PB})$ at any time, and rely on the most recently computed latest start times $LS(p_{PB})$ to schedule the primaries and backups, while still guaranteeing that all the timing constraints will be satisfied, with the only consequence being a possible reduction in the length of time that some primaries and backups may be allowed to overrun, because some recent primary and backup underruns may not have been taken into account.

Example 4

FIG. 5D shows a possible run-time execution on two processors $m_1$ and $m_2$ of the primaries and backups in the set of processes A, B, C, D, E, F, G, H, I shown in FIG. 5A of Example 1, assuming that processor $m_1$ will suffer a permanent hardware failure at time t=4.5, but for every process in the set of processes A, B, C, D, E, F, G, H, I either a primary or a backup will still be able to complete on processor $m_2$ before their deadlines despite overrunning or underrunning. The latest start time values s of the primaries and backups in the set of processes A, B, C, D, E, F, G, H, I shown in FIG. 5C in Example 3 will be used at run time t=0. In FIG. 5D, $F_P$ underruns, while $A_P$, $C_P$, $H_P$ overruns. The portions of the run-time execution during which $A_P$, $C_P$, $H_P$ overruns are shown using dashed lines.

In this Example 4 it is assumed that when a permanent processor failure occurs, recovery methods (1) and (3) will be used.

(Note that in the next Example 5, when a permanent processor failure occurs, recovery methods (1) and (4) will be used instead.)

At run-time t=0: the latest start time schedule is shown in FIG. 5C. The run-time scheduler will select primary $A_P$ and primary $H_P$ to run on processor $m_1$ and processor $m_2$ respectively as priority 2 tasks, because A and H are the processes that are ready with the earliest adjusted deadline at time t=0. At t=0, the timer will be programmed to interrupt at $F_P$ and $C_P$'s latest start times $LS(F_P)=LS(C_P)=2$, before dispatching $A_P$ and $H_P$ for execution.

At time t=2: the timer interrupts at $F_P$ and $C_P$'s latest start times $LS(F_P)=LS(C_P)=2$; while both $H_P$ and $A_P$ have not completed and $A_P$ overruns. After re-computing the latest-start-times, at run-time t=2: the latest start time schedule is shown in FIG. 5E. $LS(H_P)=11$, and $A_P$s time slot is removed from the latest-start-time schedule. The run-time scheduler will first select primary $F_P$ to run on processor $m_1$ as a priority 1 task, because primary $F_P$'s latest start time $LS(F_P)=2$ has been reached. Then the run-time scheduler will select primary $C_P$ to run on processor $m_2$ as a priority 1 task, because primary $C_P$'s latest start time $LS(C_P)=2$ has also been reached. At t=2, the timer will be programmed to interrupt at primary Ep's latest-start-time $LS(E_P)=4$, before dispatching $F_P$ and $C_P$ for execution.

At time t=3: primary $F_P$ underruns, while $C_P$ has not completed. After re-computing the latest-start-times, at run-time t=3: the latest start time schedule is shown in FIG. 5F, $LS(C_P)=7$, and backup $F_B$s time slot will be removed from the latest-start-time schedule. The run-time scheduler will select $A_P$ to run on $m_1$ as a priority 2 task. Note that $A_P$ is able to use the portion of the time slot that is unused due to primary $F_P$ 's underrun to overrun. The run-time scheduler will select $C_P$ to run on $m_2$ as a priority 2 task, because $C_P$ has the earliest deadline among all tasks on $m_2$ that are ready at time t=3. At t=3, the timer will be programmed to interrupt at primary Ep's latest start time $LS(E_P)=4$, before dispatching $A_P$ and $C_P$ for execution.

At time t=4: primaries $A_P$ and $C_P$ have not completed, and $C_P$ overruns.

After re-computing the latest-start-times, at run-time t=4: the latest start time schedule is shown in FIG. 5G, Cps time slot is removed from the latest-time schedule. The run-time scheduler will select primary Ep to run on processor $m_1$ as a priority 1 task, because primary Ep's latest start time $LS(E_P)=4$ has been reached.

The run-time scheduler will select primary $C_P$ to start overrunning on $m_2$ as a priority 2 task. Note that $C_P$ is able to use the time slot that was previously reserved for backup $F_B$ to overrun—$F_B$ 's time slot is not used anymore due to the underrun of primary $F_P$ at time 3. At t=4, the timer will be programmed to interrupt at primary $G_P$'s and backup $E_B$s latest start time $LS(G_P)=LS(E_B)=5$, before dispatching $E_P$ and $C_P$ for execution.

At time t=4.5 processor $m_1$ permanently fails.

Primaries $A_P$, $E_P$ that previously were in execution and had not completed yet on the failed processor $m_1$ at time t=4.5 will be aborted and the corresponding backups $A_B$, $E_B$ on the surviving processor $m_2$ will be activated.

Note that all the surviving primaries, that is, $H_{P'}$ and $C_{P'}$, on the surviving processor $m_2$ for which the corresponding backups $H_B$, $C_B$ were previously scheduled before run-time on the permanently failed processor $m_1$, will be given the same priority as a backup when the run-time scheduler selects primaries and backups for execution on the surviving processor $m_2$.

Figure 4B:
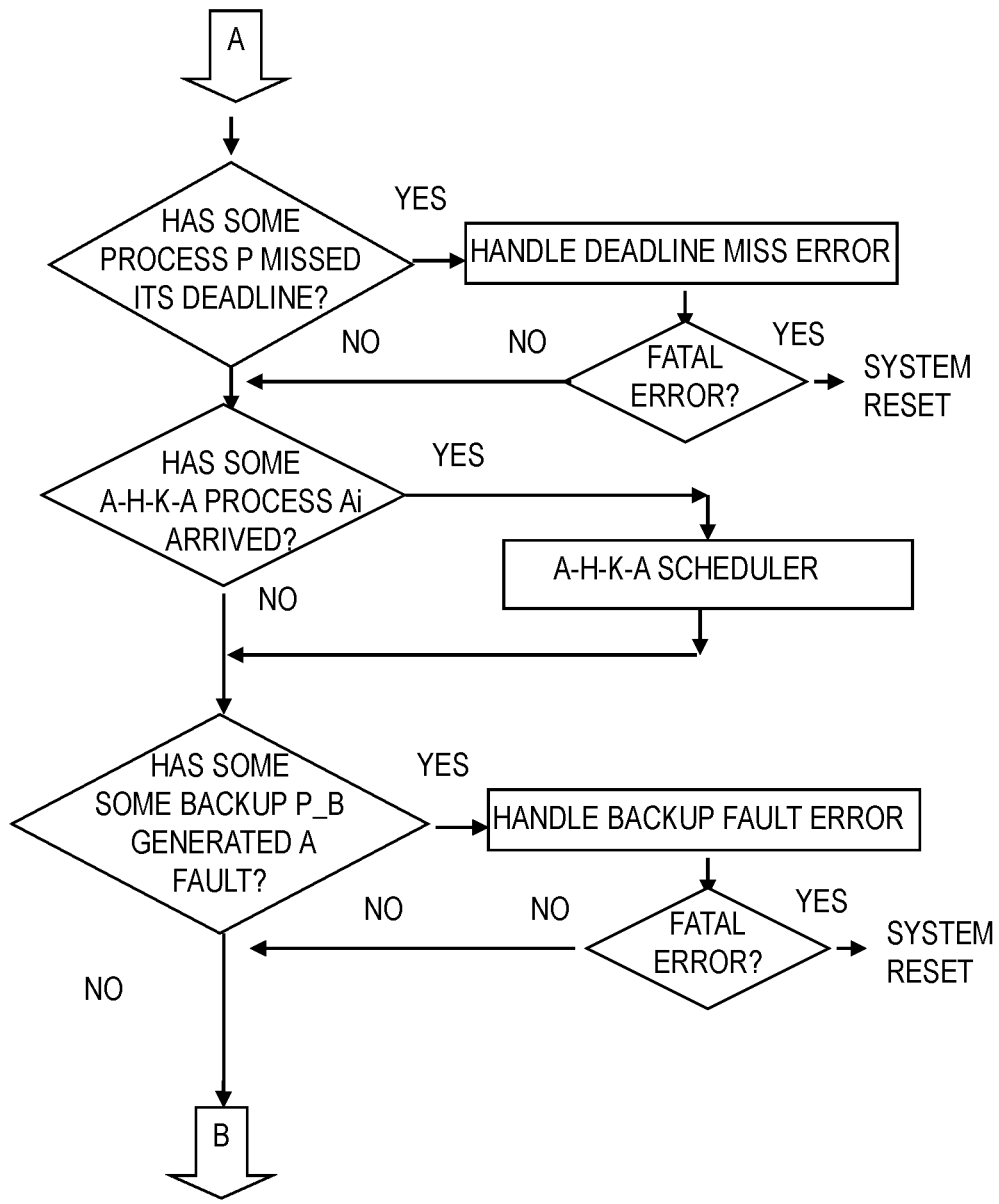
Figure 4C:
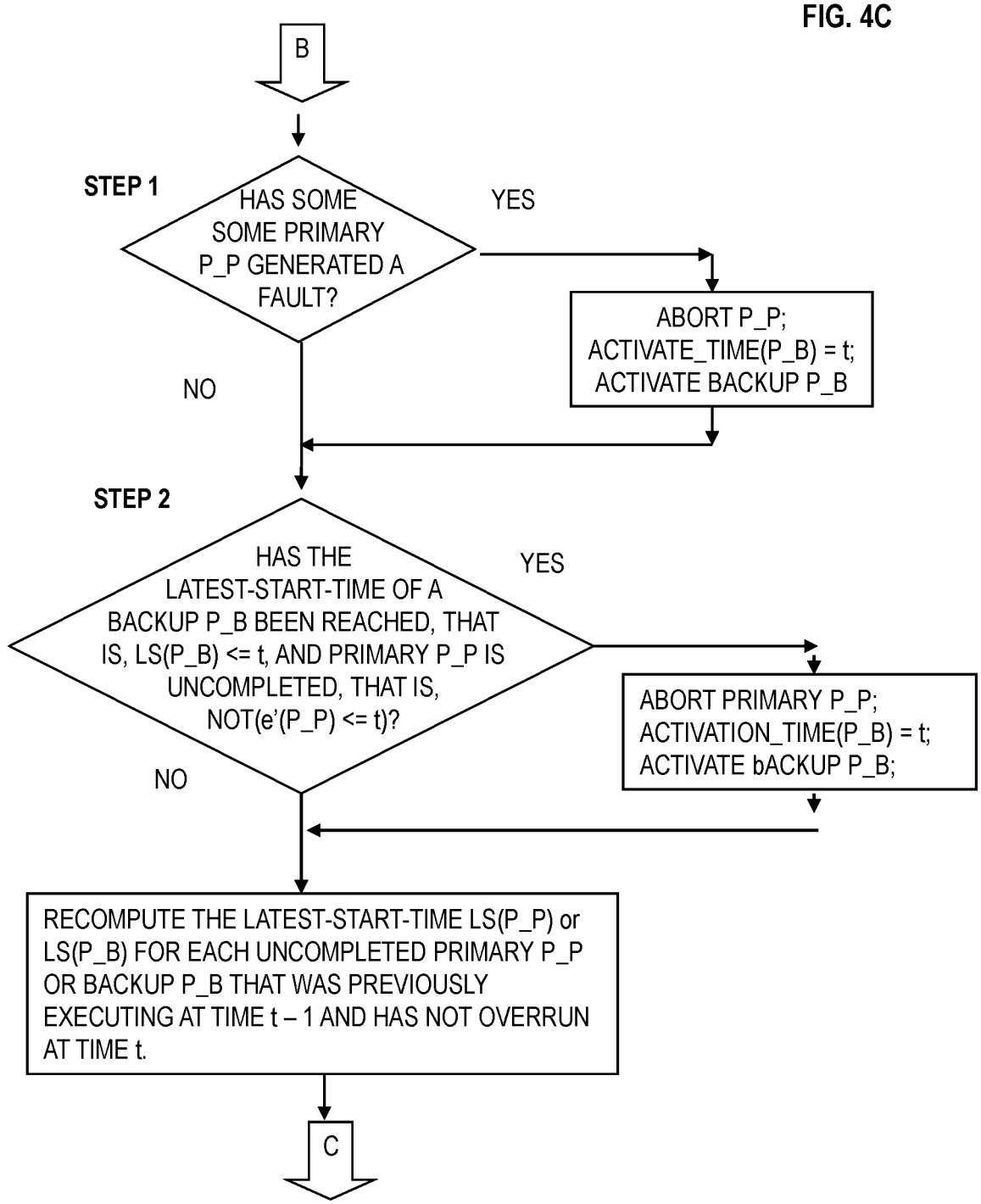
Figure 4D:
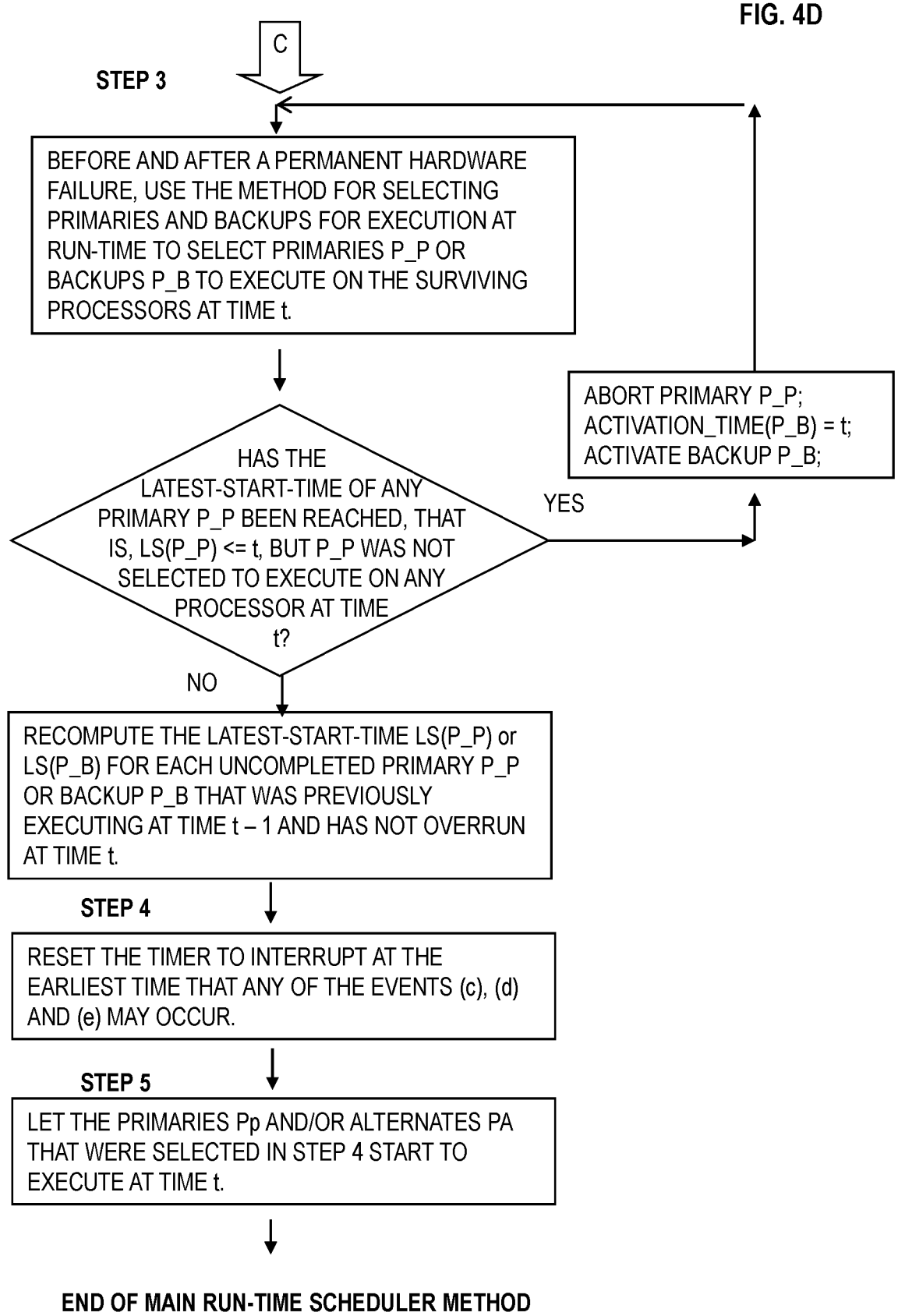

After processor $m_1$ has failed, all the primaries and backups on processor $m_1$ will cease to exist. Because $H_B$ does not exist anymore, $H_P$ is not constrained to complete before $H_B$ anymore, so the latest start time for $H_{P'}$ $LS(H_P)$ =12, as shown in FIG. 4.

At time t=5: survivor primaries $H_{P'}$ and $C_{P'}$ have not completed yet, while backup $E_B$'s earliest start time $LS(E_B)$ =5 has been reached. After re-computing the latest-start-times, at run-time t=4.5 and 5: the latest start time schedule is shown in FIG. 5H. The run-time scheduler will select backup $E_B$ to run on processor $m_2$ as a priority 0 task, because backup $E_B$'s latest start time $LS(E_B)=5$ has been reached, and it has the earliest adjusted deadline among all backups or surviving primaries for which their latest start times have been reached or have been activated on $m_2$ at time t=5. At t=5, the timer will be programmed to interrupt at backup $G_B$'s latest start time $LS(G_B)$=6, before dispatching $E_B$ for execution.

At time t=6: backup $E_B$ completes, while backup $G_B$'s earliest start time $LS(G_B)$=6 has been reached. After re-computing the latest-start-times, at run-time t=6: the latest start time schedule is shown in FIG. 5I. The run-time scheduler will select backup $G_B$ to run on processor $m_2$ as a priority 0 task, because backup $G_B$'S latest start time $LS(G_B)$=6 has been reached, and it has the earliest adjusted deadline among all backups or surviving primaries for which their latest start times have been reached or have been activated on $m_2$ at time t=6. At t=6, the timer will be programmed to interrupt at backup $D_B$'s latest start time $LS(D_B)$=8, before dispatching $G_B$ for execution.

At time t=7: backup $G_B$ completes. The recomputed latest-start-time schedule is shown in FIG. 5J. The run-time scheduler will select backup $D_B$ to run on processor $m_2$ as a priority 0 task, because backup $D_B$ has the earliest adjusted deadline among all backups or surviving primaries for which their latest start times have been reached or have been activated on $m_2$ at time t=7.

At t=7, the timer will be programmed to interrupt at backup $B_B$'S latest start time $LS(B_B)$=9, before dispatching $D_B$ for execution.

At time t=8: backup $D_B$ completes. The recomputed latest-start-time schedule is shown in FIG. 5K. The run-time scheduler will select backup $B_B$ to run on processor $m_2$ as a priority 0 task, because backup $B_B$ has the earliest adjusted deadline among all backups or surviving primaries for which their latest start times have been reached or have been activated on $m_2$ at time t=8.

At t=8, the timer will be programmed to interrupt at backup $I_B$'s latest start time $LS(I_B)$=10, before dispatching $B_B$ for execution.

At time t=9: backup $B_B$ completes. The recomputed latest-start-time schedule is shown in FIG. 5L. The run-time scheduler will select backup $I_B$ to run on processor $m_2$ as a priority 0 task, because backup $I_B$ has the earliest adjusted deadline among all backups or surviving primaries for which their latest start times have been reached or have been activated on $m_2$ at time t=9.

At t=9, the timer will be programmed to interrupt at survivor primary $H_{P'}$'s latest start time $LS(H_{P'})$=10, before dispatching $I_B$ for execution.

At time t=10: backup $I_B$ completes. The recomputed latest-start-time schedule is shown in FIG. 5M. The run-time scheduler will select survivor primary $C_{P'}$ to run on processor $m_2$ as a priority 0 task, because surviving primary $C_{P'}$ has the earliest adjusted deadline among all backups or surviving primaries for which their latest start times have been reached or have been activated on $m_2$ at time t=10.

At t=10, the timer will be programmed to interrupt at survivor primary $H_{P'}$'s latest start time $LS(H_{P'})$=12, before dispatching $C_{P'}$ for execution.

At time t=11: survivor primary $C_{P'}$ completes. The recomputed latest-start-time schedule is shown in FIG. 5M. The run-time scheduler will select survivor primary $H_{P'}$ to run on processor $m_2$ as a priority 0 task, because surviving primary $H_{P'}$ has the earliest adjusted deadline among all backups or surviving primaries for which their latest start times have been reached or have been activated on $m_2$ at time t=11.

At t=11, the timer will be programmed to interrupt at backup $A_B$'s latest start time $LS(A_B)$=14, before dispatching $H_{P'}$ for execution.

At time t=14: survivor primary $H_{P'}$ completes after overrunning. The re-computed latest-start-time schedule is shown in FIG. 5N. The run-time scheduler will select backup $A_B$ to run on processor $m_2$ as a priority 0 task, because backup $A_B$ latest start time $LS(A_B)$=14 has been reached, and has the earliest adjusted deadline among all backups or surviving primaries for which their latest start times have been reached or have been activated on $m_2$ at time t=14. At t=14, the timer will be programmed to interrupt at backup $A_B$'s deadline $d_{AB}$=15, before dispatching $A_B$ for execution.

At time t=15: backup $A_B$ completes before its deadline.

Second Illustrative Embodiment of the Main Run-Time Scheduler Method for Effectively Handling Primary and Backup Overruns and Underruns while Tolerating Permanent Processor Failures and Permanent Software Failures At run-time there are the following main situations when the run-time scheduler may need to be invoked to perform a scheduling action:

(a) At a time t when a permanent processor failure has occurred.

(b) At a time t when some primary $p_P$ or backup $p_B$ has just completed its computation.

(c) At a time t that is equal to the latest start time $LS(p_P)$ of some primary $p_P$ or the latest start time $LS(p_B)$ of some backup $p_B$.

(d) At a time t that is equal to the release time $R_{p_k}$ of some process $p_k$.

(e) At a time t that is equal to the deadline $d_{p_i}$ of an uncompleted process $p_i$. In this case, $p_i$ has just missed its deadline, and the system should handle the error.

(f) At a time t when some primary $p_P$ generates a fault, in which case the corresponding backup $p_B$ will be activated, and the primary $p_P$ will be aborted.

(g) At a time t when some backup $p_B$ generates a fault, and the system should handle the error.

Let t be the current time.

Step 0. In situation (a) above, when a permanent processor failure has occurred, in this first illustrative embodiment of the main run-time scheduler method, the recovery methods (1) and (4) are used as follows. Each primary $p_{i_P}$ that was previously scheduled to execute on the failed processor will be abandoned, and the existing corresponding backup $p_{i_B}$ on a surviving processor will be activated for recovery: let ActivationTime($p_{i_B}$)=t.

For each backup $p_{j_B}$ that was previously scheduled to execute on the failed processor, if there exists a feasible schedule in which all timing constraints are satisfied for that same backup $p_{j_B}$ together with all other surviving primaries and backups that are used for recovery on the surviving processor m, when that same backup $p_{j_B}$ is used to replace the corresponding primary $p_{j_P}$ on the surviving processor m for recovery, then use that same backup $p_{j_B}$ to replace the corresponding primary $p_{j_P}$ on the surviving processor m for recovery; otherwise use the corresponding existing primary $p_{j_P}$ on a surviving processor for recovery. In the latter case, when an existing primary $p_{j_P}$ on a surviving processor is used for recovery, then $p_{j_P}$ will be called a "surviving primary" and denoted as $p_{j_{P'}}$. Let ActivationTime($p_{j_{P'}}$)=t, and let surviving primary $p_{i_{P'}}$, for which the corresponding backup $p_{i_B}$ was previously scheduled before run-time on the permanently failed processor, have the same deadline that its corresponding backup $p_{i_B}$ had on the permanently failed processor, when re-computing latest start times, and when the run-time scheduler selects primaries and backups for execution on each surviving processor at run-time.

Any surviving primary $p_{i_{p'}}$ will be given the same priority as a backup when the run-time scheduler selects primaries and backups for execution on each surviving processor at run-time.

Recompute the latest start times for the primaries and backups on each surviving processor.

In situation (e) above, check whether any process p has missed its deadline $d_p$. If so perform error handling.

In situation (g) above, check whether any backup $p_B$ has generated a fault. If so perform error handling.

Step 1. In situation (f) above, if a primary $p_P$ generates a permanent software failure, then the primary $p_P$ will be aborted, and the corresponding backup $p_B$ will be activated; let ActivationTime($p_B$)=t.

Step 2. Whenever the run-time scheduler is invoked due to any of the situations (b), (c) and (d) above at time t, do the following:

In situation (c) above, if the latest start time of a backup $p_B$ has been reached, that is, LS($p_B$)=t, then the primary $p_P$ will be aborted, and the corresponding backup $p_B$ will be activated; let ActivationTime($p_B$)=t.

Any primary $p_P$ or backup $p_B$ that was previously executing at time t−1 but has either completed or has overrun at time t will be removed from the latest start time schedule.

Step 3. If any primary $p_P$ has reached its latest start time LS($p_P$) at time t, but was not selected to execute on any processor at time t, then abort primary $p_P$ and activate its corresponding backup $p_B$ at time t; let ActivationTime($p_B$)=t.

Recompute the latest start time LS($p_P$) or LS($p_B$) for each uncompleted primary $p_P$ or backup $p_B$ that was executing at time t−1 and has not overrun at time t. Note that once the initial latest start times have been computed before run-time, at run-time the run-time overhead can be significantly reduced by only recomputing the latest start time LS($p_P$) or LS($p_B$) for each uncompleted primary $p_P$ or backup $p_B$ that had just been preempted that was executing at time t−1.

Apply the Run-Time Scheduler Method Described Earlier:

Before and after a permanent processor failure, the run-time scheduler method selects primaries and backups for execution on each surviving processor $m_q$ at run-time in the following priority order:

Priority 0 Tasks: The highest priority is given to any backup $p_B$ or any surviving primary $p_{i_{p'}}$ such that the latest start time of $p_B$ or $p_{i_{p'}}$ has been reached, that is, LS($p_B$)=t or LS($p_{i_{p'}}$)=t; or any backup $p_B$ or any surviving primary $p_{i_{p'}}$ such that $p_B$ has been activated or $p_{i_{p'}}$ has been activated; and has the earliest adjusted deadline d'($p_B$) or d'($p_{i_{p'}}$) among all such tasks on $m_q$ that are ready and have not completed at time t. This is because successful completion of backup $p_B$ before its adjusted deadline d'($p_B$) or surviving primary $p_{i_p}$ before its adjusted deadline d'($p_{i_p}$), is considered to be the "last chance to avoid failure of the task/process" p or $p_i$, and potentially, the "last chance to avoid failure of the entire system."

Priority 1 Tasks: The next highest priority is given to any primary $p_P$ such that the latest start time of primary $p_P$ has been reached, that is, LS($p_P$)=t, and $p_P$ has the earliest adjusted deadline d'$_{pP}$ among all such tasks on $m_q$ that are ready at time t.

Priority 2 Tasks: The next highest priority is given to any primary $p_P$ such that $p_P$ is ready at time t and $p_P$ has the earliest adjusted deadline d'$_{pP}$ among all such tasks on $m_q$ that are ready at time t.

Step 4. At time 0 and after servicing each timer interrupt, and performing necessary error detection, error handling, latest start time re-calculations, and making scheduling decisions; —reset the timer to interrupt at the earliest time that any of the events (c), (d), and (e) above may occur.

Step 5. Let the primaries $p_P$ or backups $p_B$ that were selected in Step 3 start to execute at run-time t.

Example 5

FIG. 8A shows a possible run-time execution on two processors $m_1$ and $m_2$ of the primaries and backups in the set of processes A, B, C, D, E, F, G, H, I shown in FIG. 5A of Example 1, assuming that processor $m_2$ will suffer a permanent hardware failure at time t=4.5, but for every process in the set of processes A, B, C, D, E, F, G, H, I either a primary or a backup will still be able to complete on processor $m_1$ before their deadlines despite overrunning or underrunning. The latest start time values s of the primaries and backups in the set of processes A, B, C, D, E, F, G, H, I shown in FIG. 5C in Example 3 will be used at run time t=0. In FIG. 8A, $F_P$ underruns, while $A_P$, $C_P$, $H_P$ overruns. The portions of the run-time execution during which $A_P$, $C_P$ overruns are shown using dashed lines.

In this Example 5 it is assumed that when a permanent processor failure occurs, recovery methods (1) and (4) will be used.

(In the previous Example 4, when a permanent processor failure occurs, recovery methods (1) and (3) were used instead.)

At run-time t=0: the latest start time schedule is shown in FIG. 3. The run-time scheduler will select primary $A_P$ and primary $H_P$ to run on processor $m_1$ and processor $m_2$ respectively as priority 2 tasks, because A and H are the processes that are ready with the earliest adjusted deadline at time t=0. At t=0, the timer will be programmed to interrupt at $F_P$ and $C_P$'s latest start times LS($F_P$)=LS($C_P$)=2, before dispatching $A_P$ and $H_P$ for execution.

At time t=2: the timer interrupts at $F_P$ and $C_P$'s latest start times LS($F_P$)=LS($C_P$)=2; while both $H_P$ and $A_P$ have not completed and $A_P$ overruns. After re-computing the latest-start-times, LS($H_P$)=11, and Aps time slot is removed from the latest-start-time schedule. The run-time scheduler will first select primary $F_P$ to run on processor $m_1$ as a priority 1 task, because primary $F_P$'s latest start time LS($F_P$)=2 has been reached. Then the run-time scheduler will select primary $C_P$ to run on processor $m_2$ as a priority 1 task, because primary $C_P$'s latest start time LS($C_P$)=2 has also been reached. At t=2, the timer will be programmed to interrupt at primary $E_P$'s latest-start-time LS($E_P$)=4, before dispatching $F_P$ and $C_P$ for execution.

At time t=3: primary $F_P$ underruns, while $C_P$ has not completed. After re-computing the latest-start-time for $C_P$ at time 3, LS($C_P$)=7, and backup $F_B$s time slot will be removed from the latest-start-time schedule. The run-time scheduler will select $A_P$ to run on $m_1$ as a priority 2 task. Note that $A_P$ is able to use the portion of the time slot that is unused due to primary $F_A$'s underrun to overrun. The run-time scheduler will select $C_P$ to run on $m_2$ as a priority 2 task, because $C_P$ has the earliest deadline among all tasks on $m_2$ that are ready at time t=3. At t=3, the timer will be programmed to interrupt at primary $E_P$'s latest start time LS($E_P$)=4, before dispatching $A_P$ and $C_P$ for execution.

At time t=4: primaries $A_P$ and $C_P$ have not completed, and $C_P$ overruns.

After re-computing the latest-start-times, Cps time slot is removed from the latest-time schedule. The run-time scheduler will select primary $E_P$ to run on processor $m_1$ as a priority 1 task, because primary $E_P$'s latest start time $LS(E_P)$ =4 has been reached. The run-time scheduler will select primary $C_P$ to start overrunning on $m_2$ as a priority 2 task. Note that $C_P$ is able to use the time slot that was previously reserved for backup $F_B$ to overrun—$F_B$'s time slot is not used anymore due to the underrun of primary $F_P$ at time 3. At t=4, the timer will be programmed to interrupt at primary $G_P$'s and backup $E_B$s latest start time $LS(G_P)=LS(E_B)=5$, before dispatching $E_P$ and $C_P$ for execution.

At t=4.5 processor $m_2$ permanently fails.

Primaries $H_P$, $C_P$ that previously were in execution and had not completed yet on the failed processor $m_2$ at time t=4.5 will be aborted and the corresponding backups $H_B$, $C_B$ on the surviving processor $m_1$ will be activated.

In this Example 5 it is assumed that when a permanent processor failure occurs, recovery methods (1) and (4) will be used. Note that all the surviving primaries, that is, $A_P$, $B_P$, $D_P$, $E_P$, $G_P$, and $I_P$, on the surviving processor $m_1$ for which the corresponding backups $A_B$, $B_B$, $D_B$, $E_B$, $G_B$, and $I_B$ were previously scheduled before run-time on the permanently failed processor $m_2$, will be replaced by the corresponding backups $A_B$, $B_B$, $D_B$, $E_B$, $G_B$, and $I_B$ on the surviving processor $m_1$, because there exists a feasible schedule in which all the timing constraints can be satisfied for all those corresponding backups. (One can use the earlier method for computing a feasible prerun-time schedule to verify that.) The recomputed latest-start-time schedule for all the backups that will be used to recover from the permanent failure of processor m2 on the surviving processor m1 after recovery methods (1) and (4) have been applied is shown in FIG. 8B.

At time t=5: backup $E_B$'s earliest start time $LS(E_B)=5$ has been reached. The recomputed latest start times are shown in FIG. 8B. The run-time scheduler will select backup $E_B$ to run on processor $m_1$ as a priority 0 task, because backup $E_B$'s latest start time $LS(E_B)=5$ has been reached, and it has the earliest adjusted deadline among all backups or surviving primaries for which their latest start times have been reached or have been activated on $m_1$ at time t=5. At t=5, the timer will be programmed to interrupt at backup $G_B$'s latest start time $LS(G_B)=6$, before dispatching $E_B$ for execution.

At time t=6: backup $E_B$ completes, while backup $G_B$'s earliest start time $LS(G_B)=6$ has been reached. After re-computing the latest-start-times, at run-time t=6: the latest start time schedule is shown in FIG. 8C. The run-time scheduler will select backup $G_B$ to run on processor $m_1$ as a priority 0 task, because backup $G_B$'S latest start time $LS(G_B)$ =6 has been reached, and it has the earliest adjusted deadline among all backups or surviving primaries for which their latest start times have been reached or have been activated on $m_1$ at time t=6. At t=6, the timer will be programmed to interrupt at backup $C_B$'s latest start time $LS(C_B)=7$, before dispatching $G_B$ for execution.

At time t=7: backup $G_B$ completes, while backup $C_B$'s earliest start time $LS(C_B)=7$ has been reached. The recomputed latest-start-time schedule is shown in FIG. 8D The run-time scheduler will select backup $C_B$ to run on processor $m_1$ as a priority 0 task, because backup $C_B$ has the earliest adjusted deadline among all backups or surviving primaries for which their latest start times have been reached or have been activated on $m_1$ at time t=7.

At t=7, the timer will be programmed to interrupt at backup $D_B$'s latest start time $LS(D_B)=8$, before dispatching $C_B$ for execution.

At time t=8: backup $C_B$ completes, while backup $D_B$'s earliest start time $LS(D_B)=8$ has been reached. The recomputed latest-start-time schedule is shown in FIG. 8E. The run-time scheduler will select backup $D_B$ to run on processor $m_1$ as a priority 0 task, because backup $D_B$ has the earliest adjusted deadline among all backups or surviving primaries for which their latest start times have been reached or have been activated on $m_1$ at time t=8.

At t=8, the timer will be programmed to interrupt at backup $B_B$'s latest start time $LS(B_B)=9$, before dispatching $D_B$ for execution.

At time t=9: backup $D_B$ completes, while backup $B_B$'s earliest start time $LS(B_B)=9$ has been reached. The recomputed latest-start-time schedule is shown in FIG. 8F. The run-time scheduler will select backup $B_B$ to run on processor $m_1$ as a priority 0 task, because backup $B_B$ has the earliest adjusted deadline among all backups or surviving primaries for which their latest start times have been reached or have been activated on $m_1$ at time t=9.

At t=9, the timer will be programmed to interrupt at backup $I_B$'s latest start time $LS(I_B)=10$, before dispatching $B_B$ for execution.

At time t=10: backup $B_B$ completes, while backup $I_B$'s earliest start time $LS(I_B)=10$ has been reached. The recomputed latest-start-time schedule is shown in FIG. 8G. The run-time scheduler will select backup $I_B$ to run on processor $m_1$ as a priority 0 task, because backup $I_B$ has the earliest adjusted deadline among all backups or surviving primaries for which their latest start times have been reached or have been activated on $m_2$ at time t=10.

At t=10, the timer will be programmed to interrupt at backup $C_B$'s latest start time $LS(C_B)=11$, before dispatching $I_B$ for execution.

At time t=11: backup $I_B$ completes. The recomputed latest-start-time schedule is shown in FIG. 8H. The run-time scheduler will select backup $C_B$ to run on processor $m_1$ as a priority 0 task, because backup $C_B$ has the earliest adjusted deadline among all backups or surviving primaries for which their latest start times have been reached or have been activated on $m_1$ at time t=11.

At t=11, the timer will be programmed to interrupt at backup $H_B$'s latest start time $LS(H_B)=12$, before dispatching $C_B$ for execution.

At time t=12: backup $C_B$ completes. The recomputed latest-start-time schedule is shown in FIG. 8I. The run-time scheduler will select backup $H_B$ to run on processor $m_1$ as a priority 0 task, because backup $H_B$ has the earliest adjusted deadline among all backups or surviving primaries for which their latest start times have been reached or have been activated on $m_1$ at time t=12.

At t=12, the timer will be programmed to interrupt at backup $A_B$'s latest start time $LS(A_B)=14$, before dispatching $H_B$ for execution.

At time t=13: backup $H_B$ completes (underruns). The recomputed latest-start-time schedule is shown in FIG. 8J. The run-time scheduler will select backup $A_B$ to run on processor $m_1$ as a priority 0 task, because backup $A_B$ has the earliest adjusted deadline among all backups or surviving primaries for which their latest start times have been reached or have been activated on $m_1$ at time t=13.

At t=13, the timer will be programmed to interrupt at backup $A_B$'s deadline $d(A_B)=15$ before dispatching $A_B$ for execution.

At time t=15: backup $A_B$ completes after overrunning before its deadline. Note that $A_B$ is able to use the portion of the time slot that is unused due to primary $H_B$'s underrun to overrun.

Example 6

FIG. 9A shows a feasible pre-run-time schedule $S_O$ for the primaries and backups in the set of processes A, B, C, D on two processors $m_1$ and $m_2$, in which each primary and each backup of a same process are not allowed to be scheduled on a same processor in order to tolerate hardware failure of a single processor, computed by the method for computing a feasible pre-run-time schedule.

FIG. 9B shows a latest-start-time schedule $S_L$ and the latest start times for all the primaries and backups in the set of processes A, B, C, D on two processors $m_1$ and $m_2$, in which each primary and each backup of a same process are not allowed to be scheduled on a same processor in order to tolerate hardware failure of a single processor, which can be computed by the method for computing a latest-start-time schedule from the feasible pre-run-time schedule $S_O$ in FIG. 9A.

FIG. 9C shows a possible run-time execution on two processors $m_1$ and $m_2$ of the primaries and backups in the set of processes A, B, C, D shown in FIG. 9A, assuming that processor $m_1$ will suffer a permanent hardware failure at time t=3, but for every process in the set of processes A, B, C, D either a primary or a backup will still be able to complete on processor $m_2$ before their deadlines despite overrunning or underrunning. The latest start time values of the primaries and backups in the set of processes A, B, C, D shown in FIG. 9B will be used at run time t=0. In FIG. 9C, $B_B$ underruns, while $C_B$, $D_B$ overruns. The portions of the run-time execution during which $C_B$, $D_B$ overruns are shown using dashed lines.

In this Example 6 and the previous Example 5, it is assumed that when a permanent processor failure occurs, recovery methods (1) and (4) will be used.

(In the previous Example 4 when a permanent processor failure occurs, recovery methods (1) and (3) were used instead.)

At run-time t=0, the latest start times of primaries $B_P$, $A_P$, $LS[B_P]=LS[A_P]=0$ are reached. The latest start time schedule at time t=0 is shown in FIG. 9B. The run-time scheduler will select primaries $B_P$, $A_P$ to run on processor $m_1$ and processor $m_2$ respectively as priority 1 tasks, because $B_P$, $A_P$ have the earliest adjusted deadline at time t=0 among all primaries and backups for which the latest start time has been reached. At t=0, the timer will be programmed to interrupt at $A_B$ and $B_B$'S latest start times $LS(A_B)=LS(B_B)=4$, before dispatching $B_P$, $A_P$ for execution.

At time t=3 processor $m_1$ permanently fails.

At time t=3, because it is assumed that recovery methods (1) and (4) will be used, for each backup $p_{j_B}$ that was previously scheduled to execute on the failed processor, if there exists a feasible schedule in which all timing constraints are satisfied for that same backup $p_{j_B}$ together with all other surviving primaries and backups that are used for recovery on the surviving processor m, when that same backup $p_{j_B}$ is used to replace the corresponding primary $p_{j_P}$ on the surviving processor m for recovery, then use that same backup $p_{j_B}$ to replace the corresponding primary $p_{j_P}$ on the surviving processor m for recovery; otherwise use the corresponding existing primary $p_{j_P}$ on a surviving processor for recovery. In the latter case, when an existing primary $p_{j_P}$ on a surviving processor is used for recovery, then $p_{j_{P'}}$ will be called a "surviving primary" and denoted as $p_{j_{P'}}$. Let ActivationTime $(p_{j_{P'}})$=t, and let surviving primary $p_{j_{P'}}$, for which the corresponding backup $p_{j_B}$ was previously scheduled before run-time on the permanently failed processor, have the same deadline that its corresponding backup $p_{j_B}$ had on the permanently failed processor, when re-computing latest start times, and when the run-time scheduler selects primaries and backups for execution on each surviving processor at run-time.

Any surviving primary $p_{j_{P'}}$ will be given the same priority as a backup when the run-time scheduler selects primaries and backups for execution on each surviving processor at run-time.

In accordance with recovery methods (1) and (4), the primaries $B_P$, $D_P$ that were previously scheduled to execute on the failed processor $m_1$ will be aborted and the corresponding backups $B_B$ and $D_B$ on the surviving processor $M_2$ will be activated.

Note that the backup $A_B$ that was previously scheduled to execute on the failed processor $m_1$ CANNOT be used to replace the corresponding primary $A_P$ on the surviving processor $m_2$, because, as illustrated in FIG. 9D, no feasible schedule exists on the surviving processor $m_2$ if backup $A_B$ is used to replace primary $A_P$ on $m_2$ after $m_1$ has failed at run-time t=3. For this reason, according to recovery method (4), the existing primary $A_P$ must be designated as a "surviving primary" $A_{P'}$ to continue to execute on the surviving processor $m_2$. Note that the surviving primary $A_{P'}$ will be given the same priority as a backup when the run-time scheduler selects primaries and backups for execution on the surviving processor $m_2$.

In comparison, the backup $C_B$ that was previously scheduled to execute on the failed processor $m_1$ can now be used to replace the corresponding primary $C_P$ and be activated on the surviving processor $m_2$, because, as shown in FIG. 9E, at run-time t=3, there exists a feasible schedule for all the primaries and backups $A_{P'}$, $B_P$, $C_B$, $D_B$, that will be used for recovery on the surviving processor $m_2$, in which all the timing constraints of $A_{P'}$, $B_P$, $C_B$, $D_B$ on $m_2$ can be satisfied.

At time t=3: after re-computing the latest-start-times, at run-time t=3, the latest start time schedule is shown in FIG. 9E. The run-time scheduler will select surviving primary $A_{P'}$ to run on processor $m_2$ as a priority 0 task, because surviving primary $A_{P'}$'s latest start time $LS(A_{P'})$=3 has been reached, and it has the earliest adjusted deadline among all backups or surviving primaries for which their latest start times have been reached or have been activated and are ready on $m_2$ at time t=3. At t=3, the timer will be programmed to interrupt at backup $B_B$'s latest start time $LS(B_B)$=4, before dispatching $A_{P'}$ for execution.

At time t=4: surviving primary $A_{P'}$ completes, while backup $B_B$'S latest start time $LS(B_B)$=4 has been reached. After re-computing the latest-start-times, at run-time t=4: the latest start time schedule is shown in FIG. 9F. The run-time scheduler will select backup $B_B$ to run on processor $m_2$ as a priority 0 task, because backup $B_B$'s latest start time $LS(B_B)$=4 has been reached, and it has the earliest adjusted deadline among all backups or surviving primaries for which their latest start times have been reached or have been activated on $m_2$ and are ready at time t=4. At t=4, the timer will be programmed to interrupt at backup $C_B$'s latest start time $LS(C_B)$=8, before dispatching $B_B$ for execution.

At time t=5: backup $B_B$ underruns. The recomputed latest-start-time schedule is shown in FIG. 9G. The run-time scheduler will select backup $C_B$ to run on processor $m_2$ as a priority 0 task, because backup $C_B$ has the earliest adjusted deadline among all backups or surviving primaries that are ready and have been activated on $m_2$ at time t=5.

At t=5, the timer will be programmed to interrupt at backup $D_B$'s latest start time $LS(D_B)$=10, before dispatching $C_B$ for execution.

At time t=9: backup $C_B$ completes after overrunning. The recomputed latest-start-time schedule is shown in FIG. 9H. The run-time scheduler will select backup $D_B$ to run on processor $m_2$ as a priority 2 task, because backup $B_B$ has the earliest adjusted deadline among all backups or surviving primaries that are ready and have been activated on $m_2$ at time t=9.

At t=9, the timer will be programmed to interrupt at backup $D_B$'s deadline $d(D_B)=12$, before dispatching $D_B$ for execution.

At time t=12: backup $D_B$ completes before its deadline after overrunning. Note that backups $C_B$ and $D_B$ were able to use the portion of the time slot that was unused due to backup $B_B$'s underrun to overrun and complete before their deadlines, after the permanent failure of processor $m_1$, despite overrunning.

A person understanding the above-described illustrative embodiments of the method may now conceive of alternative designs, using the principles described herein. All such designs which fall within the scope of the claims appended hereto are considered to be part of the present method.

While the above description contains many specificities, these should not be construed as limitations on the scope of any embodiment, but as exemplifications of various embodiments thereof. Many other ramifications and variations are possible within the teachings of the various embodiments.

Thus the scope should be determined by the appended claims and their legal equivalents, and not by the examples given.

What is claimed is:

1. A system for handling execution overruns and underruns of primaries and backups of a plurality of periodic processes with hard deadlines on a multiprocessor in a real-time embedded system which tolerates permanent hardware and software failures while satisfying predetermined constraints, comprising, two or more processors to execute said plurality of periodic processes with hard deadlines, one or more timers which allow the system to determine a current time at any time during run-time, said predetermined constraints including release time and deadline constraints, and exclusion relations defined between selected pairs of periodic processes with hard deadlines, scheduling executions of a primary and a backup on different processors for every periodic process in said plurality of periodic processes with hard deadlines, abandoning the primary and activating the backup of each periodic process with a hard deadline when an error in execution of the primary is detected or successful completion of the primary cannot be guaranteed, abandoning all the primaries and all the backups that were previously scheduled to execute on a failed processor and activating corresponding backups and corresponding primaries that were previously scheduled to execute on surviving processors when a permanent processor failure has occurred at run-time, computing a latest start time for each primary and each backup that has not overrun and has not completed or aborted, allowing any selected uncompleted backup or surviving primary Pi_P' to overrun until the latest start time of another uncompleted backup or surviving primary Pi_P', or until a deadline of said any selected uncompleted backup or surviving primary Pi_P' with a hard deadline has been reached both before, and after, a permanent processor failure has occurred at run-time, whereby chances that either the primary or the backup of each real-time periodic process will be able to successfully complete computation before a corresponding deadline despite overrunning is increased, both before and after a permanent processor failure.

2. The system as defined in claim 1, wherein latest start times are re-computed for all the primaries and backups on the surviving processors during run-time, both before, and after, a permanent processor failure has occurred.

3. The system as defined in claim 1, wherein for each backup that was previously scheduled to execute on a failed processor, if when that same backup is used to replace the corresponding primary on the surviving processor m for recovery, there exists a feasible schedule in which all timing constraints are satisfied for that same backup together with all other surviving primaries and backups that are used for recovery on the surviving processor, then use that same backup to replace the corresponding primary on the surviving processor for recovery, otherwise use a corresponding existing primary on the surviving processor for recovery, after a permanent processor failure has occurred at run-time.

4. The system as defined in claim 1, wherein any surviving primary will have j same deadline that a corresponding backup had on the permanently failed processor, when re-computing latest start times, and when a run-time scheduler selects primaries and backups for execution on each surviving processor after a permanent processor failure has occurred at run-time.

5. The system as defined in claim 1, wherein any surviving primary will be given a same priority as a backup when a run-time scheduler selects primaries and backups for execution on each surviving processor after a permanent processor failure has occurred at run-time.

6. The system as defined in claim 1, wherein said predetermined constraints further include precedence constraints defined between selected pairs of periodic processes with hard deadlines.

7. A method for handling execution overruns and underruns of primaries and backups of a plurality of periodic processes with hard deadlines on a multiprocessor in a real-time embedded system which tolerates permanent hardware and software failures while satisfying predetermined constraints, comprising, providing two or more processors to execute said plurality of periodic processes with hard deadlines, providing one or more timers which allow the system to determine a current time at any time during run-time, said predetermined constraints including release time and deadline constraints, and exclusion relations defined between selected pairs of periodic processes with hard deadlines, scheduling executions of a primary and a backup on different processors for every periodic process in said plurality of periodic processes with hard deadlines, abandoning the primary and activating the backup of each periodic process with a hard deadline when an error in execution of the primary is detected or successful completion of the primary cannot be guaranteed, abandoning all the primaries and all the backups that were previously scheduled to execute on a failed processor and activating corresponding backups and corresponding primaries that were previously scheduled to execute on surviving processors when a permanent processor failure has occurred at run-time, computing a latest start time for each primary and each backup that has not overrun and has not completed or aborted, allowing any selected uncompleted backup or surviving primary Pi_P' to overrun until the latest start time of another uncompleted backup or surviving primary Pi_P', or until a deadline of said any selected uncompleted backup or surviving primary Pi_P' with a hard deadline has been reached both before, and after, a permanent processor failure has occurred at run-time, whereby chances that either the primary or the backup of each real-time periodic process will be able to successfully complete computation before a corresponding deadline despite overrunning is increased, both before and after a permanent processor failure.

8. The method as defined in claim 7, wherein latest start times are re-computed for all the primaries and backups on the surviving processors during run-time, both before, and after, a permanent processor failure has occurred.

9. The method as defined in claim 7, wherein for each backup that was previously scheduled to execute on a failed processor, if when that same backup is used to replace the corresponding primary on the surviving processor m for recovery, there exists a feasible schedule in which all timing constraints are satisfied for that same backup together with all other surviving primaries and backups that are used for recovery on the surviving processor, then use that same backup to replace the corresponding primary on the surviving processor for recovery, otherwise use a corresponding existing primary on the surviving processor for recovery, after a permanent processor failure has occurred at run-time.

10. The method as defined in claim 7, wherein any surviving primary will have a same deadline that a corresponding backup had on the permanently failed processor, when re-computing latest start times, and when a run-time scheduler selects primaries and backups for execution on each surviving processor after a permanent processor failure has occurred at run-time.

11. The method as defined in claim 7, wherein any surviving primary will be given a same priority as a backup when a run-time scheduler selects primaries and backups for execution on each surviving processor after a permanent processor failure has occurred at run-time.

12. The method as defined in claim 7, wherein said predetermined constraints further include precedence constraints defined between selected pairs of periodic processes with hard deadlines.

* * * * *